US008725387B2

(12) United States Patent
Iwazaki et al.

(10) Patent No.: US 8,725,387 B2
(45) Date of Patent: May 13, 2014

(54) APPARATUS FOR DETERMINING AN AIR-FUEL RATIO IMBALANCE AMONG CYLINDERS OF AN INTERNAL COMBUSTION ENGINE

(71) Applicant: Toyota Jidosha Kabushiki Kaisha, Toyota (JP)

(72) Inventors: Yasushi Iwazaki, Ebina (JP); Hiroshi Miyamoto, Susono (JP); Fumihiko Nakamura, Susono (JP); Hiroshi Sawada, Gotenba (JP); Toru Kidokoro, Hadano (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/871,249

(22) Filed: Apr. 26, 2013

(65) Prior Publication Data

US 2013/0261934 A1 Oct. 3, 2013

Related U.S. Application Data

(63) Continuation of application No. 13/496,623, filed as application No. PCT/JP2009/066867 on Sep. 18, 2009, now Pat. No. 8,447,497.

(51) Int. Cl.
*B60T 7/12* (2006.01)

(52) U.S. Cl.
USPC ............ 701/103; 123/673; 123/679; 123/516

(58) Field of Classification Search
USPC .......... 701/103–105, 114, 115; 123/434, 435, 123/672–674, 698, 516–520
See application file for complete search history.

(56) References Cited

U.S. PATENT DOCUMENTS

| | | | |
|---|---|---|---|
| 6,096,187 | A | 8/2000 | Mizoguchi et al. |
| 6,314,952 | B1 | 11/2001 | Turin et al. |
| 6,340,419 | B1 | 1/2002 | Nakae et al. |
| 7,027,910 | B1 | 4/2006 | Javaherian et al. |
| 7,152,594 | B2 | 12/2006 | Anilovich et al. |
| 7,802,563 | B2 | 9/2010 | Behr et al. |
| 2010/0191444 | A1 | 7/2010 | Aoki |
| 2011/0288739 | A1 | 11/2011 | Kidokoro et al. |
| 2012/0006307 | A1 | 1/2012 | Demura |

FOREIGN PATENT DOCUMENTS

| | | | |
|---|---|---|---|
| JP | 11072473 | A | 3/1999 |
| JP | 2000065782 | A | 3/2000 |
| JP | 2002069547 | A | 3/2002 |
| JP | 2008051003 | A | 3/2008 |
| JP | 2008157036 | A | 7/2008 |
| JP | 2009-013967 | A | 1/2009 |
| JP | 2009-030455 | A | 2/2009 |
| JP | 2009-209747 | A | 9/2009 |

*Primary Examiner* — John Kwon
(74) *Attorney, Agent, or Firm* — Gifford, Krass, Sprinkle, Anderson & Citkowski, P.C.

(57) ABSTRACT

An apparatus for determining an air-fuel ratio imbalance among cylinders based on an output value of an air-fuel ratio sensor, an imbalance determination parameter which becomes larger or smaller as a difference among air-fuel ratios becomes larger, and performs determining an air-fuel ratio imbalance among cylinders based on a result of a comparison between the imbalance determination parameter and a imbalance determination threshold. The determining apparatus calculates a purge correction coefficient which compensates for a change in the air-fuel ratio due to an evaporated fuel gas which is generated in a fuel tank, while the evaporated fuel gas is being introduced into an intake passage, and corrects a fuel injection amount with the purge correction coefficient FPG.

4 Claims, 27 Drawing Sheets

APPARATUS FOR DETERMINING AN AIR-FUEL RATIO IMBALANCE AMONG CYLINDERS OF AN INTERNAL COMBUSTION ENGINE

CROSS-REFERENCE TO RELATED APPLICATIONS

This application is a divisional of U.S. patent application Ser. No. 13/496,623 filed Mar. 16, 2012, which is a 371 of PCT/JP2009/066867 filed Sep. 18, 2009.

TECHNICAL FIELD

The present invention relates to an "apparatus for determining an air-fuel ratio imbalance among cylinders of an internal combustion engine", which is applied to to a multi-cylinder internal combustion engine, the apparatus being able to determine (or monitor, detect) whether or not an imbalance of air-fuel ratios of air-fuel mixtures, each supplied to each of cylinders (i.e., an air-fuel ratio imbalance among the cylinders, variation in air-fuel ratios among the cylinders, or air-fuel ratio non-uniformity among the cylinders) becomes excessively large.

BACKGROUND ART

Conventionally, an air-fuel ratio control apparatus has been widely known, which comprises a three-way catalytic converter disposed in an exhaust passage (exhaust gas passage) of an internal combustion engine, and an upstream air-fuel ratio sensor and a downstream air-fuel ratio sensor disposed, in the exhaust passage, upstream and downstream of the three-way catalytic converter, respectively. The air-fuel ratio control apparatus calculates, based on the output value of the upstream air-fuel ratio sensor and the output value of the downstream air-fuel ratio sensor, an air-fuel ratio feedback amount, and performs a feedback control on an air-fuel ratio (air-fuel ratio of the engine) of a mixture supplied to the engine in such a manner that the air-fuel ratio of the engine coincides with (becomes equal to) a stoichiometric air-fuel ratio. Further, another air-fuel ratio control apparatus is also proposed, which calculates, based on only one of the output value of the upstream air-fuel ratio sensor and the output value of the downstream air-fuel ratio sensor, an air-fuel ratio feedback amount, and performs a feedback control on the air-fuel ratio of the engine. The air-fuel ratio feedback amount used in these air-fuel ratio control apparatuses is commonly used for all of the cylinders.

Meanwhile, an electronic control fuel injection type internal combustion engine typically comprises at least one fuel injector in each of the cylinders or in each of intake ports, each communicating with each of the cylinders. Accordingly, when a property (characteristic) of the fuel injector for a specific cylinder becomes a "property that the fuel injector injects fuel in an amount larger (more excessive) than an instructed fuel injection amount", only an air-fuel ratio (air-fuel-ratio-of-the-specific-cylinder) of an air-fuel mixture supplied to the specific cylinder shifts (deviates) to an extremely rich side. That is, a non-uniformity among air-fuel ratios of the cylinders (variation in air-fuel ratios among the cylinders, air-fuel ratio imbalance among the cylinders) becomes high (prominent). In other words, there arises an imbalance among the air-fuel ratios of individual cylinders.

In this case, the average of the air-fuel ratios of the mixtures supplied to the entire engine becomes an air-fuel ratio richer (smaller) than the stoichiometric air-fuel ratio. Accordingly, the feedback amount commonly used for all of the cylinders causes the air-fuel ratio of the specific cylinder to shift to a leaner (larger) air-fuel ratio so that the air-fuel ratio of the specific cylinder is made closer to the stoichiometric air-fuel ratio, and simultaneously, causes each of the air-fuel ratios of the other cylinders to shift to a leaner (larger) air-fuel ratio so that the air-fuel ratios of the other cylinders are made to deviate more from the stoichiometric air-fuel ratio. As a result, the average of the air-fuel ratios of the entire mixtures supplied to the engine is caused to become roughly equal to the stoichiometric air-fuel ratio.

However, the air-fuel ratio of the specific cylinder is still richer (smaller) than the stoichiometric air-fuel ratio, and the air-fuel ratios of the other cylinders become leaner (larger) than the stoichiometric air-fuel ratio, and therefore, a combustion condition of the mixture in each of the cylinders is different from the perfect combustion condition. As a result, an amount of emissions (an amount of unburnt substances and/or an amount of nitrogen oxides) discharged from each of the cylinders increases. Accordingly, even though the average of the air-fuel ratios of the mixtures supplied to the engine coincides with the stoichiometric air-fuel ratio, the three-way catalytic converter may not be able to purify the increased emissions, and thus, there is a possibility that the emissions become worse.

It is therefore important to detect whether or not the air-fuel ratio non-uniformity among cylinders becomes excessively large (the air-fuel ratio imbalance among cylinders is occurring), since an appropriate measure can be taken in order not to worsen the emissions.

One of such conventional apparatuses for determining the air-fuel ratio imbalance among cylinders obtains a trajectory length of the output value (output signal) of an air-fuel ratio sensor (upstream air-fuel ratio sensor described above) disposed at an exhaust gas aggregated portion into which the exhaust gas discharged from the plurality of the cylinders aggregate/merge, compares the trajectory length with a "reference value varying depending on the engine rotational speed and an intake air amount", and determines, based on the result of the comparison, whether or not the air-fuel ratio imbalance among cylinders is occurring (refer to, for example, U.S. Pat. No. 7,152,594). It should be noted that the determination of whether or not an "excessive air-fuel ratio imbalance among cylinders" has been occurring may be referred to as an "air-fuel ratio imbalance among cylinders determination" or an "imbalance determination". The "excessive air-fuel ratio imbalance among cylinders" means an air-fuel ratio imbalance among cylinders which causes an amount of unburnt substances or an amount of Nitrogen-oxide to exceed a permissible (tolerable) value.

SUMMARY OF THE INVENTION

Meanwhile, the inventor(s) have found that, when the evaporated fuel gas generated in a fuel tank is introduced into an intake passage (i.e., "during a so-called evaporation-purge"), the evaporated gas affects the air-fuel ratios of the individual cylinders, and thus, there may be a case in which the imbalance determination cannot be performed with high precision.

More specifically, it is assumed that the air-fuel ratio imbalance among cylinder has occurred in which an amount of a fuel supplied to a first cylinder in a four cylinder engine is excessive in (by) 40%. It is further assumed that, when an amount of a fuel supplied to the entire engine is 400 (its unit is weight), an average of the air-fuel ratio (air-fuel ratio of the engine) of the mixture supplied to the entire engine coincides with the stoichiometric air-fuel ratio. That is, when the stoichiometric air-fuel ratio is equal to St (e.g., 14.7), it is assumed that the intake air amount G (its unit is weight) is equal to 400·St (i.e., St=G/400). Hereinafter, the injector which injects the fuel to the Nth cylinder (N being a natural number) is also referred to as a Nth cylinder injector. Further, an amount of a fuel injected from the Nth cylinder injector is also referred to as a "fuel injection amount of the Nth cylinder".

Under this assumption, when the average of the air-fuel ratio of the engine coincides with the stoichiometric air-fuel ratio, a fuel injection amount of each of the injectors is as follows.

A fuel injection amount of the first cylinder injector: 127=400·{1.4/(1.4+1.0+1.0+1.0)}

A fuel injection amount of the second cylinder injector: 91=400·{1.0/(1.4+1.0+1.0+1.0)}

A fuel injection amount of the third cylinder injector: 91=400·{1.0/(1.4+1.0+1.0+1.0)}

A fuel injection amount of the fourth cylinder injector: 91=400·{1.0/(1.4+1.0+1.0+1.0)}

A total amount of the fuel supplied to the entire engine: 400

Accordingly, in the example described above, a difference between the fuel injection amount of the first cylinder which is an imbalance cylinder and the fuel injection amount of each of the fuel injection amount of the second to fourth cylinder, each being non-imbalance cylinder, is equal to "36(=127−91)".

In contrast, it is assumed that, when the air-fuel ratio imbalance among cylinders has occurred in which the amount of the fuel supplied to the first cylinder in the four cylinder engine is excessive in (by) 40%, the evaporated fuel gas is supplied to each of the cylinders in an amount corresponding to a "25% of the fuel injection amount" per one cylinder. That is, it is assumed that 100 (its unit is weight) of the fuel due to the evaporated fuel gas is supplied to the entire engine, and the evaporated fuel gas is uniformly (evenly) supplied to each of the cylinder. In this case, when the average of the air-fuel ratio of the engine coincides with the stoichiometric air-fuel ratio owing to the air-fuel ratio feedback control described above, a fuel injection amount of each of the injectors is as follows.

A fuel injection amount of the first cylinder injector: 96=(400−100)·{1.4/(1.4+1.0+1.0+1.0)}

A fuel injection amount of the second cylinder injector: 68=(400−100)·{1.0/(1.4+1.0+1.0+1.0)}

A fuel injection amount of the third cylinder injector: 68=(400−100)·{1.0/(1.4+1.0+1.0+1.0)}

A fuel injection amount of the fourth cylinder injector: 68=(400−100)·{1.0/(1.4+1.0+1.0+1.0)}

A total amount of the fuel supplied to the entire engine: 400

Accordingly, the fuel amount supplied to each of the cylinders is as follows.

An amount of a fuel supplied to the first cylinder: 121=96+25

An amount of a fuel supplied to the second cylinder: 93=68+25

An amount of a fuel supplied to the third cylinder: 93=68+25

An amount of a fuel supplied to the fourth cylinder: 93=68+25

A total amount of the fuel supplied to the entire engine: 400

Accordingly, in this case, the difference between the fuel injection amount of the first cylinder which is an imbalance cylinder and the fuel injection amount of each of the fuel injection amount of the second to fourth cylinder, each being non-imbalance cylinder, is equal to "28(=96−68)".

As is understood from the example described above, even when a property of a fuel injector of a specific cylinder is a property which causes the air-fuel ratio imbalance whose degree is the same (in the above example, when the injector of the first cylinder becomes in the state in which the injector of the first cylinder injects a fuel by an amount which is 40% greater than an amount of a fuel which each of the fuel injectors of the other cylinders injects), a difference between a fuel injection amount of the imbalance cylinder and a fuel injection amount of the non-imbalance cylinder when the evaporated fuel gas is being introduced into each of the cylinders differs from the difference when the evaporated fuel gas is not being introduced into each of the cylinders, and accordingly, a difference between an amount of a fuel supplied to the imbalance cylinder and an amount of a fuel supplied to the non-imbalance cylinder when the evaporated fuel gas is being introduced into each of the cylinders differs from a difference between an amount of a fuel supplied to the imbalance cylinder and an amount of a fuel supplied to the non-imbalance cylinder when the evaporated fuel gas is not being introduced into each of the cylinders. That is, due to an effect of the evaporated fuel gas, a difference between the air-fuel ratio of the imbalance cylinder and the air-fuel ratio of the non-imbalance cylinder changes. Accordingly, if the determination is made as to whether or not the air-fuel ratio imbalance among cylinders due to the change in the property of the fuel injector is occurring without considering the effect of the evaporated fuel gas, the determination may be incorrect.

The present invention is made to cope with the problem described above, and one of objects of the present invention is to provide an air-fuel ratio imbalance among cylinder determining apparatus which is unlikely to make an erroneous determination due to the effect of the evaporated fuel gas.

An air-fuel ratio imbalance among cylinder determining apparatus of the present invention (hereinafter, also referred simply to as "the present determining apparatus") is applied to a multi cylinder internal combustion engine having a plurality of cylinders.

The present determining apparatus comprises an air-fuel ratio sensor, a plurality of fuel injectors (injection valves), a purge passage section, purge amount control means, imbalance determination parameter obtaining means, imbalance determining means, and allowing and prohibiting imbalance determining execution means.

The air-fuel ratio sensor is disposed in "the exhaust passage of the engine and at an exhaust gas aggregated (converged) portion into which the exhaust gases discharged from at least two or more of the cylinders among the plurality of the cylinders merge" or in "the exhaust passage of the engine and at a position downstream of the exhaust gas aggregated portion". The air-fuel ratio sensor outputs, as an output of the air-fuel ratio sensor, an output value in accordance with an air-fuel ratio of the exhaust gas which has reached the air-fuel ratio sensor.

Each of the fuel injectors is provided (disposed) so as to correspond to each of the at least two or more of the cylinders, and injects a fuel to be contained in a mixture supplied to each of the combustion chambers of the two or more of the cylinders. That is, one or more of the fuel injectors is/are provided per each of the cylinders. Each of the fuel injectors injects the fuel for the cylinder corresponding to each of the fuel injectors.

The purge passage section forms (constitutes) a passage which allows an evaporated fuel gas generated in a "fuel tank for storing the fuel supplied to a plurality of the fuel injectors" to be introduced into an "intake passage of the engine".

The purge amount control means controls an "evaporated fuel gas purge amount" which is an "amount of the evaporated fuel gas introduced (flowed) into the intake passage of the engine through the purge passage section".

The imbalance determination parameter obtaining means obtains, based on the output value of the air-fuel ratio sensor, an "imbalance determination parameter which becomes larger or smaller" as a difference among individual air-fuel ratios, each being an "air-fuel ratio of the mixture supplied to each of the at least two or more of a plurality of the cylinders", becomes larger.

For example, the imbalance determination parameter may be a trajectory length of the "output value of the air-fuel ratio sensor, or an air-fuel ratio (detected air-fuel ratio) represented by the output value of the air-fuel ratio sensor; a change rate (temporal differentiation value, detected air-fuel ratio change rate) of "the output value of the air-fuel ratio sensor, or the detected air-fuel ratio"; a change rate of the change rate (second order temporal differentiation value, change rate of the detected air-fuel ratio change rate) of "the output value of the air-fuel ratio sensor, or the detected air-fuel ratio", or the like. These values become larger as the difference among individual air-fuel ratios becomes larger. Further, the imbalance determination parameter may be an inverse number of each of these values. In this case, the imbalance determination parameter becomes smaller as the difference among individual air-fuel ratios becomes larger. Furthermore, the imbalance determination parameter may be a maximum value or a minimum value of "the output value of the air-fuel ratio sensor, or the detected air-fuel ratio" in a unit combustion cycle period. Generally, the maximum value becomes larger as the difference among the individual cylinder air-fuel ratios become larger. Generally, the minimum value becomes smaller as the difference among the individual cylinder air-fuel ratios become larger. It should be noted that the unit combustion cycle period is a "period corresponding to a crank angle in which each and every cylinder (that is, the at least two or more of the cylinders), discharging the exhaust gas which reaches the air-fuel ratio sensor, completes one combustion stroke".

The imbalance determining means compares the obtained imbalance determination parameter with a predetermined imbalance determination threshold, and determines whether or not the "air-fuel ratio imbalance among cylinders has been occurring" based on a result of the comparison. For example, when the imbalance determination parameter is a value which becomes larger as the difference among the individual cylinder air-fuel ratios becomes larger, the imbalance determining means determines that the air-fuel ratio imbalance among cylinders has been occurring when the imbalance determination parameter is larger than the imbalance determination threshold. Alternatively, when the imbalance determination parameter is a value which becomes smaller as the difference among the individual cylinder air-fuel ratios becomes larger, the imbalance determining means determines that the air-fuel ratio imbalance among cylinders has been occurring when the imbalance determination parameter is smaller than the imbalance determination threshold. This determination may be referred to as an "imbalance determination". That is, the imbalance determining means performs/executes the imbalance determination.

The allowing and prohibiting imbalance determining execution means determines whether or not a state (that is, an evaporated fuel gas effect occurring state) is occurring in which the evaporated fuel gas flowing into the intake passage causes the imbalance determination parameter to change by an amount larger than or equal to a "predetermined allowable amount". Further, the allowing and prohibiting imbalance determining execution means, when it is determined that the evaporated fuel gas effect occurring state is occurring, prohibits obtaining the imbalance determination parameter so as to substantially prohibit performing/executing the imbalance determination, or prohibits performing/executing the imbalance determination itself. Prohibiting the performing/executing the imbalance determination may include invalidating/nullifying the result of the imbalance determination (i.e., it may include rejecting adopting the result of the imbalance determination as the final result). Furthermore, the "predetermined allowable amount" is not necessarily constant.

According to the above configuration, in the "state in which the imbalance determination parameter is caused to change by more than or equal to the predetermined allowable amount", the imbalance determination parameter is not obtained, or the imbalance determination is not carried out. Therefore, a likelihood of determining that the air-fuel ratio imbalance among cylinders is not occurring due to the effect of the evaporated fuel gas even though the injection property of the fuel injector of a particular (specific) cylinder is greatly different from the injection properties of the fuel injectors of the other cylinders can be reduced.

In this case, it is preferable that the present determining apparatus include feedback control means for correcting a fuel injection amount which is an "amount of fuel injected from each of a plurality of the fuel injectors" with (by) an "air-fuel ratio feedback amount which is calculated based on the output value of the air-fuel ratio sensor and a predetermined target air-fuel ratio" in such a manner that the air-fuel ratio represented by the output value of the air-fuel ratio sensor coincides with (becomes equal to) the target air-fuel ratio.

According to the configuration described above, it can be avoided that the emission becomes worse when the imbalance determination is being performed.

Further, it is preferable that;

the feedback control means be configured so as to calculate, based on the output value of the air-fuel ratio sensor, a correction amount (that is, an "evaporated fuel gas purge correction amount") for suppressing (reducing, decreasing) a change in an "air-fuel ratio of the mixture supplied to each of the combustion chambers of the two or more of the cylinders" due to an inflow of the evaporated fuel gas, the correction amount being a "correction amount constituting a part of the air-fuel ratio feedback amount"; and the allowing and prohibiting imbalance determining execution means be configured so as to determine that the evaporated fuel gas effect occurring state is occurring when a magnitude of a difference between the "evaporated fuel gas purge correction amount" and a "reference value of the evaporated fuel gas purge correction amount" is larger than a predetermined purge effect determining threshold.

The reference value of the evaporated fuel gas purge correction amount is a "value of the evaporated fuel gas purge correction amount" which neither increases nor decreases the fuel injection amount (i.e. the value which does not correct the fuel injection amount).

According to the configuration described above, it is possible to accurately determine, based on the evaporated fuel gas purge correction amount, whether or not the evaporated fuel gas effect occurring state is occurring.

Further, it is preferable that the imbalance determination parameter obtaining means include first parameter correction means for obtaining the imbalance determination parameter used for the imbalance determination by correcting, based on the evaporated fuel gas purge correction amount, the obtained imbalance determination parameter. This correction is effectively made when it is determined that the evaporated fuel gas effect occurring state is not occurring.

Even when there is a "certain difference" between (among) the injection properties of the fuel injectors, the difference among the individual cylinder air-fuel ratios becomes smaller as an "amount of a fuel included in the evaporated fuel gas" becomes larger. In view of the above, as the configuration described above, correcting the actually obtained imbalance determination parameter with (by) the actually calculated evaporated fuel gas purge correction amount allows to correct the imbalance determination parameter used for the imbalance determination so that the imbalance determination parameter used for the imbalance determination becomes a value which is not affected by the evaporated fuel gas, and accordingly, a value which accurately represents the difference among the individual cylinder air-fuel ratios caused by the difference between (among) the injection properties of the fuel injectors. Consequently, the air-fuel ratio imbalance among cylinders determination can be accurately performed.

Alternatively, it is preferable that the imbalance determining means include first determination threshold correction means for correcting, based on the evaporated fuel gas purge correction amount, the imbalance determination threshold. This correction is effectively made when it is determined that the evaporated fuel gas effect occurring state is not occurring.

In this manner, in place of (or in addition to) correcting the imbalance determination parameter, correcting, based on the actually calculated evaporated fuel gas purge correction amount, the imbalance determination threshold can change the imbalance determination threshold to a value which corresponds to the effect by the evaporated fuel gas on the imbalance determination parameter, even when the imbalance determination parameter is affected by the evaporated fuel gas. Consequently, when the difference among the individual cylinder air-fuel ratios due to the difference between (among) the injection properties of the fuel injectors reaches the predetermined value, it can be accurately determined that the air-fuel ratio imbalance among cylinders has been occurring.

Meanwhile, when an engine warming-up state is not enough as immediately after the engine is cold-started, and thus, a temperature of intake passage constituting members including intake ports, intake valves, and the like is low, a relatively large amount of a part of a fuel injected from the injectors adheres to the intake passage constituting members. Further, a fuel injected from a fuel injector, among a plurality of the fuel injectors, whose "injection property is that the injector injects a larger amount of fuel" adheres more to the intake passage constituting members than a fuel injected from a fuel injector whose "injection property is normal". Accordingly, when the engine warming-up state has not yet reached a certain warming-up state, a change amount of the imbalance determination parameter is small even though the fuel injection property of the fuel injector of the specific cylinder is greatly different from the fuel injection property of the fuel injectors of the other cylinders, and therefore, there is a possibility that it is determined that the air-fuel ratio imbalance among cylinders has not been occurring, due to the effect of the adhering fuel amount.

In view of the above, in the present determining apparatus, it is preferable that the allowing and prohibiting imbalance determining execution means be configured so as to determine whether or not the engine warming-up state has reached a predetermined warming-up state, and so as to prohibit obtaining the imbalance determination parameter or prohibit performing/executing the imbalance determination when it is determined that the engine warming-up state has not yet reached the predetermined warming-up state.

According to the configuration described above, it is possible to reduce a possibility that it is determined, due to the effect of the fuel adhering to the intake passage constituting members, that the air-fuel ratio imbalance among cylinders has not been occurring, even though the fuel injection property of the fuel injector of the specific cylinder is greatly different from the fuel injection property of the fuel injectors of the other cylinders.

In this case, the allowing and prohibiting imbalance determining execution means may be configured so as to obtain a "warming-up state parameter (e.g., temperature of a cooling water of the engine, cooling water temperature) which becomes larger as the engine warming-up state proceeds", and so as to determine that the engine warming-up state has not yet reached the predetermined warming-up state when the obtained warming-up state parameter is smaller than a predetermined warming-up state parameter threshold.

Further, it is preferable that the imbalance determination parameter obtaining means include second parameter correction means for correcting, based on the obtained warming-up state parameter, the imbalance determination parameter so as to obtain the imbalance determination parameter used for the imbalance determination. This correction is effectively made when the obtained warming-up state parameter is larger than the warming-up state parameter threshold.

The configuration described above allows to correct the imbalance determination parameter so that the imbalance determination parameter becomes a value which is not affected by the fuel adhering amount, and accordingly, a value which accurately represents the difference among the individual cylinder air-fuel ratios caused by the difference between (among) the injection properties of the fuel injectors. Consequently, the air-fuel ratio imbalance among cylinders determination can be accurately performed.

Alternatively, it is preferable that the imbalance determining means include second determination threshold correction means for correcting, based on the warming-up state parameter, the imbalance determination threshold. This correction is effectively made when the obtained warming-up state parameter is larger than the warming-up state parameter threshold.

In this manner, in place of (or in addition to) correcting the imbalance determination parameter, correcting, based on the actually obtained warming-up state parameter, the imbalance determination threshold can change the imbalance determination threshold to a value which corresponds to the effect by the fuel adhering amount, even when the imbalance determination parameter is affected by the fuel adhering amount. Consequently, when the difference among the individual cylinder air-fuel ratios due to the difference between (among) the injection properties of the fuel injectors reaches the predetermined value, it can be accurately determined that the air-fuel ratio imbalance among cylinders has been occurring.

It should be noted that "the imbalance determination parameter and/or the imbalance determination threshold" may be corrected based on the evaporated fuel gas purge correction amount and/or the warming-up state parameter, without prohibiting "obtaining the imbalance determination parameter or performing the imbalance determination". According to this configuration, as understood from the description above, the determination as to whether or not the air-fuel ratio imbalance among cylinders has been occurring due to the property of the fuel injector can be accurately carried out, regardless of the evaporated fuel gas and/or the fuel adhering amount.

DESCRIPTION OF THE EMBODIMENT TO CARRY OUT THE INVENTION

An apparatus (hereinafter, simply referred to as a "determining apparatus") for determining an air-fuel ratio imbalance among cylinders according to each of embodiments of the present invention will next be described with reference to the drawings. The determining apparatus is a portion of an air-fuel ratio control apparatus for controlling an air-fuel ratio (air-fuel ratio of the engine) of a mixture supplied to the internal combustion engine, and further, is a fuel injection amount control apparatus for controlling a fuel injection amount.

The determining apparatus according to each of the embodiments obtains, as an imbalance determination parameter, a value (air-fuel ratio changing rate indicating amount) which corresponds to a temporal differentiation value (time-derivative value, detected air-fuel ratio changing rate) of an air-fuel ratio (detected air-fuel ratio) represented by an output value of an air-fuel ratio sensor, and performs/executes a determination of an air-fuel ratio imbalance among cylinders using the imbalance determination parameter.

It should be noted that, the imbalance determination parameter is not limited to the value corresponding to the detected air-fuel ratio changing rate, and may be any parameter as long as the imbalance determination parameter is a parameter, which becomes larger as a degree of an imbalance between air-fuel ratios of mixtures, each supplied to each of at least two or more of cylinders whose exhaust gases reach the air-fuel ratio sensor, becomes larger, and which is calculated based on the output value of the air-fuel ratio sensor.

Specifically, as is clear from FIG. 9 which will be described later, the imbalance determination parameter may be: a trajectory length of the output value of the air-fuel ratio sensor; a trajectory length of the detected air-fuel ratio into which the output value of the air-fuel ratio sensor is converted; a value corresponding to a change rate of the change rate of "the output value of the air-fuel ratio sensor or the detected air-fuel ratio" (i.e., second order temporal differential value of the output value of the air-fuel ratio sensor, or second order temporal differential value of the air-fuel ratio represented by the output value of the air-fuel ratio sensor); a maximum value of "the output value of the air-fuel ratio sensor or the detected air-fuel ratio" in a unit combustion cycle period; or the like. It should be also noted that the imbalance determination parameter may be a parameter which becomes smaller as the degree of the imbalance between air-fuel ratios of mixtures, each supplied to each of the at least two or more of the cylinders whose exhaust gases reach the air-fuel ratio sensor, becomes larger, and which includes an inverse number of the parameters described above, a minimum value of "the output value of the air-fuel ratio sensor or the detected air-fuel ratio" in the unit combustion cycle period, or the like.

First Embodiment

Structure

Figure 1:
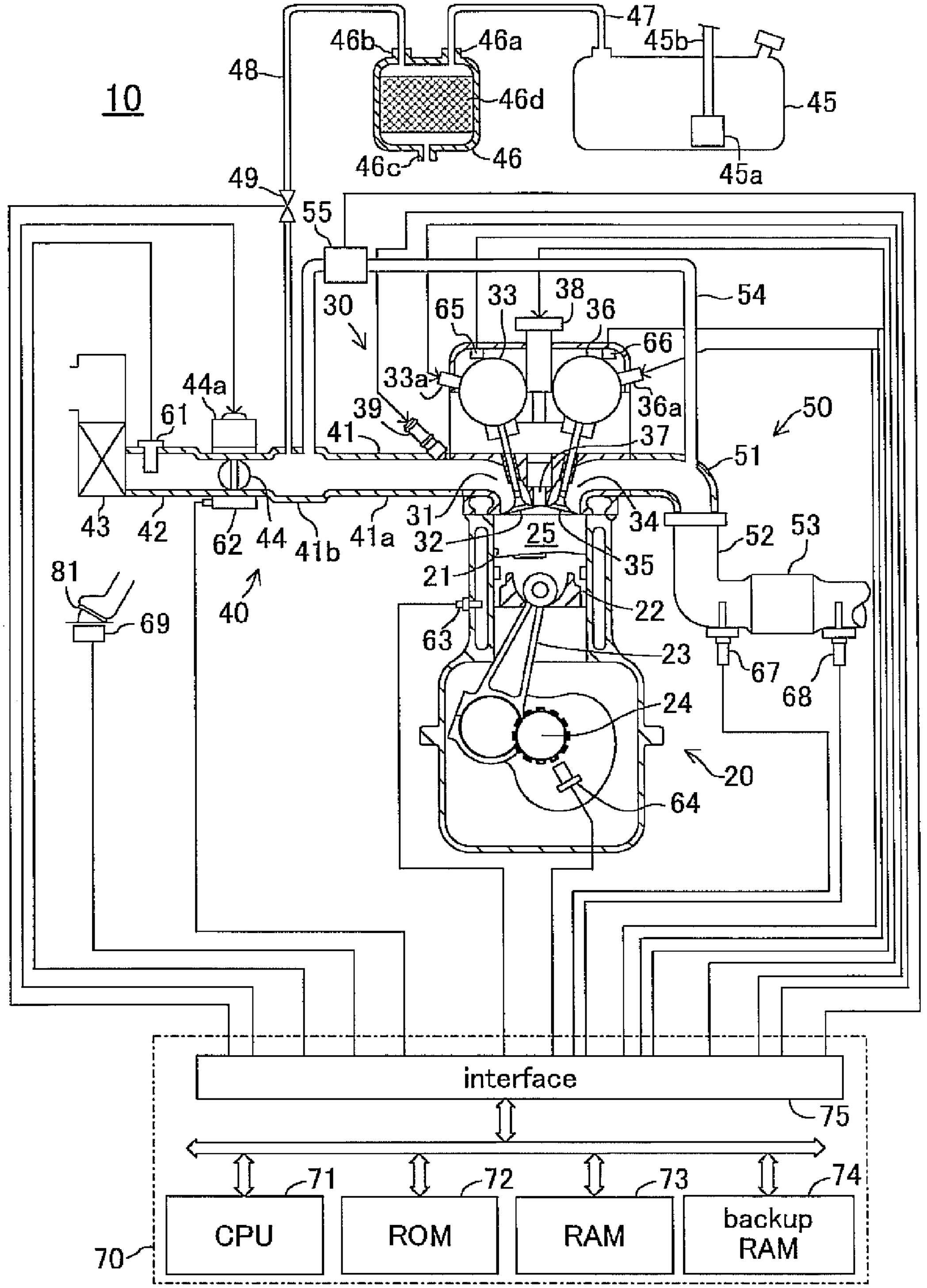
FIG. 1 is a schematic view of an internal combustion engine to which an apparatus for determining an air-fuel ratio imbalance among cylinders according to each of embodiments of the present invention is applied.

FIG. 1 shows a schematic configuration of a system in which a determining apparatus (hereinafter, referred to as a "first determining apparatus") according to the first embodiment is applied to an internal combustion engine 10 which is a 4 cycle, spark-ignition, multi-cylinder (in the present example, in-line 4 cylinder) engine. FIG. 1 shows a section of a specific cylinder only, but each of the other cylinders also have a similar configuration.

The internal combustion engine 10 includes a cylinder block section 20 including a cylinder block, a cylinder block lower-case, an oil pan, and so on; a cylinder head section 30 fixed on the Cylinder block section 20; an intake system 40 for supplying a gasoline mixture to the cylinder block section 20; and an exhaust system 50 for discharging an exhaust gas from the cylinder block section 20 to the exterior of the engine.

The cylinder block section 20 includes cylinders 21, pistons 22, connecting rods 23, and a crankshaft 24. The piston 22 reciprocates within the cylinder 21, and the reciprocating motion of the piston 22 is transmitted to the crankshaft 24 via the connecting rod 23, thereby rotating the crankshaft 24. The bore wall surface of the cylinder 21, the top surface of the piston 22, and the bottom surface of the cylinder head section 30 form a combustion chamber 25.

The cylinder head section 30 includes intake ports 31, each communicating with the combustion chamber 25; intake valves 32 for opening and closing the intake ports 31; a variable intake timing unit 33 including an intake cam shaft to drive the intake valves 32 for continuously changing the phase angle of the intake cam shaft; an actuator 33*a* of the variable intake timing unit 33; exhaust ports 34, each communicating with the combustion chamber 25; exhaust valves 35 for opening and closing the exhaust ports 34; a variable exhaust timing unit 36 including an exhaust cam shaft to drive the exhaust valves 35 for continuously changing the phase angle of the exhaust cam shaft; an actuator 36*a* of the variable exhaust timing unit 36; spark plugs 37; igniters 38, each including an ignition coil for generating a high voltage to be applied to the spark plug 37; and fuel injectors (fuel injection means, fuel supply means) 39 each of which injects a fuel into the intake port 31.

Each of the fuel injectors 39 is provided for each of the combustion chambers 25 of each of the cylinders one by one. Each of the fuel injectors 39 is fixed at each of the intake ports 31. Each of the fuel injector 39 is configured so as to inject, in response to an injection instruction signal, a "fuel of an instructed fuel injection amount included in the injection instruction signal" into the corresponding intake port 31, when the fuel injector 39 is normal. In this way, each of a plurality of the cylinders comprises the fuel injector 39 for supplying the fuel independently from the other cylinders.

The intake system 40 includes an intake manifold 41, an intake pipe 42, an air filter 43, and a throttle valve 44. The intake manifold 41 includes a plurality of branch portions 41*a*, and a surge tank 41*b*. An end of each of a plurality of the branch portions 41*a* is connected to each of the intake ports 31. The other end of each of a plurality of the branch portions 41*a* is connected to the surge tank 41*b*. An end of the intake pipe 42 is connected to the surge tank 41*b*. The air filter 43 is disposed at the other end of the intake pipe 42. The throttle valve 44 is provided in the intake pipe 42, and is configured so as to adjust/vary an opening sectional area of an intake passage. The throttle valve 44 is configured so as to be rotatably driven by the throttle valve actuator 44*a* including a DC motor.

Further, the internal combustion engine 10 includes a fuel tank 45 for storing liquid gasoline fuel; a canister 46 which is capable of adsorbing and storing an evaporated fuel (gas) generated in the fuel tank 45; a vapor collection pipe 47 for introducing a gas containing the evaporated fuel into the canister 46 from the fuel tank 45; a purge passage pipe 48 for introducing, as "an evaporated fuel gas", an evaporated fuel which is desorbed from the canister 46 into the surge tank 41*b*; and a purge control valve 49 disposed in the purge passage pipe 48. The fuel stored in the fuel tank 45 is supplied to the fuel injectors through a fuel pump 45*a*, a fuel supply pipe 45*b*, and the like. The vapor collection pipe 47 and the purge passage pipe 48 forms (constitutes) a "purge passage (purge passage section) for supplying the evaporated fuel gas to an aggregated portion of a plurality of the branch portions 41*a* of the intake manifold 41 (i.e., to the intake passage portion common to each of the cylinders)".

The purge control valve 49 is configured so as to vary a cross-sectional area of a passage formed by the purge passage pipe 48 by adjusting an opening degree (opening period) of the valve 49 based on a drive signal representing a duty ratio DPG which is an instruction signal. The purge control valve 49 fully/completely closes the purge passage pipe 48 when the duty ratio DPG is "0". That is, the purge control valve 49 is configured in such a manner that it is disposed in the purge passage, and its opening degree is varied in response to the instruction signal.

The canister 46 is a well-known charcoal canister. The canister 46 includes a housing which has a tank port 46*a* connected to the vapor collection pipe 47, a purge port 46*b* connected to the purge passage pipe 48, an atmosphere port 46*c* exposed to atmosphere. The canister 46 accommodates/includes, in the housing, adsorbents 46*d* for adsorbing the evaporated fuel.

The canister 46 adsorbs and stores the evaporated fuel generated in the fuel tank 45 while (or during a period for which) the purge control valve 49 is completely closed. The canister 46 discharges the adsorbed/stored evaporated fuel, as the evaporated fuel gas, into the surge tank 41*b* (i.e., into the intake passage at a position downstream of the throttle valve 44) through the purge passage pipe 48 while (or during a period for which) the purge control valve 49 is opened. This allows the evaporated fuel gas to be supplied to each of the combustion chambers 25 through the intake passage of the engine 10. That is, by opening the purge control valve 49, an evaporated fuel gas purge (or an evapo-purge for short) is carried out.

The exhaust system 50 includes an exhaust manifold 51 having a plurality of branch portions having ends, each of which communicates with each of the exhaust ports 34 of each of the cylinders; an exhaust pipe 52 communicating with an aggregated portion (an exhaust gas aggregated portion of the exhaust manifold 51) into which the other ends of a plurality of the branch portions of the exhaust manifold 51 merge (aggregate); an upstream-side catalytic converter 53 disposed in the exhaust pipe 52; and a downstream-side catalytic converter (not shown) disposed in the exhaust pipe 52 at a position downstream of the upstream-side catalytic converter 53. The exhaust ports 34, the exhaust manifold 51, and the exhaust pipe 52 form (constitute) an exhaust passage. In this way, the upstream-side catalytic converter 53 is disposed in the exhaust passage at a "position downstream of the exhaust gas aggregated portion into which exhaust gases discharged from all of the combustion chambers 25 (or at least two or more of the combustion chambers) merge/aggregate.

Each of the upstream-side catalytic converter 53 and the downstream-side catalytic converter is so-called a three-way catalytic unit (exhaust gas purifying catalyst) which supports active components formed of noble (precious) metals such as Platinum. Each catalytic converter has a function for oxidizing unburnt substances (HC, CO, $H_2$, and so on) and reducing nitrogen oxide (NOx) simultaneously, when an air-fuel ratio of a gas flowing into the catalytic converter is equal to the stoichiometric air-fuel ratio. This function is referred to as a catalytic function. Further, each catalytic converter has an oxygen storage function for storing oxygen. The oxygen storage function allows the catalytic converter to purify unburnt substances and nitrogen oxide, even when the air-fuel ratio deviates from the stoichiometric air-fuel ratio. The oxygen storage function is given by ceria ($CeO_2$) supported in the catalytic converter.

Further, the engine 10 includes an exhaust gas recirculation system. The exhaust gas recirculation system includes exhaust gas recirculation pipe 54 forming an external EGR passage, and an EGR valve 55.

One end of the exhaust gas recirculation pipe 54 is connected to the aggregated portion of the exhaust manifold 51. The other end of the exhaust gas recirculation pipe 54 is connected to the surge tank 41*b*.

The EGR valve 55 is disposed in the exhaust gas recirculation pipe 54. The EGR valve 55 includes a DC motor as a drive source. The EGR valve 55 changes valve opening (degree) in response to a duty ratio DEGR which is an instruction signal to the DC motor, to thereby vary a cross-sectional area of the exhaust gas recirculation pipe 54.

The system includes a hot-wire air flowmeter 61, a throttle position sensor 62; a water temperature sensor 63; a crank position sensor 64, an intake cam position sensor 65, an exhaust cam position sensor 66, an upstream air-fuel ratio sensor 67, a downstream air-fuel ratio sensor 68, and an accelerator opening sensor 69.

The air flowmeter 61 outputs a signal indicative of a mass flow rate (intake air flow rate) Ga of an intake air flowing through the intake pipe 42.

The throttle position sensor 62 detects an opening (degree) of the throttle valve 44 to output a signal indicative of the throttle valve opening angle TA.

The water temperature sensor 63 detects a temperature of the cooling water of the internal combustion engine 10 to output a signal indicative of a cooling-water temperature THW.

The crank position sensor 64 outputs a signal which has a narrow pulse every 10° rotation of the crank shaft 24 and a wide pulse every 360° rotation of the crank shaft 24. The signal is converted into an engine rotational speed NE by the electric controller 70 described later.

The intake cam position sensor 65 generates a single pulse signal every time the intake cam shaft rotates by 90 degrees, further 90 degrees, and further 180 degrees from a predetermined angle. The electric controller 70 described later obtains an absolute crank angle CA from a compression top dead center of a reference cylinder (e.g., first cylinder), based on the signals from the crank position sensor 64 and the intake cam position sensor 65. The absolute crank angle CA is set to (at) "0° crank angle" at the compression top dead center of the reference cylinder, increases in response to a rotation angle of the crank shaft up to 720° crank angle, and is again set to (at) the "0° crank angle" at the 720° crank angle.

The exhaust cam position sensor 66 generates a single pulse signal every time the exhaust cam shaft rotates by 90 degrees, further 90 degrees, and further 180 degrees from a predetermined angle.

Figure 2:
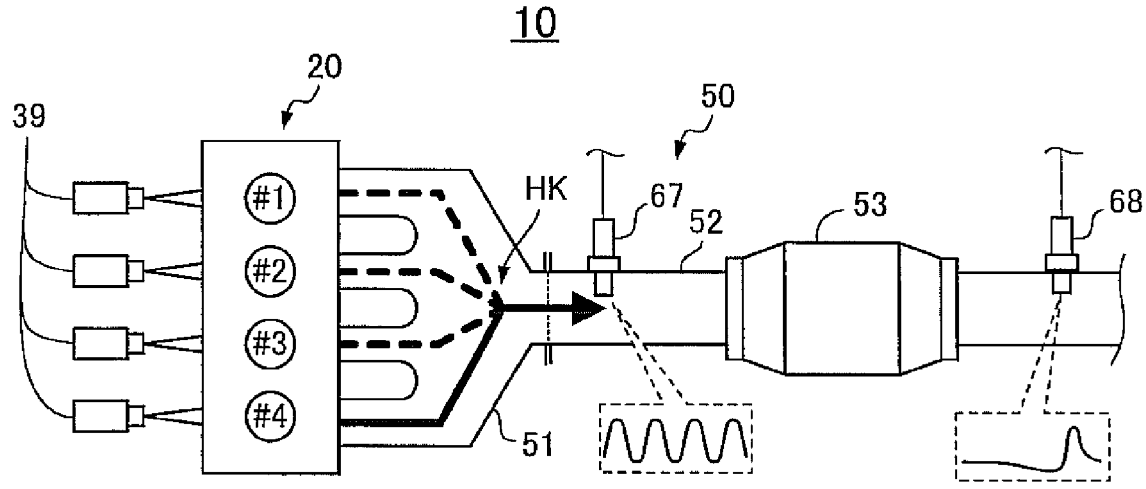
FIG. 2 is a schematic plan view of the engine shown in FIG. 1.

As shown in FIG. 2 illustrating a schematic view of the engine 10, the upstream air-fuel ratio sensor (the air-fuel ratio sensor in the present invention) 67 is disposed in either one of "the exhaust manifold 51 and the exhaust pipe 52 (that is, in the exhaust passage), and at a position between the aggregated portion HK (exhaust gas aggregated portion) of the exhaust manifold 51 and the upstream-side catalytic converter 53. The upstream air-fuel ratio sensor 67 is a "wide range air-fuel ratio sensor of a limiting current type having a diffusion resistance layer", which is described in, for example, Japanese Patent Application Laid-Open (kokai) No. Hei 11-72473, Japanese Patent Application Laid-Open No. 2000-65782, and Japanese Patent Application Laid-Open No. 2004-69547, etc.

Figure 3:
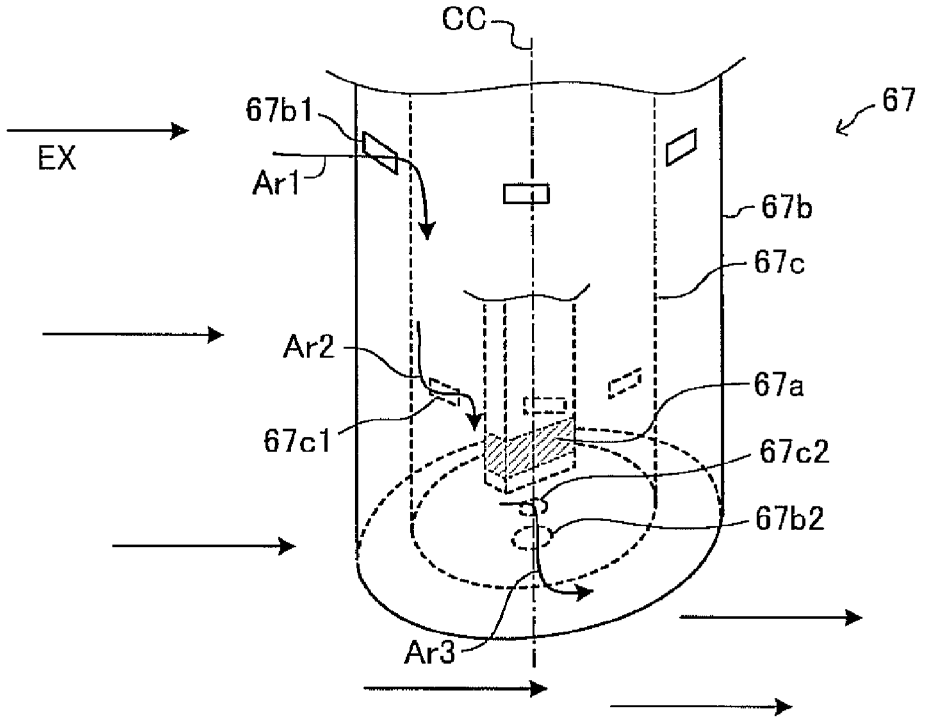
FIG. 3 is a partial schematic perspective view of an air-fuel ratio sensor (upstream air-fuel ratio sensor) shown in FIGS. 1 and 2.
Figure 4:
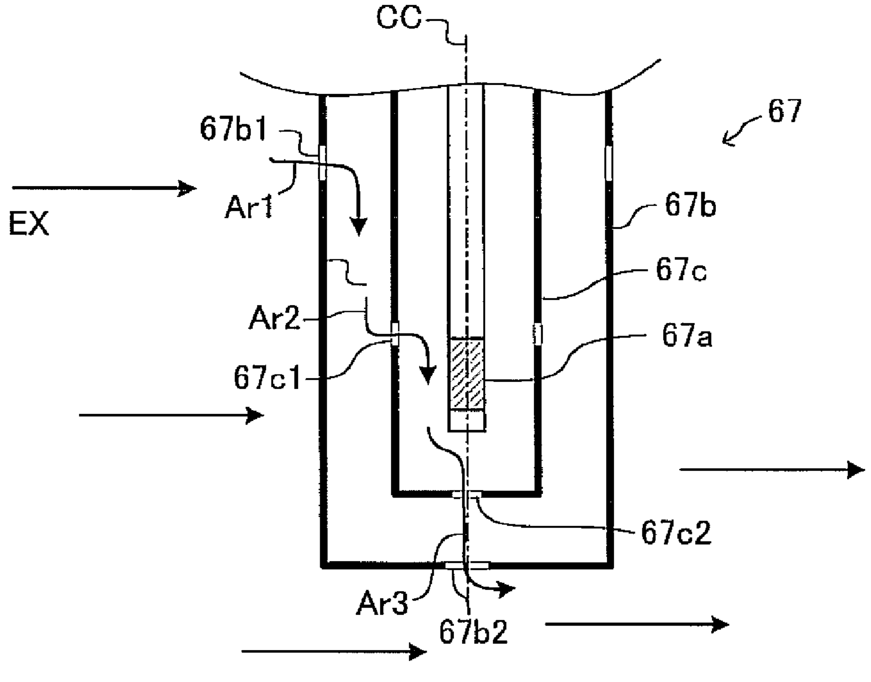
FIG. 4 is a partial sectional view of the air-fuel ratio sensor shown in FIGS. 1 and 2.

As shown in FIGS. 3 and 4, the upstream air-fuel ratio sensor 67 comprises an air-fuel ratio detecting element 67*a*, an outer protective cover 67*b*, and an inner protective cover 67*c*.

The outer protective cover 67*b* has a hollow cylindrical body made of a metal. The outer protective cover 67*b* accommodates the inner protective cover 67*c* in its inside so as to cover the inner protective cover 67*c*. The outer protective cover 67*b* comprises a plurality of inflow holes 67*b*1 at its side surface. The inflow hole 67*b*1 is a through-hole which allows the exhaust gas EX (the exhaust gas outside of the outer protective cover 67*b*) passing through the exhaust gas passage to flow into the inside of the outer protective cover 67*b*. Further, the outer protective cover 67*b* has outflow holes 67*b*2 which allow the exhaust gas inside of the outer protective cover 67*b* to flow out to the outside (the exhaust gas passage) of the outer protective cover 67*b*, at a bottom surface of it.

The inner protective cover 67*c* is made of a metal and has a hollow cylindrical body having a diameter smaller than a diameter of the outer protective cover 67*b*. The inner protective cover 67*c* accommodates the air-fuel ratio detecting element 67*a* in its inside so as to cover the air-fuel ratio detecting element 67*a*. The inner protective cover 67*c* comprises a plurality of inflow holes 67*c*1 at its side surface. The inflow hole 67*c*1 is a through-hole which allows the exhaust gas flowing into a "space between the outer protective cover 67*b* and the inner protective cover 67*c*" through the inflow holes 67*b*1 of the outer protective cover 67*b* to further flow into the inside of the inner protective cover 67*c*. In addition, the inner protective cover 67*c* has outflow holes 67*c*2 which allow the exhaust gas inside of the inner protective cover 67*c* to flow out to the outside of the inner protective cover 67*c*, at a bottom surface of it.

Figure 5:
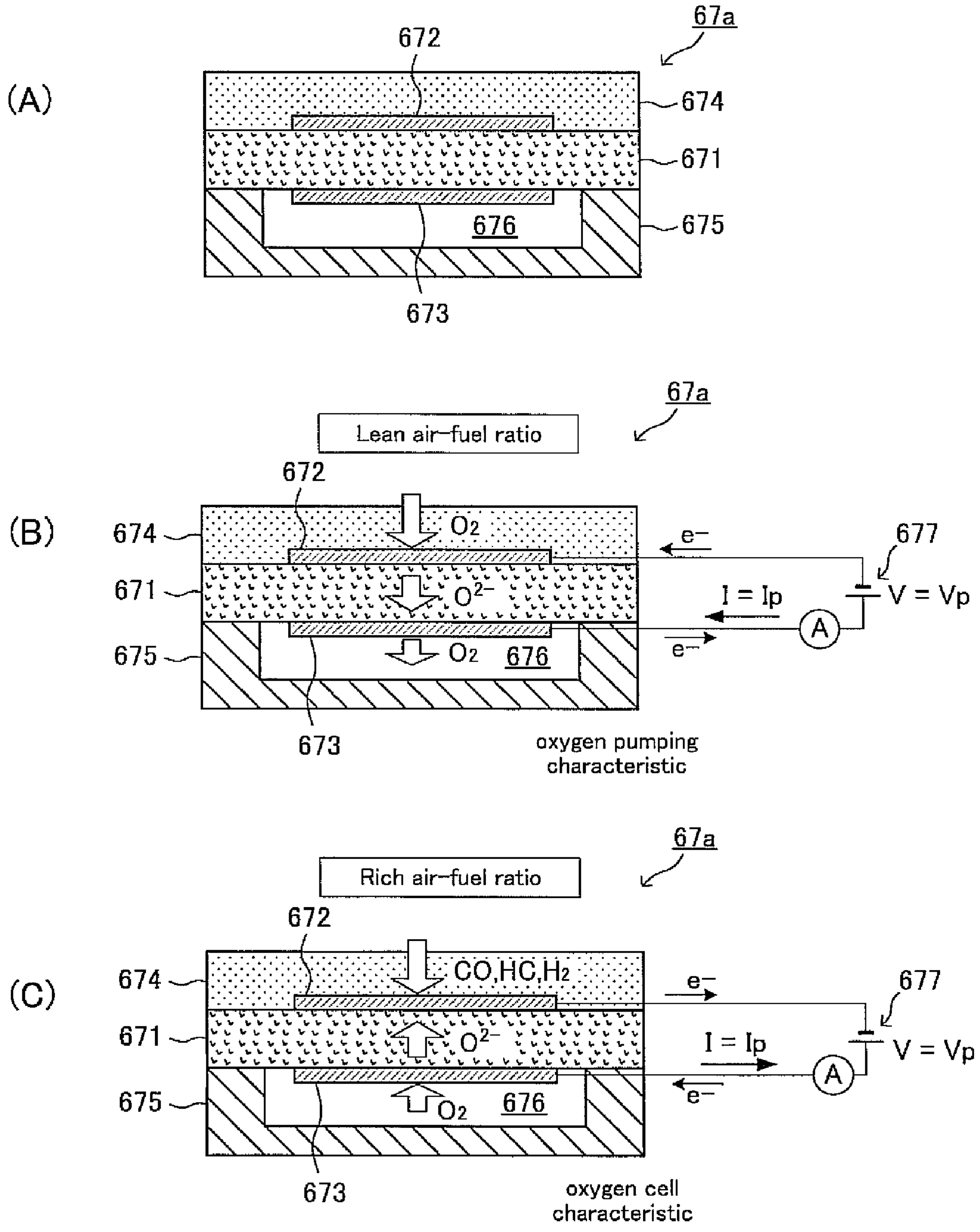
FIG. 5 includes (A) to (C), each of which is a schematic sectional view of an air-fuel ratio detecting element of the air-fuel ratio sensor shown in FIGS. 1 and 2.

As shown in (A)-(C) of FIG. 5, the air-fuel ratio detecting element 67*a* includes a solid electrolyte layer 671, an exhaust-gas-side electrode layer 672, an atmosphere-side electrode layer 673, a diffusion resistance layer 674, and a wall section 675.

The solid electrolyte layer 671 is an oxide sintered body having oxygen ion conductivity. In the present example, the solid electrolyte layer 671 is a "stabilized zirconia element" in which CaO as a stabilizing agent is solid-solved in $ZrO_2$ (zirconia). The solid electrolyte layer 671 exerts a well-known "oxygen cell characteristic" and a well-known "oxygen pumping characteristic", when a temperature of the solid electrolyte layer 671 is higher than or equal to an activating temperature.

The exhaust-gas-side electrode layer 672 is made of a precious metal such as Platinum (Pt) which has a high catalytic activity. The exhaust-gas-side electrode layer 672 is formed on one of the surfaces of the solid electrolyte layer 671. The exhaust-gas-side electrode layer 672 is formed by chemical plating and the like in such a manner that it has an adequately high permeability (i.e., it is porous).

The atmosphere-side electrode layer 673 is made of a precious metal such as Platinum (Pt) which has a high catalytic activity. The atmosphere-side electrode layer 673 is formed on the other one of the surfaces of the solid electrolyte layer 671 in such a manner that it faces (opposes) to the exhaust-gas-side electrode layer 672 to sandwich the solid electrolyte layer 671 therebetween. The atmosphere-side electrode layer 673 is formed by chemical plating and the like in such a manner that it has an adequately high permeability (i.e., it is porous).

The diffusion resistance layer (diffusion rate limiting layer) 674 is made of a porous ceramic (a heat resistant inorganic substance). The diffusion resistance layer 674 is formed so as to cover an outer surface of the exhaust-gas-side electrode layer 672 by, for example, plasma spraying, and the like.

The wall section 675 is made of a dense alumina ceramics through which gases cannot pass. The wall section 675 is configured so as to form an "atmosphere chamber 676" which is a space that accommodates the atmosphere-side electrode layer 673. An air is introduced into the atmosphere chamber 676.

An electric power supply 677 is connected to the upstream air-fuel ratio sensor 67. The electric power supply 677 applies an electric voltage V in such a manner that an electric potential of the atmosphere-side electrode layer 673 is higher than an electric potential of the exhaust-gas-side electrode layer 672.

Figure 6:
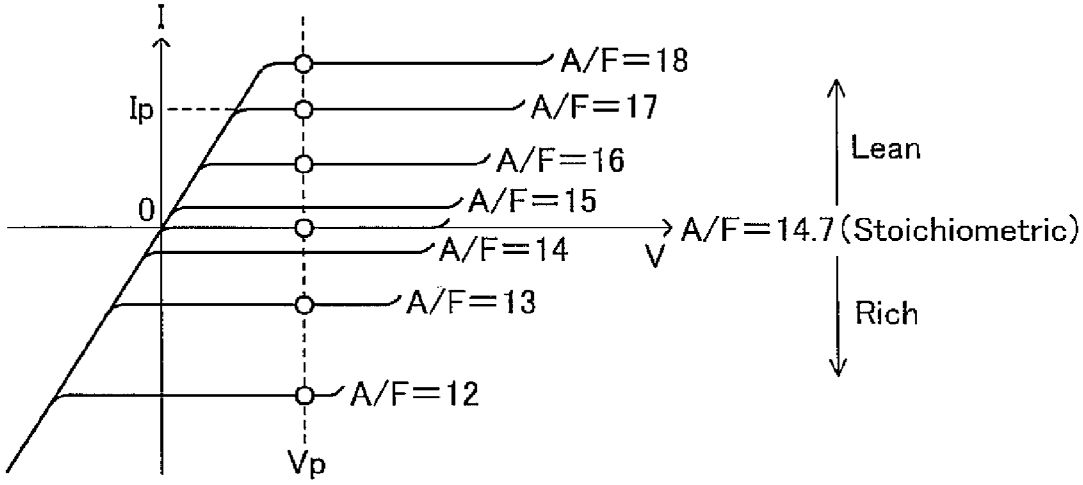
FIG. 6 is a graph showing a relationship between an air-fuel ratio of an exhaust gas and a limiting current value of the air-fuel ratio sensor.

As shown in (B) of FIG. 5, when the air-fuel ratio of the exhaust gas is leaner (larger) than the stoichiometric air-fuel ratio, the thus configured upstream air-fuel ratio sensor 67 ionizes oxygen which has reached the exhaust-gas-side electrode layer 672 through the diffusion resistance layer 674, and makes the ionized oxygen reach the atmosphere-side electrode layer 673. As a result, an electrical current I flows from a positive electrode of the electric power supply 677 to a negative electrode of the electric power supply 677. As shown in FIG. 6, a magnitude of the electrical current I becomes a constant value which is proportional to a concentration (or a partial pressure of oxygen, air-fuel ratio of the exhaust gas) of oxygen arriving at the exhaust-gas-side electrode layer 672, when the electric voltage V is set at (to) a voltage equal to or larger than a predetermined value Vp. The upstream air-fuel ratio sensor 67 outputs a value of a voltage into which the electrical current (i.e., the limiting current Ip) is converted, as its output value Vabyfs.

In contrast, as shown in (C) of FIG. 5, when the air-fuel ratio of the exhaust gas is richer (smaller) than the stoichiometric air-fuel ratio, the upstream air-fuel ratio sensor 67 ionizes oxygen existing in the atmosphere chamber 676 and makes the ionized oxygen reach the exhaust-gas-side electrode layer 672 so as to oxide the unburnt substances (HC, CO, and $H_2$ etc.) reaching the exhaust-gas-side electrode layer 672 through the diffusion resistance layer 674. As a result, an electrical current I flows from the negative electrode of the electric power supply 677 to the positive electrode of the electric power supply 677. As shown in FIG. 6, the magnitude of the electrical current I also becomes a constant value which is proportional to a concentration (air-fuel ratio of the exhaust gas) of the unburnt substances arriving at the exhaust-gas-side electrode layer 672, when the electric voltage V is set at (to) the voltage equal to or larger than a predetermined value Vp. The upstream air-fuel ratio sensor 67 outputs a value of a voltage into which the electrical current (i.e., the limiting current Ip) is converted, as its output value Vabyfs.

Figure 7:
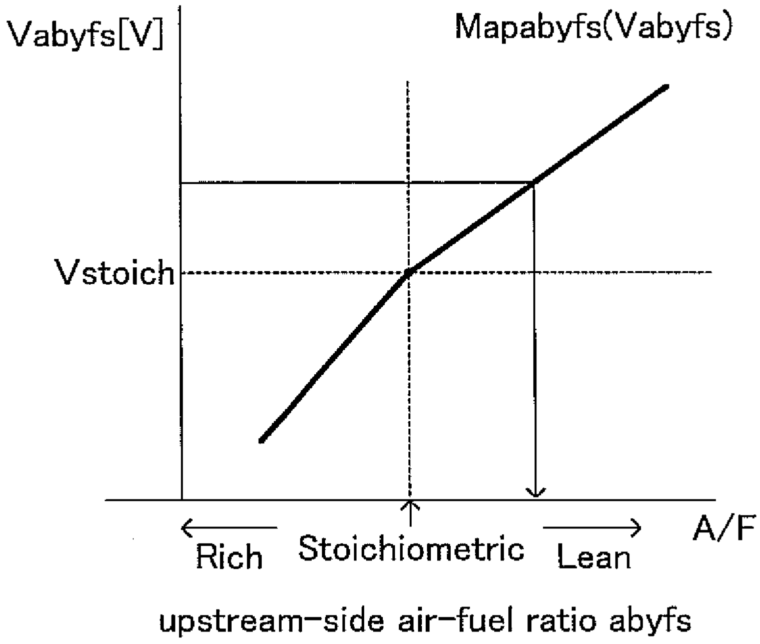
FIG. 7 is a graph showing a relationship between the air-fuel ratio of the exhaust gas and an output value of the air-fuel ratio sensor.

That is, the air-fuel ratio detecting element **67*a*, as shown in FIG. 7, outputs, as an "air-fuel ratio sensor output", the output value Vabyfs in accordance with the air-fuel ratio (an upstream-side air-fuel ratio abyfs, a detected air-fuel ratio abyfs) of the gas, the gas flowing at the position at which the upstream air-fuel ratio sensor 67 is disposed and reaching the air-fuel ratio detecting element 67*a* after passing through the inflow holes 67*b*1 of the outer protective cover 67*b* and the inflow holes 67*c*1 of the inner protective cover 67*c*. The output value Vabyfs becomes larger (increases) as the air-fuel ratio of the gas reaching the air-fuel ratio detecting element 67*a* becomes larger (leaner). That is, the output value Vabyfs is substantially proportional to the air-fuel ratio of the exhaust gas reaching the air-fuel ratio detecting element 67*a***.

The electric controller 70 stores an air-fuel ratio conversion table (map) Mapabyfs shown in FIG. 7, and detects an actual upstream-side air-fuel ratio abyfs (that is, obtains the detected air-fuel ratio abyfs) by applying an actual output value Vabyfs of the air-fuel ratio sensor 67 to the air-fuel ratio conversion table Mapabyfs.

Meanwhile, the upstream air-fuel ratio sensor 67 is disposed in such a manner that the outer protective cover **67*b* is exposed in either the exhaust manifold 51 or the exhaust pipe 52, at the position between the aggregated portion (exhaust gas aggregated/merging portion) HK of a plurality of the branch portions of the exhaust manifold 51 and the upstream-side catalyst 53**.

Specifically, as shown in FIGS. 3 and 4, the air-fuel ratio sensor 67 is disposed in the exhaust gas passage in such a manner that the bottom surface of the protective cover (**67*b*, 67*c*) is parallel to a flow of the exhaust gas EX, and a center line CC of the protective cover (67*b*, 67*c*) is orthogonal to the flow of the exhaust gas EX. This causes the exhaust gas EX in the exhaust gas passage reaching the inflow holes 67*b*1 of the outer protective cover 67*b* to be introduced (sucked) into the outer protective cover 67*b* and the inner protective cover 67*c* owing to a flow of the exhaust gas EX in the exhaust gas passage flowing in the vicinity of the outflow holes 67*b*2 of the outer protective cover 67*b***.

Accordingly, the exhaust gas EX flowing in the exhaust gas passage flows into the space between the outer protective cover **67*b* and the inner protective cover 67*c* via the inflow holes 67*b*1 of the outer protective cover 67*b*, as shown by an arrow Ar1 in FIGS. 3 and 4. Subsequently, the exhaust gas, as shown by an arrow Art, flows into an "inside of the inner protective cover 67*c*" via the "inflow holes 67*c*1 of the inner protective cover 67*c*", and thereafter, reaches the air-fuel ratio detecting element 67*a*. Then, the exhaust gas flows out to the exhaust gas passage via "the outflow holes 67*c*2 of the inner protective cover 67*c* and the outflow holes 67*b* of the outer protective cover 67*b*", as shown by an arrow Ar3**.

Accordingly, a flow rate of the exhaust gas inside of "the outer protective cover **67*b* and the inner protective cover 67*c*" varies depending on a flow rate of the exhaust gas EX flowing in the vicinity of the outflow holes 67*b*2 of the outer protective cover 67*b* (and therefore, depending on the intake air flow rate Ga which is the intake air amount per unit time). In other words, a time period from "a timing when an exhaust gas (a first exhaust gas) having a certain air-fuel ratio reaches the outflow hole 67$b$1" to "a timing when the first exhaust gas reaches the air-fuel ratio detection section 67$a$" varies depending on the intake air flow rate Ga, but does not vary depending on the engine rotational speed NE. This is also true in a case in which the upstream air fuel ratio sensor 67 comprises the inner protective cover 67**$c$ only.

Referring back to FIG. 1 again, the downstream air-fuel ratio sensor 68 is disposed in the exhaust pipe 52, and at a position downstream of the upstream-side catalyst 53 and upstream of the downstream-side catalyst (that is, in the exhaust gas passage between the upstream-side catalyst 53 and the downstream-side catalyst). The downstream air-fuel ratio sensor 68 is a well-known electromotive-force-type oxygen concentration sensor (well-known concentration-cell-type oxygen sensor utilizing a stabilized zirconia). The downstream air-fuel ratio sensor 68 outputs an output value Voxs in accordance with an air-fuel ratio of a gas to be detected, the gas passing through the position at which the downstream air-fuel ratio sensor 68 is disposed in the exhaust gas passage (i.e., the value Voxs is in accordance with an air-fuel ratio of a gas flowing out from the upstream-side catalyst 53 and flowing into the downstream-side catalyst, and therefore, in accordance with a time mean value of an air-fuel ratio of the mixture supplied to the engine).

Figure 8:
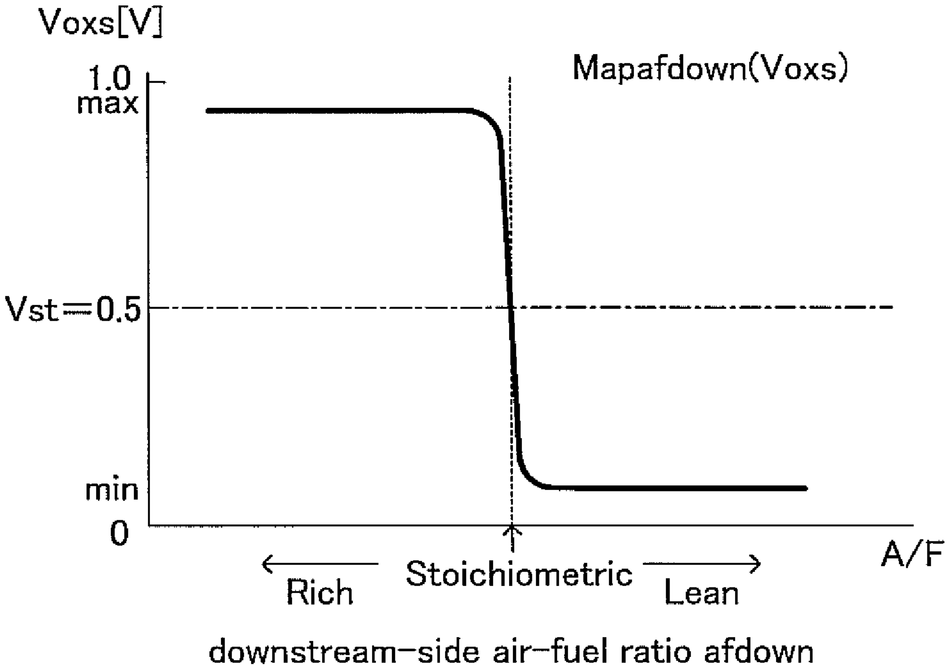
FIG. 8 is a graph showing a relationship between an air-fuel ratio of the exhaust gas and an output value of the downstream air-fuel ratio sensor shown in FIGS. 1 and 2.

As shown in FIG. 8, the output value Voxs becomes equal to a maximum output value max (e.g., about 0.9 V) when the air-fuel ratio of the gas to be detected is richer than the stoichiometric air-fuel ratio, becomes equal to a minimum output value min (e.g., about 0.1 V) when the air-fuel ratio of the gas to be detected is leaner than the stoichiometric air-fuel ratio, and becomes equal to a voltage Vst which is about a middle value between the maximum output value max and the minimum output value min (the middle voltage Vst, e.g., about 0.5 V) when the air-fuel ratio of the gas to be detected is equal to the stoichiometric air-fuel ratio. Further, the output value Voxs varies rapidly from the maximum output value max to the minimum output value min when the air-fuel ratio of the gas to be detected varies from the air-fuel ratio richer than the stoichiometric air-fuel ratio to the air-fuel ratio leaner than the stoichiometric air-fuel ratio, and the output value Voxs varies rapidly from the minimum output value min to the maximum output value max when the air-fuel ratio of the gas to be detected varies from the air-fuel ratio leaner than the stoichiometric air-fuel ratio to the air-fuel ratio richer than the stoichiometric air-fuel ratio.

The accelerator opening sensor 69 shown in FIG. 1 outputs a signal representing an operation amount Accp of an accelerator pedal 81 operated by a driver.

The electric controller 70 is a well-known microcomputer, which includes the following mutually bus-connected elements: "a CPU 71; a ROM 72 in which programs to be executed by the CPU 71, tables (maps, functions), constants, and the like are stored in advance; a RAM 73 in which the CPU 71 temporarily stores data as needed; a backup RAM 74; an interface 75 including an AD converter, and so on".

The backup RAM 74 is configured in such a manner that it is supplied with an electric power from a battery of a vehicle on which the engine 10 is mounted regardless of a position (any one of an off-position, a start-position, an on-position, and the like) of an unillustrated ignition key switch of the vehicle. The backup RAM 74 stores data (data is written into the backup RAM 74) in accordance with an instruction from the CPU 71 and retains (stores) the stored data in such a manner that the data can be read out, while it is supplied with the electric power from the battery. The backup RAM 74 cannot retain the data, while supplying the electric power from the battery is stopped, such as when the battery is taken out from the vehicle. Accordingly, the CPU 71 initializes data to be stored in the backup RAM 74 (or sets the data at default values), when supplying the electric power to the backup RAM 74 is resumed.

The interface 75 is connected to the sensors 61 to 69, and supplies signals from the sensors to the CPU 71. Further, the interface 75 sends drive signals (instruction signals), in accordance with instructions from the CPU 71, to the actuator 33$a$ of the variable intake timing control unit 33, the actuator 36$a$ of the variable exhaust timing control unit 36, each of the igniters 38 of each of the cylinders, each of the fuel injectors 39 provided corresponding to each of the cylinders, the throttle valve actuator 44$a$, the purge control valve 49, and the EGR valve 55, etc. It should be noted that the electric controller 70 sends the instruction signal to the throttle valve actuator 44$a$, in such a manner that the throttle valve opening angle TA is increased as the obtained accelerator pedal operation amount Accp becomes larger.

(Outline of a Determination of an Air-Fuel Ratio Imbalance Among Cylinders)

Next will be described the outline (principle) of the "determination of an air-fuel ratio imbalance among cylinders", which is adopted by the first determining apparatus and the other determining apparatuses according to the other embodiments (hereinafter, referred to as "first determining apparatus and the like"). The determination of the air-fuel ratio imbalance among cylinders in the present invention means determining whether or not the air-fuel ratio non-uniformity among the cylinders due to a change in the property of each of the fuel injection valves 39 becomes greater/larger than or equal to a warning value. In other words, the first determining apparatus and the like determines whether or not the "imbalance among individual cylinder air-fuel-ratios which cannot be permissible in view of the emission" due to a change in the property of each of the fuel injection valves 39 has been occurring, that is, whether or not the air-fuel ratio imbalance among cylinders has been occurring.

The first determining apparatus and the like, in order to perform the determination of the air-fuel ratio imbalance among cylinders, obtains a "change/variation amount per unit time (constant sampling time ts)" of the "air-fuel ratio represented by the output value Vabyfs of the air-fuel ratio sensor 67 (i.e., the detected air-fuel ratio abyfs obtained based on the output value Vabyfs and the air-fuel ratio conversion table Mapabyfs shown in FIG. 7)". This "variation amount per unit time of the detected air-fuel ratio abyfs" can be referred to as a differential value d(abyfs)/dt with respect to time (temporal differentiation value (time-derivative value)) of the detected air-fuel ratio abyfs, when the unit time is an extremely short time such as 4 m seconds. Accordingly, the "variation amount per unit time of the detected air-fuel ratio abyfs" is also referred to as a "detected air-fuel ratio changing rate $\Delta$AF".

Hereinafter, a cylinder to which a mixture is supplied, the mixture having an air-fuel ratio deviating from air-fuel ratios (roughly equal to the stoichiometric air-fuel ratio) of mixtures supplied to the rest of the cylinders, may be referred to as an "imbalance cylinder". An air-fuel ratio of a mixture supplied to the imbalance cylinder may be referred to as an "imbalance cylinder air-fuel ratio". Further, each of the rest of the cylinders (i.e., each of the cylinder other than the imbalance cylinder) may be referred to as a "non-imbalance cylinder" or a "normal cylinder". An air-fuel ratio of a mixture supplied to the non-imbalance cylinder may be referred to as a "non-imbalance cylinder air-fuel ratio" or a "normal cylinder air-fuel ratio".

The exhaust gas from each of the cylinders reaches the air-fuel ratio sensor 67 in order of ignition (and thus, in order of exhaust). When the air-fuel ratio imbalance among cylinders is not occurring, the air-fuel ratios of the exhaust gases, discharged from the cylinders and reaching the air-fuel ratio sensor 67, are substantially equal to each other. Accordingly, for example, the detected air-fuel ratio abyfs represented by the output value of the air-fuel ratio sensor 67 varies as shown by a dotted line C1 in (B) of FIG. 9, when the air-fuel ratio imbalance among cylinders is not occurring. That is, when the air-fuel ratio imbalance among cylinders is not occurring, the wave shape of the output value Vabyfs of the air-fuel ratio sensor 67 is substantially flat. Accordingly, as shown by a dotted line C3 in (C) of FIG. 9, an absolute value of the detected air-fuel ratio changing rate ΔAF is small, when the air-fuel ratio imbalance among cylinders is not occurring.

In contrast, when a property of the "fuel injector 39 for injecting the fuel to a specific cylinder (e.g., the first cylinder)" becomes a property that the "injector injects a greater amount of fuel compared to the instructed fuel injection amount", and thus the air-fuel ratio imbalance state (richer side imbalance state) among cylinders occurs in which only the air-fuel ratio of the specific cylinder deviates toward richer side with respect to the stoichiometric air-fuel ratio, the air-fuel ratio (the imbalance cylinder air-fuel ratio) of an exhaust gas from the specific cylinder differs greatly from an air-fuel ratio (the non-imbalance cylinder air-fuel ratio) of an exhaust gas from a cylinder (non-imbalance cylinder) other than the specific cylinder.

Figure 9:
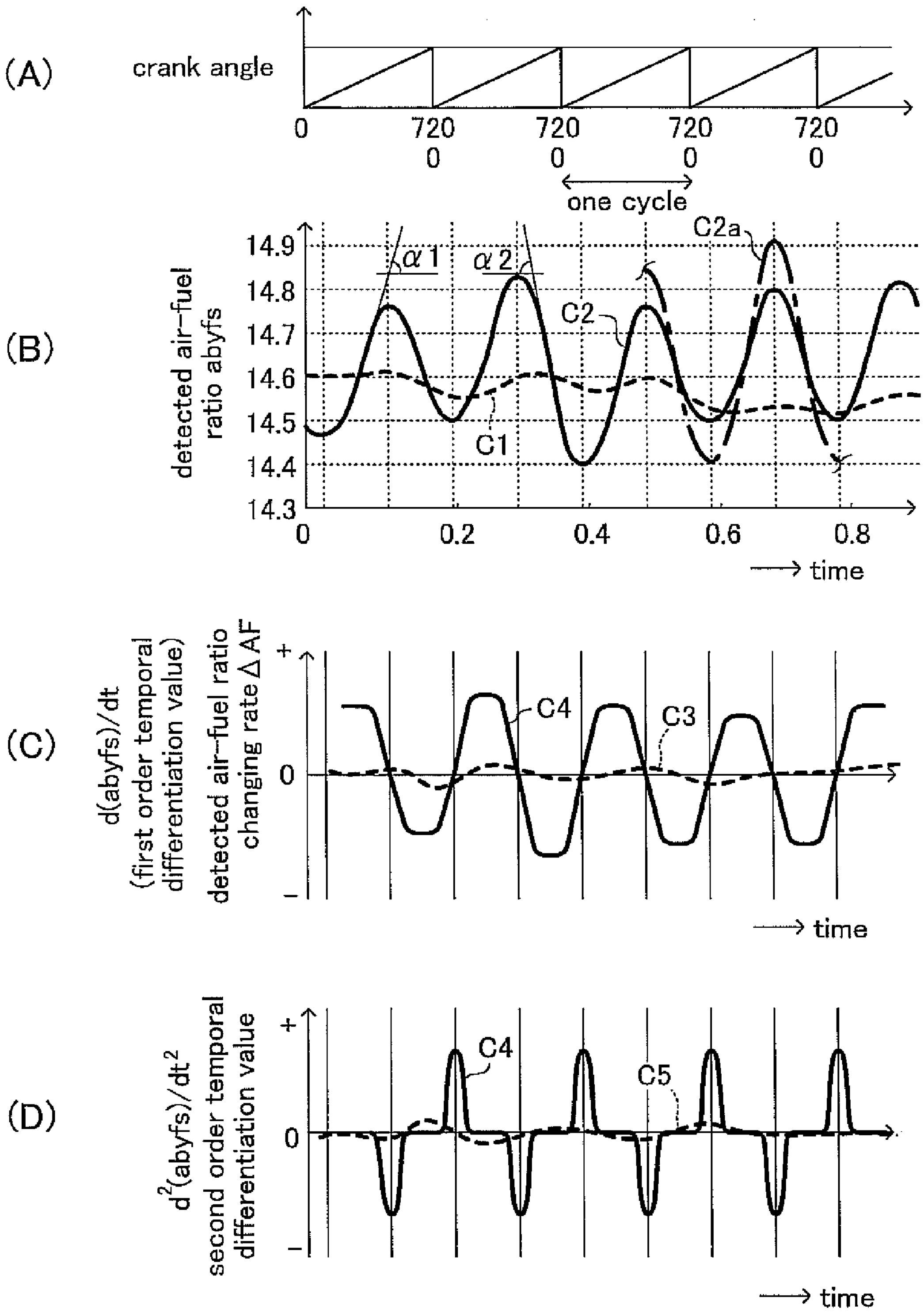
FIGS. 9A-9D are timing charts showing behaviors of values relating to an imbalance determination parameter, when the air-fuel ratio imbalance among cylinders has been occurring and when the air-fuel ratio imbalance among cylinders has not been occurring.

Accordingly, for example, as shown by a solid line C2 in (B) of FIG. 9, the detected air-fuel ratio abyfs when the richer side imbalance state is occurring greatly varies every 720° crank angle for the 4-cylinder, 4-cycle engine (i.e., every crank angles in which every cylinder discharging the exhaust gas reaching the single air-fuel ratio sensor 67 completes one combustion stroke). The absolute value of the detected air-fuel ratio changing rate ΔAF therefore becomes large when the air-fuel ratio imbalance among cylinders is occurring, as shown by a solid line C4 in (C) of FIG. 9.

In addition, the detected air-fuel ratio abyfs varies more greatly as the imbalance cylinder air-fuel ratio deviates more greatly from the non-imbalance cylinder air-fuel ratio. For example, assuming that the detected air-fuel ratio abyfs varies as shown by the solid line C2 in (B) of FIG. 9 when a magnitude of a difference between the imbalance cylinder air-fuel ratio and the non-imbalance cylinder air-fuel ratio is a first value, the detected air-fuel ratio abyfs varies as shown by the alternate long and short dash line C2a in (B) of FIG. 9 when the magnitude of the difference between the imbalance cylinder air-fuel ratio and the non-imbalance cylinder air-fuel ratio is a "second value larger than the first value". Accordingly, the absolute value of the detected air-fuel ratio changing rate ΔAF becomes larger as the imbalance cylinder air-fuel ratio deviates (differs) more greatly from the non-imbalance cylinder air-fuel ratio. It should be noted that, a "time period for which a crank angle passes, the crank angle being necessary for each of the cylinders to complete one combustion stroke, each of the cylinders discharging an exhaust gas which reaches the single air-fuel ratio sensor 67" is also referred to as a "unit combustion cycle period", in the present specification.

In view of the above, the first determining apparatus and the like obtain an "air-fuel ratio changing rate indicating amount which varies depending on (in accordance with) the detected air-fuel ratio changing rate ΔAF (e.g., it obtains an absolute value itself of the detected air-fuel ratio changing rate ΔAF which is obtained every time the sampling time is elapses, an average (mean) value of the absolute value of a plurality of the detected air-fuel ratio changing rates ΔAF, a maximum value among the absolute values of a plurality of the detected air-fuel ratio changing rates ΔAF, or the like)", and compares the air-fuel ratio changing rate indicating amount with an imbalance determination threshold to make a determination of the air-fuel ratio imbalance among cylinders. It should be noted that a "value representing (indicative of) a variation (fluctuation) of the output value Vabyfs or the detected air-fuel ratio abyfs" may be referred to as an air-fuel ratio fluctuation indicating amount AFD.

Further, it is unlikely that the detected air-fuel ratio changing rate ΔAF is affected by the engine rotational speed NE compared to the trajectory length of the detected air-fuel ratio abyfs. The reason for this will be described hereinafter. It should be noted that, in the description below, it is assumed that the imbalance cylinder air-fuel ratio is richer than the non-imbalance cylinder air-fuel ratio.

The air-fuel ratio of the exhaust gas which contacts with the air-fuel ratio detecting element 67*a* coincides with an air-fuel ratio of an exhaust gas in which an "exhaust gas which has newly arrived at the air-fuel ratio detecting element 67*a*" and an "exhaust gas which has been existing in the vicinity of the air-fuel ratio detecting element 67*a*" are mixed. Meanwhile, as described above, the flow rate of the exhaust gas in "the outer protective cover 67*b* and the inner protective cover 67*c*" varies depending on the flow rate of the exhaust gas EX flowing in the vicinity of the outflow holes 67*b*2 of the outer protective cover 67*b* (that is, intake air flow rate Ga), but does not vary depending on the engine rotational speed NE.

Accordingly, when the exhaust gas discharged from the non-imbalance cylinder exists around the air-fuel ratio detecting element 67*a*, and the exhaust gas discharged from the imbalance cylinder starts to reach the air-fuel ratio detecting element 67*a*, the air-fuel ratio of the exhaust gas contacting (reaching) the air-fuel ratio detecting element 67*a* decreases with a "changing rate which becomes larger as the intake air flow rate Ga is larger". Consequently, the detected air-fuel ratio changing rate ΔAF becomes a negative value whose absolute value is large.

Further, when the exhaust gas discharged from the imbalance cylinder exists around the air-fuel ratio detecting element 67*a*, and the exhaust gas discharged from the non-imbalance cylinder starts to reach the air-fuel ratio detecting element 67*a*, the air-fuel ratio of the exhaust gas contacting (reaching) the air-fuel ratio detecting element 67*a* increases with a "changing rate which becomes larger as the intake air flow rate Ga is larger". Consequently, the detected air-fuel ratio changing rate ΔAF becomes a positive value whose absolute value is large.

Meanwhile, a time interval (i.e., air-fuel ratio fluctuation period) of a point in time at which the exhaust gas discharged from the imbalance cylinder starts to reach the inflow holes 67*b*1 becomes shorter as the engine rotational speed NE is larger. However, as described above, the flow rate of the exhaust gas flowing in the outer protective cover 67*b* and the inner protective cover 67*c* is determined according to the flow rate of the exhaust gas EX flowing in exhaust passage, but is not affected by the engine rotational speed NE. Accordingly, even when the engine rotational speed NE changes, the detected air-fuel ratio changing rate ΔAF does not vary as long as the intake air flow rate Ga does not change.

In view of the above, the first determining apparatus and the like obtain, as one of the "imbalance determination parameter", the air-fuel ratio changing rate indicating amount which varies in accordance with the detected air-fuel ratio changing rate ΔAF, determine whether or not the magnitude of the air-fuel ratio changing rate indicating amount is larger than or equal to an "imbalance determination threshold which does not vary depending on the engine rotational speed NE", and determine that the air-fuel ratio imbalance among cylinders has occurred when the magnitude of the air-fuel ratio changing rate indicating amount is larger than or equal to the imbalance determination threshold. Accordingly, the first determining apparatus and the like can perform an "accurate determination of the air-fuel ratio imbalance among cylinders", without determining the imbalance determination threshold for every engine rotational speed NE. It should be noted that the first determining apparatus and the like may obtain another imbalance determination parameter, as described later.

(Avoidance of an Erroneous Determination of the Air-Fuel Ratio Imbalance Among Cylinders)

Meanwhile, an evaporated fuel is generated in the fuel tank 45. The evaporated fuel is adsorbed by the adsorbents **46*d* of the canister 46. However, there is a limit on a maximum amount of adsorption by the adsorbents 46*d*. Accordingly, the electric controller 70 opens the purge control valve 49 when a predetermined purge condition is satisfied, so that the evaporated fuel adsorbed by the adsorbents 46*d* is introduced into the intake passage of the engine 10 as the evaporated fuel gas. That is, a control for supplying the evaporated fuel gas to all of the combustion chambers 25** (so-called "evapo-purge") is carried out.

However, the present inventors have found that, when the evaporated fuel gas is being introduced into the intake passage (i.e., "during the evapo-purge"), the detected air-fuel ratio abyfs (and accordingly, the detected air-fuel ratio changing rate ΔAF and the air-fuel ratio changing rate indicating amount) may sometimes be affected by the evaporated fuel gas, and thus, the imbalance determination parameter may not be able to represent/indicate the "degree of the air-fuel ratio imbalance among cylinders due to the change in the properties of the fuel injectors 39" with high accuracy.

For example, when a concentration of the evaporated fuel gas is extremely high, such as immediately after the engine 10 is started after a parking in the hot sun, and the evaporated fuel gas purge is carried out, the individual cylinder air-fuel ratios are affected by the evaporated fuel gas.

More specifically, it is assumed that the air-fuel ratio imbalance among cylinder has occurred in which the property of the fuel injector 39 of the first cylinder becomes a property that it injects the fuel by an amount 40% greater than the instructed fuel injection amount. It is further assumed that, when an amount of the fuel supplied to the entire engine 10 coincides with 400 (its unit is weight), an average of the air-fuel ratios (air-fuel ratio of the engine) of the mixture supplied to the entire engine 10 coincides with the stoichiometric air-fuel ratio. This assumption is referred to as a "first assumption".

Accordingly, when the stoichiometric air-fuel ratio is equal to 14.7, the intake air amount G (its unit is weight) is equal to 400·14.7, and each of the cylinder intake air amount is equal to 1470 (its unit is weight).

Meanwhile, the first determining apparatus and the like calculate an air-fuel ratio feedback amount in such a manner that the detected air-fuel ratio abyfs represented by the output value of the air-fuel ratio sensor 67 (in actuality, air-fuel ratio for control described later) coincides with the stoichiometric air-fuel ratio which is a target air-fuel ratio, and correct, based on the air-fuel ratio feedback amount, the instructed fuel injection amount which is provided to each of the fuel injectors. Consequently, a total amount of the fuel supplied to an entire engine 10 becomes equal to 400. In this case, the fuel injection amount of each of the fuel injectors is as follows.

A fuel injection amount of the first cylinder injector: 127=400·{1.4/(1.4+1.0+1.0+1.0)}

A fuel injection amount of the second cylinder injector: 91=400·{1.4/(1.4+1.0+1.0+1.0)}

A fuel injection amount of the third cylinder injector: 91=400·{1.0/(1.4+1.0+1.0+1.0)}

A fuel injection amount of the fourth cylinder injector: 91=400·{1.0/(1.4+1.0+1.0+1.0)}

The total amount of the fuel supplied to the entire engine: 400

Accordingly, in the example described above, a difference between the fuel injection amount of the first cylinder which is the imbalance cylinder and each of the fuel injection amounts of the second to fourth cylinders, each being non-imbalance cylinder, is equal to "36 (=127−91)". Further, the air-fuel ratio of the first cylinder which is the imbalance cylinder is equal to 11.6 (=1470/127), and the air-fuel ratio of each of the second to fourth cylinders, each of which is the non-imbalance cylinder, is equal to 16.2 (=1470/91).

In contrast, it is assumed that, when the air-fuel ratio imbalance among cylinder described above is occurring, 100 (its unit is weight) of a fuel is supplied to the engine 10 by the evaporated fuel gas, and the evaporated fuel gas is distributed into each of the cylinders uniformly (evenly). This assumption is referred to as a "second assumption".

In this case, 25 (=100/4) (its unit is weight) of the fuel by the evaporated fuel gas is supplied to each of the cylinders. That is, an amount of the evaporated fuel gas which corresponds to "25% of the fuel injection amount" is supplied to each of the cylinders. Under this state, when the average of the air-fuel ratio of the engine 10 coincides with the stoichiometric air-fuel ratio owing to the air-fuel ratio feedback control described above (i.e., when the total amount of the fuel supplied to the entire engine 10 becomes equal to 400), the fuel injection amount of each of the cylinder is as follows.

A fuel injection amount of the first cylinder injector: 96=(400−100)·{1.41(1.4+1.0+1.0+1.0)}

A fuel injection amount of the second cylinder injector: 68=(400−100)·{1.0/(1.4+1.0+1.0+1.0)}

A fuel injection amount of the third cylinder injector: 68=(400−100)·{1.0/(1.4+1.0+1.0+1.0)}

A fuel injection amount of the fourth cylinder injector: 68=(400−100)·{1.0/(1.4+1.0+1.0+1.0)}

An amount of the fuel supplied to the engine by the evaporated fuel gas: 100

A total amount of the fuel supplied to the entire engine: 400

Accordingly, the fuel amount supplied to each of the cylinders is as follows under the assumption 2.

An amount of the fuel supplied to the first cylinder: 121=96+25

An amount of the fuel supplied to the second cylinder: 93=68+25

An amount of the fuel supplied to the third cylinder: 93=68+25

An amount of the fuel supplied to the fourth cylinder: 93=68+25

A total amount of the fuel supplied to the entire engine: 400

Under the assumption 2, the difference between the fuel injection amount of the first cylinder which is the imbalance cylinder and each of the fuel injection amounts of the second to fourth cylinders, each being non-imbalance cylinder, is equal to "28 (=96−68)". Further, under the assumption 2, when ignoring an amount of air included in the evaporated fuel gas, the air-fuel ratio of the first cylinder which is the imbalance cylinder is equal to 12.1 (=1470/121), and the air-fuel ratio of each of the second to fourth cylinders, each of which is the non-imbalance cylinder, is equal to 15.8 (=1470/93).

As is clear from the description above under the assumption 1 and the assumption 2, the difference between the fuel injection amount of the first cylinder which is the imbalance cylinder and each of the fuel injection amounts of the second to fourth cylinders, each being non-imbalance cylinder, is equal to 36 when the evaporated fuel gas purge is not being carried out, and is equal to 28 when the evaporated fuel gas purge is being carried out. In addition, under the assumption 1 and the assumption 2, the difference between the air-fuel ratio of the first cylinder which is the imbalance cylinder and the air-fuel ratio of each of the second to fourth cylinders, each being non-imbalance cylinder, is equal to an "air-fuel ratio difference 4.6 (=16.2−11.6)" when the evaporated fuel gas purge is not being carried out, and is equal to an "air-fuel ratio difference 3.7 (=15.8−12.1)" when the evaporated fuel gas purge is being carried out.

As is understood from the example described above, even when a property of a fuel injector of a specific cylinder is a property which causes the air-fuel ratio imbalance whose degree is the same (in the above example, when the injector of the first cylinder becomes in the state in which the injector of the first cylinder injects the fuel by the amount which is 40% greater than the amount of the fuel which each of the fuel injectors of the other cylinders injects), the difference between the fuel injection amount of the imbalance cylinder and the fuel injection amount of the non-imbalance cylinder when the evaporated fuel gas is not being introduced into each of the cylinders differs from the difference when the evaporated fuel gas is being introduced into each of the cylinders, and accordingly, the difference between the amount of the fuel supplied to the imbalance cylinder and the amount of the fuel supplied to the non-imbalance cylinder when the evaporated fuel gas is not being introduced into each of the cylinders differs from the difference between the amount of the fuel supplied to the imbalance cylinder and the amount of the fuel supplied to the non-imbalance cylinder when the evaporated fuel gas is being introduced into each of the cylinders. That is, due to the effect of the evaporated fuel gas, the difference between the air-fuel ratio of the imbalance cylinder and the air-fuel ratio of the non-imbalance cylinder changes. Accordingly, if the determination is made as to whether or not the "air-fuel ratio imbalance among cylinders due to the change in the property of the fuel injector" is occurring without considering the effect of the evaporated fuel gas, the determination may be incorrect.

In view of the above, the first determining apparatus determines whether or not a state (evaporated fuel gas effect occurring state) is occurring in which the "evaporated fuel gas flowing into the intake passage causes the imbalance determination parameter to change by an amount larger than or equal to a predetermined allowable amount". In other words, the first determining apparatus determines whether or not an amount of the fuel included in the evaporated fuel gas flowing into the intake passage is larger than or equal to a predetermined threshold, and determines that the evaporated fuel gas effect occurring state is occurring when the amount of the fuel included in the evaporated fuel gas flowing into the intake passage is larger than or equal to the predetermined threshold. Further, the first determining apparatus, when it is determined that the evaporated fuel gas effect occurring state is occurring, prohibits obtaining the imbalance determination parameter or prohibits performing/executing the air-fuel ratio among cylinder determination itself, so as to substantially prohibit performing/executing the air-fuel ratio among cylinder determination. In contrast, the first determining apparatus, when it is determined that the evaporated fuel gas effect occurring state is not occurring, allows to obtain the imbalance determination parameter and to perform/execute the air-fuel ratio among cylinder determination.

More specifically, the first determining apparatus calculates a purge correction amount based on the output value Vabyfs of the air-fuel ratio sensor 67. The purge correction amount is a part (portion) of a feedback correction amount which is for having the air-fuel ratio calculated based on the output value Vabyfs of the air-fuel ratio sensor 67 coincide with a target air-fuel ratio (in this case, the stoichiometric air-fuel ratio), and is an amount calculated so as to compensate for (or suppress) a change in the air-fuel ratio of the engine due to the evaporated fuel gas purge. Then, the first determining apparatus is configured so as to determine that the "evaporated fuel gas effect occurring state is occurring" when a magnitude of a difference between the purge correction amount and a reference value of the evaporated fuel gas purge correction amount is larger than a predetermined purge effect determining threshold.

(Actual Operation)

The actual operation of the first determining apparatus will next be described.

<Fuel Injection Amount Control>

The CPU 71 repeatedly executes a routine shown in FIG. 10, to calculate an instructed fuel injection amount Fi and instruct a fuel injection, every time the crank angle of any one of the cylinders reaches a predetermined crank angle before its intake top dead center (e.g., BTDC 90° CA), for the cylinder (hereinafter, referred to as a "fuel injection cylinder") whose crank angle has reached the predetermined crank angle.

Accordingly, at an appropriate timing, the CPU 71 starts a process from step 1000, and performs processes from step 1010 to step 1030 in this order, and thereafter, proceeds to step 1040.

Step 1010: The CPU 71 obtains a "cylinder intake air amount Mc(k)" at the present time, by applying the "intake air flow rate Ga measured by the air flowmeter 61, and the engine rotational speed NE" to a look-up table MapMc. The table MapMc defines in advance a relationship between "the intake air flow rate Ga, and the engine rotational speed NE" and "the cylinder intake air amount Mc". That is, step 1010 constitutes means for obtaining a cylinder intake air amount.

Step 1020: The CPU 71 reads out (fetches) a learning value of a main feedback amount (main FB learning value) KG from the backup RAM 74. The main FB learning value KG is separately obtained by a "main feedback learning routine" shown in FIG. 12 described later, and is stored in the backup RAM 74.

Step 1030: The CPU 71 obtains a base fuel injection amount Fb(k) according to a formula (1) described below. That is, the CPU 71 obtains the base fuel injection amount Fb(k) by dividing the cylinder intake air amount Mc(k) by a target upstream-side air-fuel ratio abyfr at the present time. The target upstream-side air-fuel ratio abyfr is set to (at) the stoichiometric air-fuel ratio. The base fuel injection amount Fb(k) is stored in the RAM 73 with information indicating the each corresponding intake stroke. It should be noted that the target upstream-side air-fuel ratio abyfr may be set to (at) an air-fuel ratio richer than the stoichiometric air-fuel ratio in a specific case, such as an engine warming-up period, a period of increasing of fuel after fuel cut control, and a period of increasing of fuel for preventing catalytic converter overheat.

$$Fb(k)=Mc(k)/abyfr \quad (1)$$

Thereafter, the CPU 71 proceeds to step 1040 to determine whether or not a duty ratio DPG for the instruction signal (drive signal) to the purge control valve 49 is "0". The duty ratio DPG is determined by a routine described later.

It is assumed that the duty ratio DPG is "0". That is, it is assumed that the evaporated fuel gas purge is not being carried out. In this case, the CPU 71 makes a "Yes" determination at step 1040 to perform processes from step 1050 to step 1070 in this order, and proceeds to step 1095 to end the present routine tentatively.

Step 1050: The CPU 71 sets a value of the purge correction coefficient (purge correction amount) FPG to (at) "1".

Step 1060: The CPU 71 corrects the base fuel injection amount Fb(k) according to a formula (2) described below to obtain a final fuel injection amount (instructed fuel injection amount, instruction injection amount) Fi. It should be noted that a main feedback coefficient FAF used in the formula (2) is obtained by a "main feedback control routine" shown in FIG. 11 described later.

$$Fi=KG\cdot FPG\cdot FAF\cdot Fb(k) \tag{2}$$

As is clear from the formula (2), when the main feedback coefficient FAF serving as the main feedback amount is equal to "1", the main feedback coefficient FAF does not correct the base fuel injection amount (Fb(k)). That is, a reference (base) value of the main feedback coefficient FAF is equal to "1". Similarly, when the purge correction coefficient FPG serving as the purge correction amount is equal to "1", the purge correction coefficient FPG does not correct the base fuel injection amount (Fb(k)). That is, a reference (base) value of the purge correction coefficient FPG is equal to "1".

Step 1070: The CPU 71 sends an instruction signal to the fuel injector 39 disposed so as to correspond to the fuel injection cylinder in order for a fuel of the instructed fuel injection amount Fi to be injected from the fuel injector 39.

In this way, the instructed fuel injection amount Fi is calculated by correcting the base fuel injection amount Fb by (with) the main feedback coefficient FAF, the purge correction coefficient FPG, and the like, and the fuel whose amount is equal to the instructed fuel injection amount Fi is injected for the fuel injection cylinder, when the fuel injector 39 is normal.

On the other hand, when the CPU 71 executes the process of step 1040 and the duty ratio DPG is not equal to "0", the CPU 71 makes a "No" determination at step 1040 to proceed to step 1080 at which the CPU 71 obtains the purge correction coefficient FPG according to a formula (3) described below.

$$FPG=1+PGT(FGPG-1) \tag{3}$$

In the formula (3), PGT is a target purge rate PGT. The target purge rate PGT is obtained, at step 1330 shown in FIG. 13 described later, based on a "parameter indicative of an operating state (condition) of the engine 10" and the "number of times CFGPG of update opportunity for an evaporated fuel gas concentration learning value FGPG (the number of times CFGPG of update opportunity for concentration learning value)" described later. The evaporated fuel gas concentration learning value FGPG is obtained in a routine shown in FIG. 14 described later.

Thereafter, the CPU 71 executes the processes of step 1060 and step 1070. Accordingly, when the duty ratio DPG is not equal to "0" (i.e., when the evaporated fuel gas purge is being carried out), the base fuel injection amount (Fb(k)) is corrected by (with) the purge correction coefficient FPG. As is apparent from the formula (2), the base fuel injection amount (Fb(k)) is corrected by (with) the main feedback coefficient FAF and the purge correction coefficient FPG. Both the main feedback coefficient FAF and the purge correction coefficient FPG are a "feedback amount obtained, based on the output value Vabyfs of the air-fuel ratio sensor 67, in such a manner that the average of air-fuel ratio of the mixture supplied to the engine 10 coincides with the stoichiometric air-fuel ratio (target air-fuel ratio)". In other words, the purge correction coefficient FPG constitutes a part (portion) of the "feedback amount obtained, based on the detected air-fuel ratio abyfs, in such a manner that the average of air-fuel ratio of the mixture supplied to the engine 10 coincides with the stoichiometric air-fuel ratio".

<Main Feedback Control>

Figure 10:
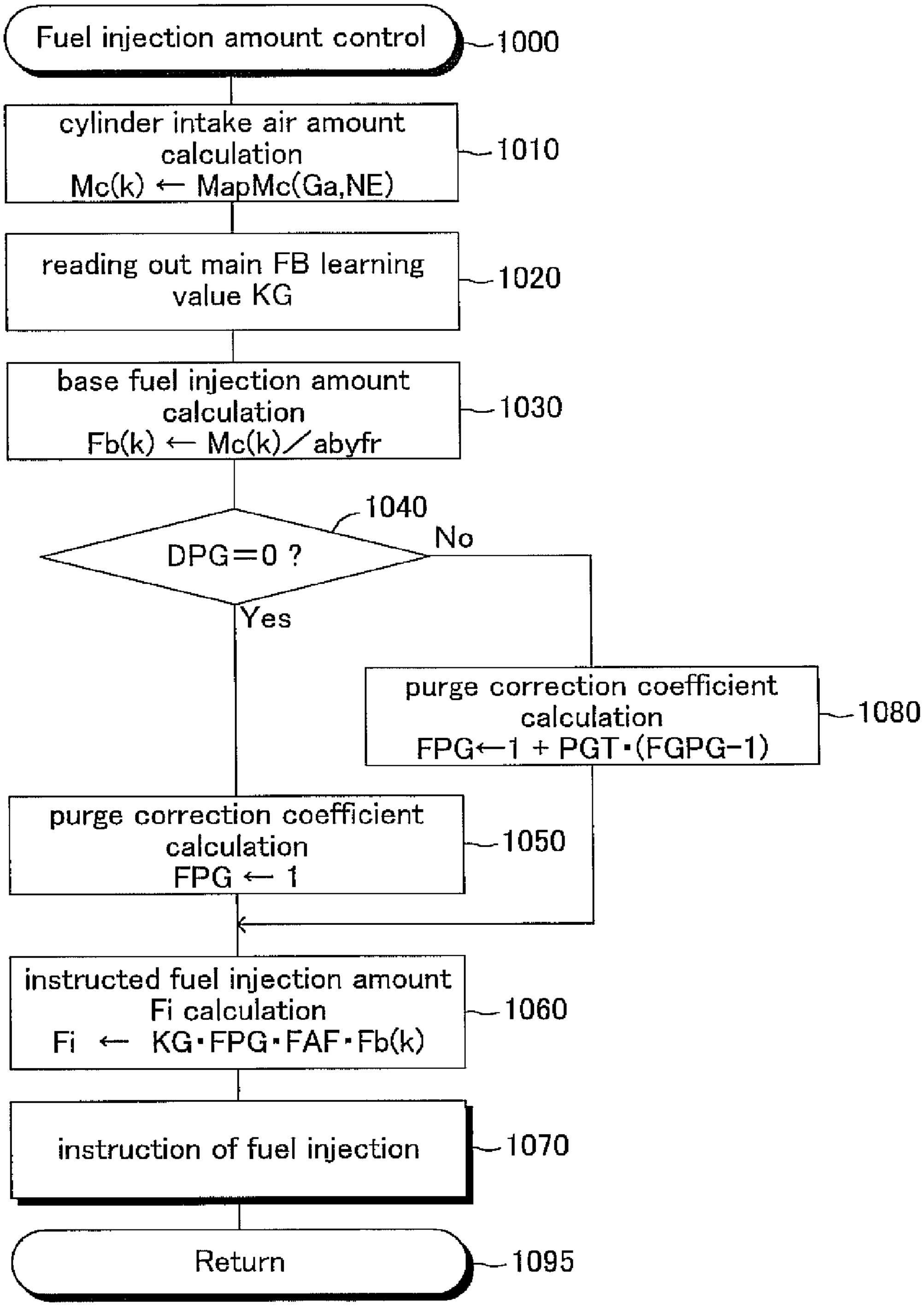
FIG. 10 is a flowchart showing a routine executed by a CPU of an apparatus (first determining apparatus) for determining an air-fuel ratio imbalance among cylinders according to a first embodiment of the present invention.
Figure 11:
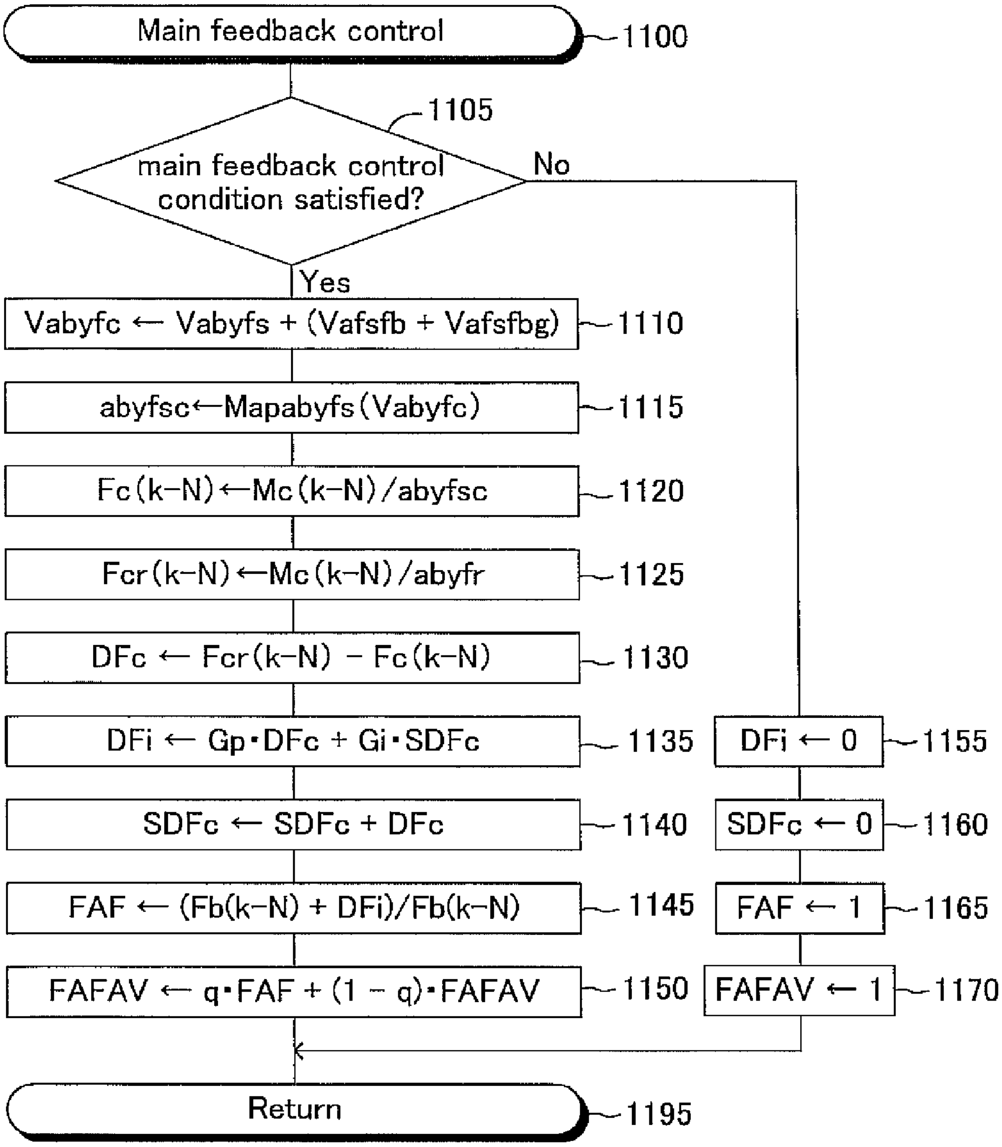
FIG. 11 is a flowchart showing a routine executed by the CPU of the first determining apparatus.

The CPU 71 repeatedly executes a main feedback amount calculation routine (main feedback control routine), shown by a flowchart in FIG. 11, every time a predetermined time elapses (or, alternatively, following to the routine shown in FIG. 10). Accordingly, at an appropriate predetermined timing, the CPU 71 starts a process from step 1100 to proceed to step 1105 at which the CPU 71 determines whether or not a main feedback control condition (upstream-side air-fuel ratio feedback control condition) is satisfied. The main feedback control condition is satisfied, when, for example, the fuel cut operation is not performed, the cooling water temperature THW is equal to or higher than a first determined temperature, a load KL is equal to or smaller than a predetermined value, and the upstream air-fuel ratio sensor 67 has been activated.

It should be noted that the load KL is a loading rate (filling rate) KL, and is calculated based on the following formula (4). In the formula (4), ρ is an air density (unit is (g/l), L is a displacement of the engine 10 (unit is (l)), and "4" is the number of cylinders of the engine 10. It should be noted that the load KL may be the cylinder intake air amount Mc, the throttle valve opening angle TA, the accelerator pedal operation amount Accp, or the like.

$$KL=(Mc(k)/(\rho\cdot L/4))\cdot 100(\%) \tag{4}$$

The description continues assuming that the main feedback control condition is satisfied. In this case, the CPU 71 makes a "Yes" determination at step 1105 to execute processes from steps 1110 to 1150 described below in this order, and then proceed to step 1195 to end the present routine tentatively.

Step 1110: The CPU 71 obtains an output value Vabyfc for a feedback control, according to a formula (5) described below. In the formula (5), Vabyfs is the output value of the upstream air-fuel ratio sensor 67, Vafsfb is a sub feedback amount calculated based on the output value Voxs of the downstream air-fuel ratio sensor 68, and Vafsfbg is a learning value (sub FB learning value) of the sub feedback amount. These values are values which have been obtained at the present time. The way by which the sub feedback amount Vafsfb and the sub FB learning value Vafsfbg are calculated will be described later.

$$Vabyfc=Vabyfs+(Vafsfb+Vafsfbg) \tag{5}$$

Step 1115: The CPU 71 obtains, as shown by a formula (6) described below, an air-fuel ratio abyfsc for a feedback control by applying the output value Vabyfc for a feedback control to the air-fuel ratio conversion table Mapabyfs shown in FIG. 7.

$$abyfsc=Mapabyfs(Vabyfc) \tag{6}$$

Step 1120: According to a formula (7) described below, the CPU 71 obtains a "cylinder fuel supply amount Fc(k−N)" which is an "amount of the fuel actually supplied to the combustion chamber 25 for a cycle at a timing N cycles before the present time". That is, the CPU 71 obtains the cylinder fuel supply amount Fc(k−N) through dividing the "cylinder intake air amount Mc(k−N) which is the cylinder intake air amount for the cycle at the timing the N cycles (i.e., N·720° crank angle) before the present time" by the "air-fuel ratio abyfsc for a feedback control".

$$Fc(k-N)=Mc(k-N)/abyfsc \quad (7)$$

The reason why the cylinder intake air amount Mc(k—N) for the cycle at the timing N cycles before the present time is divided by the air-fuel ratio abyfsc for a feedback control in order to obtain the cylinder fuel supply amount Fc(k−N) is because the "exhaust gas generated by the combustion of the mixture in the combustion chamber 25" requires time "corresponding to the N cycles" to reach the upstream air-fuel ratio sensor 67. It should be noted that, in actuality, a gas formed by mixing the exhaust gases from the cylinders to some degree reaches the upstream air-fuel ratio sensor 67.

Step 1125: The CPU 71 obtains a "target cylinder fuel supply amount Fcr(k−N)" which is an "amount of the fuel which was supposed to be supplied to the combustion chamber 25 for the cycle at the timing the N cycles before the present time", according to a formula (8) described below. That is, the CPU 71 obtains the target cylinder fuel supply amount Fcr(k−N) by dividing the cylinder intake air amount Mc(k−N) for the cycle at the timing the N cycles before the present time by the target upstream-side air-fuel ratio abyfr (i.e., stoichiometric air-fuel ratio).

$$Fcr(k-N)=Mc(k-N)/abyfr \quad (8)$$

Step 1130: The CPU 71 obtains an error DFc of the cylinder fuel supply amount, according to a formula (9) described below. That is, the CPU 71 obtains the error DFc of the cylinder fuel supply amount by subtracting the cylinder fuel supply amount Fc(k−N) from the target cylinder fuel supply amount Fcr(k−N). The error DFc of the cylinder fuel supply amount represents excess and deficiency of the fuel supplied to the cylinder at the timing the N cycles before the present time.

$$DFc=Fcr(k-N)-Fc(k-N) \quad (9)$$

Step 1135: The CPU 71 obtains the main feedback value DFi, according to a formula (10) described below. In the formula (10) below, Gp is a predetermined proportion gain, and Gi is a predetermined integration gain. Further, a "value SDFc" in the formula (10) is a "temporal integrated value of the error DFc of the cylinder fuel supply amount". That is, the CPU 71 calculates the "main feedback value DFi" based on a proportional-integral control to have the air-fuel ratio abyfsc for a feedback control coincide with the target upstream-side air-fuel ratio abyfr. The temporal integrated value SDFc of the error DFc of the cylinder fuel supply amount is obtained at next step 1140.

$$DFi=Gp\cdot DFc+Gi\cdot SDFc \quad (10)$$

A "sum of the sub feedback amount Vafsfb and the sub FB learning value Vafsfbg" in the right-hand side of the formula (5) described above is small and is limited to a small value, compared to the output value Vabyfs of the upstream-side air-fuel ratio 67. Accordingly, as described later, the "sum of the sub feedback amount Vafsfb and the sub FB learning value Vafsfbg" may be considered as a "supplementary correction amount" to have the "output value Voxs of the downstream air-fuel sensor 68" coincide with the "target downstream-side value Voxsref which is a value corresponding to the stoichiometric air-fuel ratio". The air-fuel ratio abyfsc for a feedback control is therefore said to be a value substantially based on the output value Vabyfs of the upstream air-fuel ratio sensor 67. That is, the main feedback value DFi can be said to be a correction amount to have the "air-fuel ratio of the engine represented by the output value Vabyfs of the upstream air-fuel ratio sensor 67" coincide with the "target upstream-side air-fuel ratio (the stoichiometric air-fuel ratio)".

Step 1140: The CPU 71 obtains a new integrated value SDFc of the error DFc of the cylinder fuel supply amount by adding the error DFc of the cylinder fuel supply amount obtained at the step 1130 to the current integrated value SDFc of the error DFc of the cylinder fuel supply amount.

Step 1145: The CPU 71 applies the main feedback value DFi and the base fuel injection amount Fb(k−N) to a formula (11) described below to thereby obtain the main feedback coefficient FAF. That is, the main feedback coefficient FAF is obtained through dividing a "value obtained by adding the main feedback value DFi to the base fuel injection amount Fb(k−N) at the timing the N cycles before the present time" by the "base fuel injection amount Fb(k−N)".

$$FAF=(Fb(k-N)+DFi)/Fb(k-N) \quad (11)$$

Step 1150: The CPU 71 obtains a weighted average value of the main feedback coefficient FAF, as a main feedback coefficient average FAFAV (hereinafter, referred to as a "correction coefficient average FAFAV"), according to a formula (12) described below. In the formula (12), FAFAVnew is renewed (updated) correction coefficient average FAFAV which is stored as a new correction coefficient average FAFAV. In the formula (12), a value q is a constant larger than zero and smaller than 1. The correction coefficient average FAFAV is used when obtaining "the main FB learning value KG and the evaporated fuel gas concentration learning value FGPG". It should be noted that the correction coefficient average FAFAV may be an average of the main feedback coefficient FAF for a predetermined period.

$$FAFAVnew=q\cdot FAF+(1-q)\cdot FAFAV \quad (12)$$

As described above, the main feedback value DFi is obtained according to the proportional-integral control. The main feedback value DFi is converted into the main feedback coefficient FAF, and is reflected in (onto) the instructed fuel injection amount Fi at "step 1060 shown in FIG. 10 described above". Consequently, excess and deficiency of the fuel supply amount is compensated, and thereby, an average of the air-fuel ratio of the engine (thus, an air-fuel ratio of the gas flowing into the upstream-side catalytic converter 53) is made to coincide with the target upstream-side air-fuel ratio abyfr (which is the stoichiometric air-fuel ratio, with an exception of the special cases).

At the determination of step 1105, if the main feedback control condition is not satisfied, the CPU 71 makes a "No" determination at step 1105 to proceed to step 1155 at which the CPU 71 sets the main feedback value DFi to (at) "0". Subsequently, the CPU 71 sets the integrated value SDFc of the error of the cylinder fuel supply amount to (at) "0" at step 1160, sets the main feedback coefficient FAF to (at) "1" at step 1165, and sets the correction coefficient average FAFAV to (at) "1" at step 1170. Thereafter, the CPU 71 proceeds to step 1195 to end the present routine tentatively.

As described above, when the main feedback control condition is not satisfied, the main feedback value DFi is set to (at) "0", and the main feedback coefficient FAF is set to (at) "1". Accordingly, the base fuel injection amount Fb is not corrected by the main feedback coefficient FAF. However, in such a case, the base fuel injection amount Fb is corrected by the main FB learning value KG.

<Main Feedback Learning (Base Air-Fuel Ratio Learning)>

The first determining apparatus renews (updates) the learning value KG of the main feedback coefficient FAF based on the correction coefficient average FAFAV, in such a manner that the main feedback coefficient FAF comes closer to the reference (base) value "1", during a "purge control valve closing instruction period (the period in which the duty ratio DPG is "0")" for which an instruction signal to keep the purge control valve 49 at fully/completely closing state is sent to the purge control valve 49. The learning value is also referred to as the "main FB learning value KG".

Figure 12:
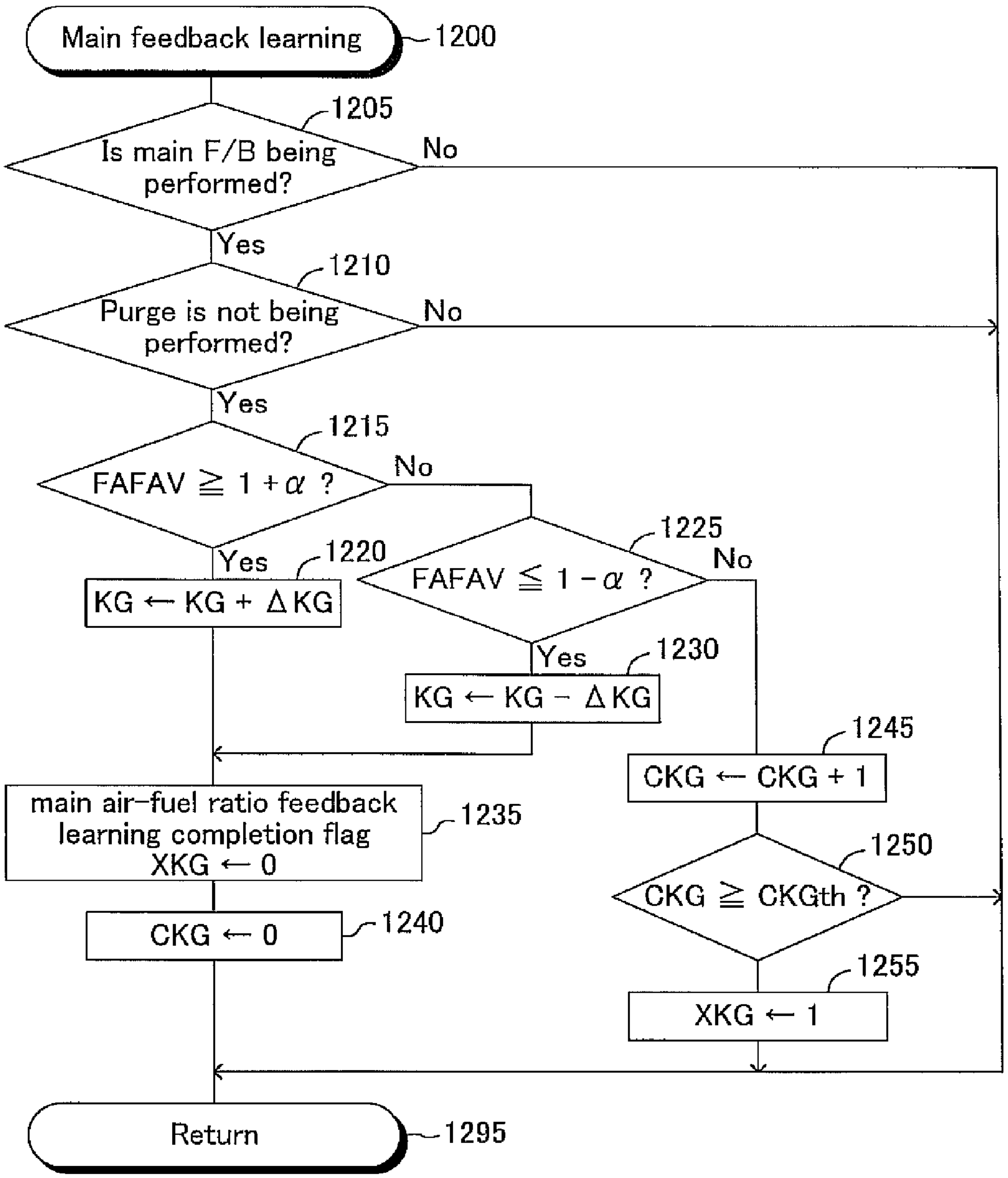
FIG. 12 is a flowchart showing a routine executed by the CPU of the first determining apparatus.

In order to update/change the main FB learning value KG, the CPU 71 executes a main feedback learning routine shown in FIG. 12 every time a predetermined time elapses. Therefore, at an appropriate timing, the CPU 71 starts a process from step 1200 to proceed to step 1205 at which the CPU 71 determines whether or not the main feedback control is being performed (i.e., whether or not the main feedback control condition is satisfied). If the main feedback control is not being performed, the CPU 71 makes a "No" determination at step 1205 to directly proceed to step 1295 to end the present routine tentatively. Consequently, the update of the main FB learning value is not carried out.

In contrast, when the main feedback control is being performed, the CPU 71 makes a "Yes" determination at step 1205 to proceed to step 1210 at which the CPU 71 determines whether or not the "evaporated fuel gas purge is not being carried out (more specifically, whether or not the target purge rate PGT or the duty ratio DPG, obtained by a routine shown in FIG. 13 described later, is "0")". When the fuel gas purge is being carried out, the CPU 71 makes a "No" determination at step 1210 to directly proceed to step 1295 to end the present routine tentatively. Consequently, when the fuel gas purge is being performed, the main FB learning value is not updated/renewed.

In contrast, in a case where the fuel gas purge is not being carried out when the CPU 71 proceeds to step 1210, the CPU 71 makes a "Yes" determination at step 1210 to proceed to step 1215 at which the CPU 71 determines whether or not the correction coefficient average FAFAV is equal to or larger than the value $1+\alpha$ ($\alpha$ is a predetermined minute value larger than 0 and smaller than 1, e.g., 0.02). At this time, if the correction coefficient average FAFAV is equal to or larger than the value $1+\alpha$, the CPU 71 proceeds to step 1220 to increase the main FB learning value KG by a predetermined positive value ΔKG. Thereafter, the CPU 71 proceeds to step 1235.

On the other hand, if the correction coefficient average FAFAV is smaller than the value $1+\alpha$ when the CPU 71 proceeds to step 1215, the CPU 71 proceeds to step 1225 to determine whether or not the correction coefficient average FAFAV is equal to or smaller than the value $1-\alpha$. At this time, if the correction coefficient average FAFAV is smaller than the value $1-\alpha$, the CPU 71 proceeds to step 1230 to decrease the main FB learning value KG by the predetermined value ΔKG. Thereafter, the CPU 71 proceeds to step 1235.

Further, when the CPU 71 proceeds to step 1235, the CPU 71 sets a main feedback learning completion flag (main FB learning completion flag) XKG to (at) "0". The main FB learning completion flag XKG indicates that the main feedback learning has been completed when its value is equal to "1", and that the main feedback learning has not been completed yet when its value is equal to "0".

Subsequently, the CPU 71 proceeds to step 1240 to set a value of a main learning counter CKG to (at) "0". It should be noted that the value of a main learning counter CKG is also set to (at) "0" by an initialization routine executed when an unillustrated ignition key switch is changed from the off-position to the on-position of a vehicle on which the engine 10 is mounted. Thereafter, the CPU 71 proceeds to step 1295 to end the present routine tentatively.

Further, if the correction coefficient average FAFAV is larger than the value $1-\alpha$ (that is, the correction coefficient average FAFAV is between the value $1-\alpha$ and the value $1+\alpha$) when the CPU 71 proceeds to step 1225, the CPU 71 proceeds to step 1245 to increment the main learning counter CKG by "1".

Thereafter, the CPU 71 proceeds to step 1250 to determine whether or not the main learning counter CKG is equal to or larger than a predetermined main learning counter threshold CKGth. When the main learning counter CKG is equal to or larger than the predetermined main learning counter threshold CKGth, the CPU 71 proceeds to step 1255 to set the main FB learning completion flag XKG to (at) "1".

That is, it is regarded that the learning of the main feedback learning value KG has been completed, when the number of times (i.e., the value of the counter CKG) of determination of occurrence of a "state in which the value of the correction coefficient average FAFAV is between the value $1-\alpha$ and the value $1+\alpha$" by the routine shown in FIG. 12 after the start of the engine 10 is equal to or larger than the predetermined main learning counter threshold CKGth, and the value of the value of the main FB learning completion flag XKG is set to (at) "1". Thereafter, the CPU 71 proceeds to step 1295 to end the present routine tentatively.

In contrast, if the main learning counter CKG is smaller than the predetermined main learning counter threshold CKGth when the CPU 71 proceeds to step 1250, the CPU 71 directly proceeds to step 1295 to end the present routine tentatively.

It should be noted that the main learning counter CKG may be set to (at) "0" when the "No" determination is made at either step 1205 or step 1210. According to this configuration, it is regarded that the learning of the main FB learning value KG has been completed, when the number of times of consecutive occurrence of the "state in which the value of the correction coefficient average FAFAV is between the value $1-\alpha$0 and the value $1+\alpha$ in a state in which the CPU 71 proceeds to steps following to step 1215 (that is, in a state in which the main feedback learning is performed)" becomes larger than the main learning counter threshold CKGth.

In this way, the main FB learning value KG is renewed (updated) while the main feedback control is being performed and the evaporated fuel gas purge is not being performed.

<Driving of the Purge Control Valve>

Figure 13:
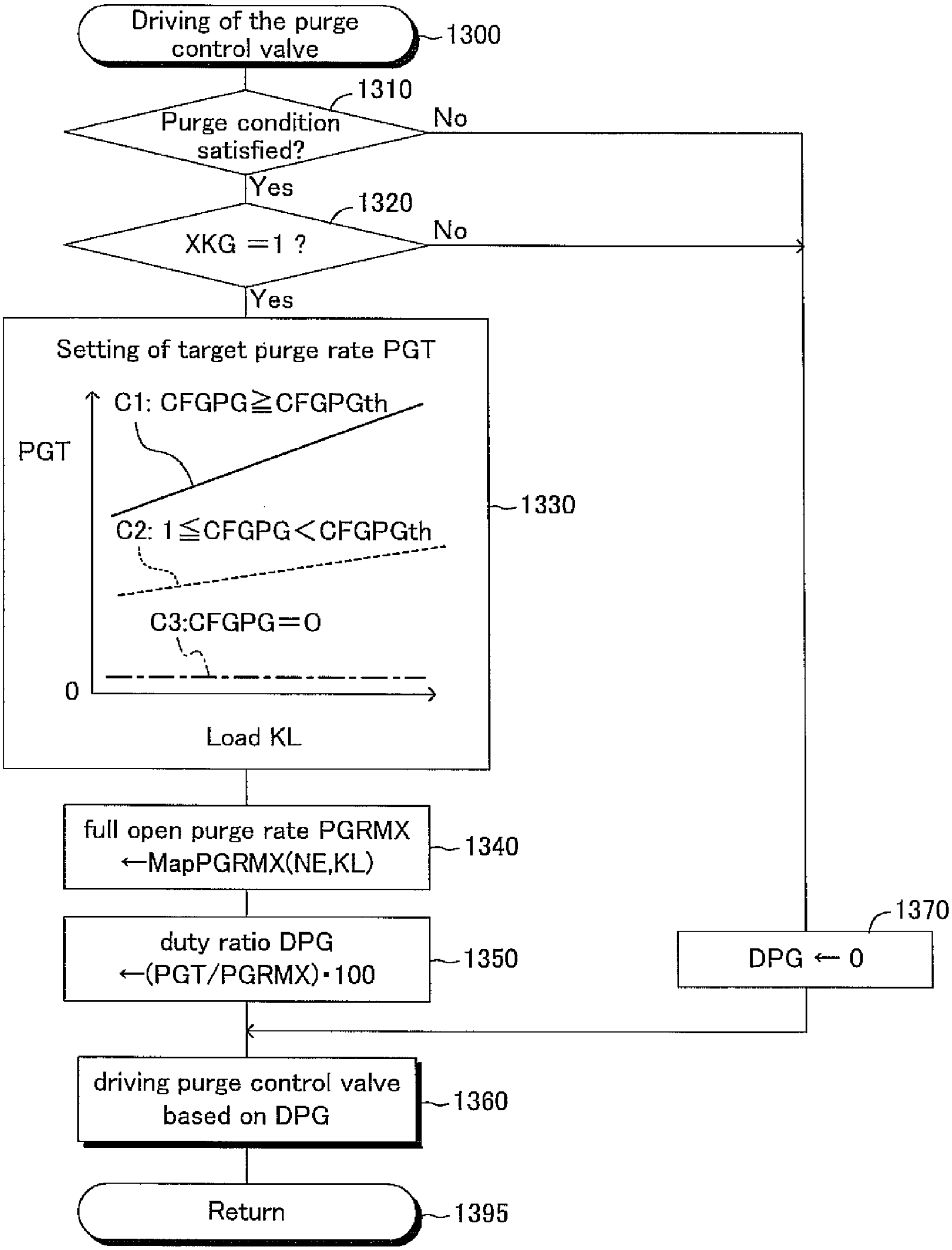
FIG. 13 is a flowchart showing a routine executed by the CPU of the first determining apparatus.

Meanwhile, the CPU 71 executes a purge control valve driving routine shown in FIG. 13 every time a predetermined time elapses. Accordingly, at an appropriate timing, the CPU 71 starts a process from step 1300 to proceed to step 1310 at which the CPU 71 determines whether or not a purge condition is satisfied. The purge condition is satisfied when, for example, the main feedback control condition is satisfied, and the engine 10 is operated under a steady state (e.g., a change amount of the throttle valve opening angle TA representing a load of the engine per unit time is equal to or smaller than a predetermined value).

Here, it is assumed that the purge condition is satisfied. In this case, the CPU 71 makes a "Yes" determination at step 1310 to proceed to step 1320 at which the CPU 71 determines whether or not the main FB learning completion flag XKG is equal to "1" (i.e., whether or not the main feedback learning has been completed). When the main FB learning completion flag XKG is equal to "1", the CPU 71 makes a "Yes" determination at step 1320 to execute processes from steps 1330 to

1360 described below in this order, and then proceeds to step 1395 to end the present routine tentatively.

Step 1330: The CPU 71 sets/determines the target purge rate PGT based on a parameter (e.g., the load KL of the engine) indicative of an operating state of the engine 10. More specifically, the CPU 71 uses a first purge rate table MapPGT1(KL) having data shown by a solid line C1 in a block of step 1330 shown in FIG. 13, when the "number of times of update opportunity for concentration learning value CFGPG of the evaporated fuel gas concentration learning value FGPG (i.e., the number of times of update opportunity for concentration learning value)" is equal to or larger than a "first opportunity number of times threshold CFGPGth". That is, the CPU 71 obtains the target purge rate PGT by applying the present load KL to the first purge rate table MapPGT1(KL). In this case, the target purge rate PGT is determined to become larger as the load KL becomes larger.

In contrast, the CPU 71 uses a second purge rate table MapPGT2(KL) having data shown by a broken line C2, when the "number of times of update opportunity for concentration learning value CFGPG" is equal to or larger than "1" and smaller than the "first opportunity number of times threshold CFGPGth". That is, the CPU 71 obtains the target purge rate PGT by applying the present load KL to the second purge rate table MapPGT2(KL). In this case, the target purge rate PGT is determined to become larger as the load KL becomes larger.

Further, the CPU 71 uses a third purge rate table MapPGT3(KL) having data shown by an alternate long and short dash line C3, when the "number of times of update opportunity for concentration learning value CFGPG" is equal to "0", that is, when there has been no update opportunity (opportunity history) of the evaporated fuel gas concentration learning value FGPG after the start of the engine 10. That is, the CPU 71 obtains the target purge rate PGT by applying the present load KL to the third purge rate table MapPGT3(KL). In this case, the target purge rate PGT is determined so as to be constant regardless of the load KL.

According to the first purge rate table MapPGT1(KL), the target purge rate PGT is determined so as to be largest. According to the third purge rate table MapPGT3(KL), the target purge rate PGT is determined so as to be smallest (or extremely small). The target purge rate PGT obtained according to the third purge rate table MapPGT3(KL) may be "0". According to the second purge rate table MapPGT2(KL), the target purge rate PGT is determined so as to have a value between the target purge rate PGT obtained according to the first purge rate table MapPGT1(KL) and the target purge rate PGT obtained according to the third purge rate table MapPGT3(KL).

It should be noted that the purge rate is defined as a ratio of an evaporated fuel gas purge flow rate KP to an intake air flow rate Ga. Alternatively, the purge rate may be defined as a ratio of the "evaporated fuel gas purge flow rate KP" to a "sum of the intake air flow rate Ga and the evaporated fuel gas purge flow rate KP".

Step 1340: The CPU 71 obtains a full open purge rate PGRMX by applying the rotational speed NE and the load KL to a Table (Map) MapPGRMX. The full open purge rate PGRMX is a purge rate when the purge control valve 49 is fully opened. The table MapPGRMX is obtained in advance based on results of experiments or simulations, and is stored in the ROM 72. According to the table MapPGRMX, the full open purge rate PGRMX is determined so as to become smaller as the rotational speed NE becomes higher or the load KL becomes larger.

Step 1350: The CPU 71 calculates the duty ratio DPG by applying the full open purge rate PGRMX obtained at step 1340 and the target purge rate PGT obtained at step 1330 to a formula (13) described below.

$$DPG=(PGT/PGRMX)\cdot 100(\%) \quad (13)$$

Step 1360: The CPU 71 opens or closes the purge control valve 49 based on the duty ratio DPG. Accordingly, the evaporated fuel gas is introduced into the intake passage with the actual purge rate which coincides with the target purge rate PGT. That is, the CPU 71, for a constant purge control valve driving period (interval) T, opens the purge control valve 49 for a time equal to T·DPG/100, and closes the purge control valve 49 for a time equal to T·(1−DPG)/100.

In contrast, when the purge condition is not satisfied, the CPU 71 makes a "No" determination at step 1310 to proceed to step 1370. In addition, when the main FB learning completion flag XKG is "0", the CPU 71 makes a "No" determination at step 1320 to proceed to step 1370. After the CPU 71 sets the duty ratio DPG to (at) "0" at step 1370, the CPU 71 proceeds to step 1360. At this time, since the duty ratio DPG is set at (to) "0", the purge control valve 49 is fully/completely closed. Thereafter, the CPU 71 proceeds to step 1395 to end the present routine tentatively.

<Evaporated Fuel Gas Concentration Learning>

Figure 14:
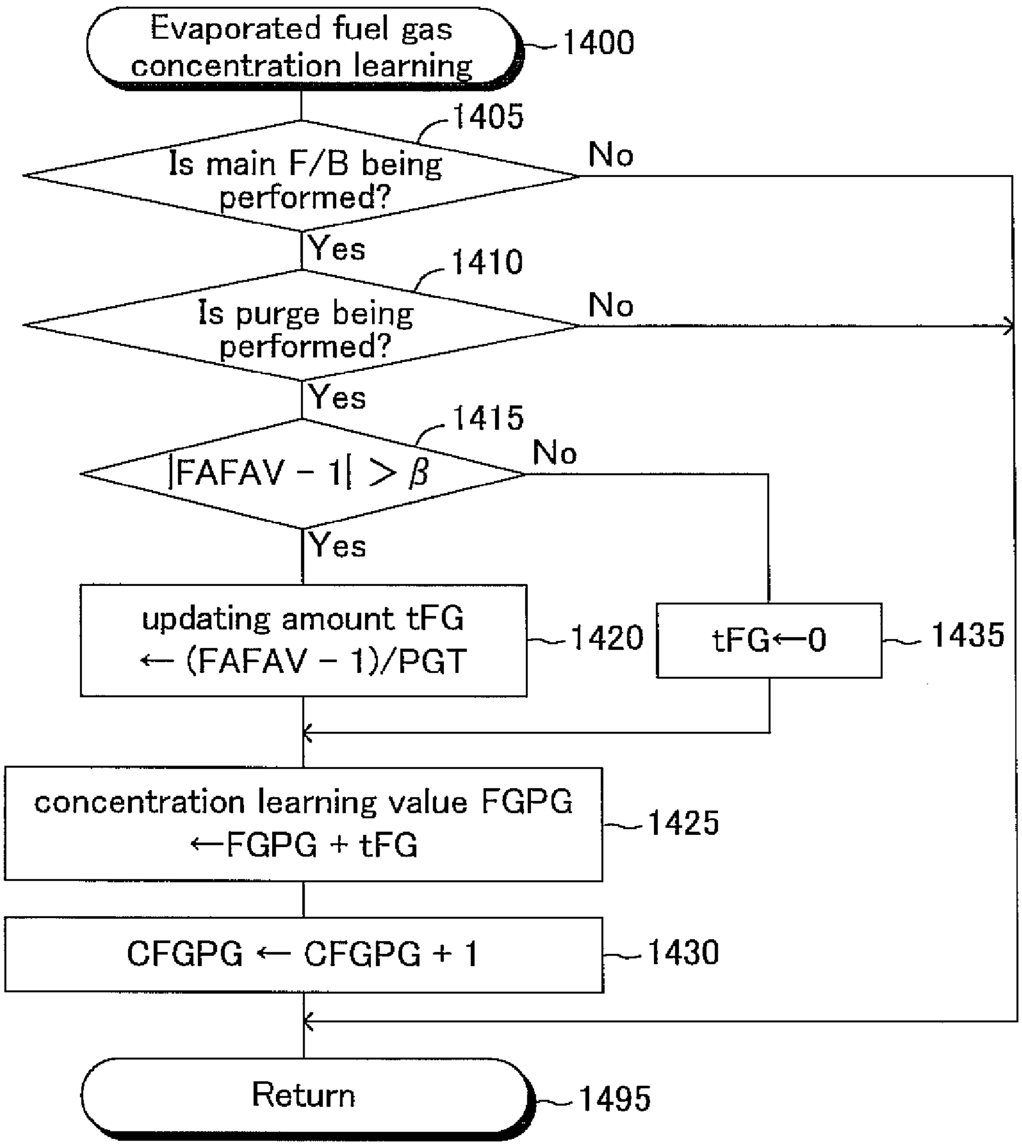
FIG. 14 is a flowchart showing a routine executed by the CPU of the first determining apparatus.

Further, the CPU 71 executes an evaporated fuel gas concentration learning routine shown in FIG. 14 every time a predetermined time elapses. An execution of the evaporated fuel gas concentration learning routine allows to update/change the evaporated fuel gas concentration learning value FGPG while the evaporated fuel gas purge is being carried out.

That is, at an appropriate timing, the CPU 71 starts a process from step 1400 to proceed to step 1405 at which the CPU 71 determines whether or not the main feedback control is being performed (i.e., whether or not the main feedback control condition is satisfied). At this time, if the main feedback control is not being performed, the CPU 71 makes a "No" determination at step 1405 to directly proceed to step 1495 to end the present routine tentatively. Accordingly, the update of the evaporated fuel gas concentration learning value FGPG is not performed.

In contrast, when the main feedback control is being performed, the CPU 71 proceeds to step 1410 at which the CPU 71 determines whether or not "the evaporated fuel gas purge is being performed (more specifically, whether or not the target purge rate PGT or the duty ratio DPG, both obtained by the routine shown in FIG. 13, is not "0")". At this time, if the evaporated fuel gas purge is not being performed, the CPU 71 makes a "No" determination at step 1410 to directly proceed to step 1495 to end the present routine tentatively. Accordingly, the update of the evaporated fuel gas concentration learning value FGPG is not performed.

On the other hand, if the evaporated fuel gas purge is being performed when the CPU 71 proceeds to step 1410, the CPU 71 makes a "Yes" determination at step 1410 to proceed to step 1415 at which the CPU 71 determines whether or not an absolute value |FAFAV−1| of a value obtained by subtracting "1" from the correction coefficient average FAFAV is equal to or larger than a predetermined value β. β is a minute value larger than 0 and smaller than 1, and for example, 0.02.

Meanwhile, the evaporated fuel gas is introduced into the intake passage when the main FB learning completion flag XKG is "1", as shown in step 1320 in FIG. 13 (that is, after the main feedback learning has been completed). Further, the main feedback learning is performed when the evaporated fuel-gas is not being introduced, as shown at step 1210 in FIG. 12. Therefore, when the main FB learning completion flag XKG is "1", factors other then the evaporated fuel gas, the factors making the air-fuel ratio of the engine deviate from the stoichiometric air-fuel ratio (more specifically, the factors other than the evaporated fuel gas, the factors making the absolute value of the correction coefficient average FAFAV deviate from "1" by an amount of the predetermined value β or more) are compensated by the main FB learning value KG.

As is apparent from the above, when the absolute value |FAFAV−1| of a value obtained by subtracting "1" from the correction coefficient average FAFAV is determined to be equal to or larger than a predetermined value β at step 1415 in FIG. 14, it is regarded (inferred) that the evaporated fuel gas concentration learning value FGPG is not accurate, and therefore, the value of purge correction coefficient FPG calculated according to the formula (3) at step 1080 shown in FIG. 10 deviates (is) away from its appropriate value.

In view of the above, when the absolute value |FAFAV−1| is equal to or larger than the value β, the CPU 71 makes a "Yes" determination at step 1415 to executes processes of step 1420 and step 1425 to thereby change/update the evaporated fuel gas concentration learning value FGPG. That is, the CPU 71 performs the learning of the evaporated fuel gas concentration learning value FGPG at step 1420 and step 1425.

Step 1420: The CPU 71 obtains an updating amount tFG according to a formula (14) described below. The target purge rate PGT in the formula (14) is set at step 1330 in FIG. 13. As is apparent from the formula (14), the updating amount tFG is a "difference obtained by subtracting 1 from FAFAV, (i.e., FAFAV−1)" per 1% of the target purge rate. Thereafter, the CPU 71 proceeds step 1425.

$$tFG=(FAFAV-1)/PGT \quad (14)$$

The upstream air-fuel ratio abyfs becomes smaller with respect to the stoichiometric air-fuel ratio (an air-fuel ratio in a richer side with respect to the stoichiometric air-fuel ratio), as the concentration of the evaporated fuel gas becomes higher. Accordingly, the main feedback coefficient FAF becomes a "smaller value" which is smaller than "1" to decrease the fuel injection amount, and therefore, the correction coefficient average FAFAV becomes a "smaller value" which is smaller than "1". As a result, the value (FAFAV−1) becomes negative, and thus, the updating amount tFG becomes negative. Further, an absolute value of the updating amount tFG becomes larger as the value FAFAV becomes smaller (deviates more from "1"). That is, updating amount tFG becomes a negative value whose absolute value becomes larger, as the concentration of the evaporated fuel gas becomes higher.

Step 1425: The CPU 71 updates/changes the evaporated fuel gas concentration learning value FGPG according to a formula (15) described below. In the formula (15), FGPGnew is renewed (updated) evaporated fuel gas concentration learning value FGPG which the CPU 71 stores into the backup RAM 74 as the evaporated fuel gas concentration learning value FGPG. Consequently the evaporated fuel gas concentration learning value FGPG becomes smaller as the concentration of the evaporated fuel gas becomes higher. It should be noted that an initial value of the evaporated fuel gas concentration learning value FGPG is set at "1".

$$FGPG\text{new}=FGPG+tFG \quad (15)$$

Step 1430: The CPU 71 increments the "number of times of update opportunity for concentration learning value CFGPG of the evaporated fuel gas concentration learning value FGPG (i.e., the number of times of update opportunity for concentration learning value CFGPG)" by "1". The number of times of update opportunity for concentration learning value CFGPG is set at (to) "0" by the initializing routine described above. Thereafter, the CPU proceeds to step 1495 to end the present routine tentatively.

In contrast, if the absolute value |FAFAV−1| is equal to or smaller than the value β when the CPU 71 proceeds to step 1415, the CPU 71 makes a "No" determination at step 1415 to proceed to step 1435 to set the updating amount tFG to (at) "0". Thereafter, the CPU 71 proceeds to step 1425. Accordingly, in this case, the evaporated fuel gas concentration learning value FGPG remains unchanged. Subsequently, the CPU 71 proceeds to step 1430. Therefore, even when the evaporated fuel gas concentration learning value FGPG remains unchanged, the number of times of update opportunity for concentration learning value CFGPG is incremented by "1" as long as the process of step 1415 is executed.

<Calculation of the Sub Feedback Amount and the Sub FB Learning Value>

Figure 15:
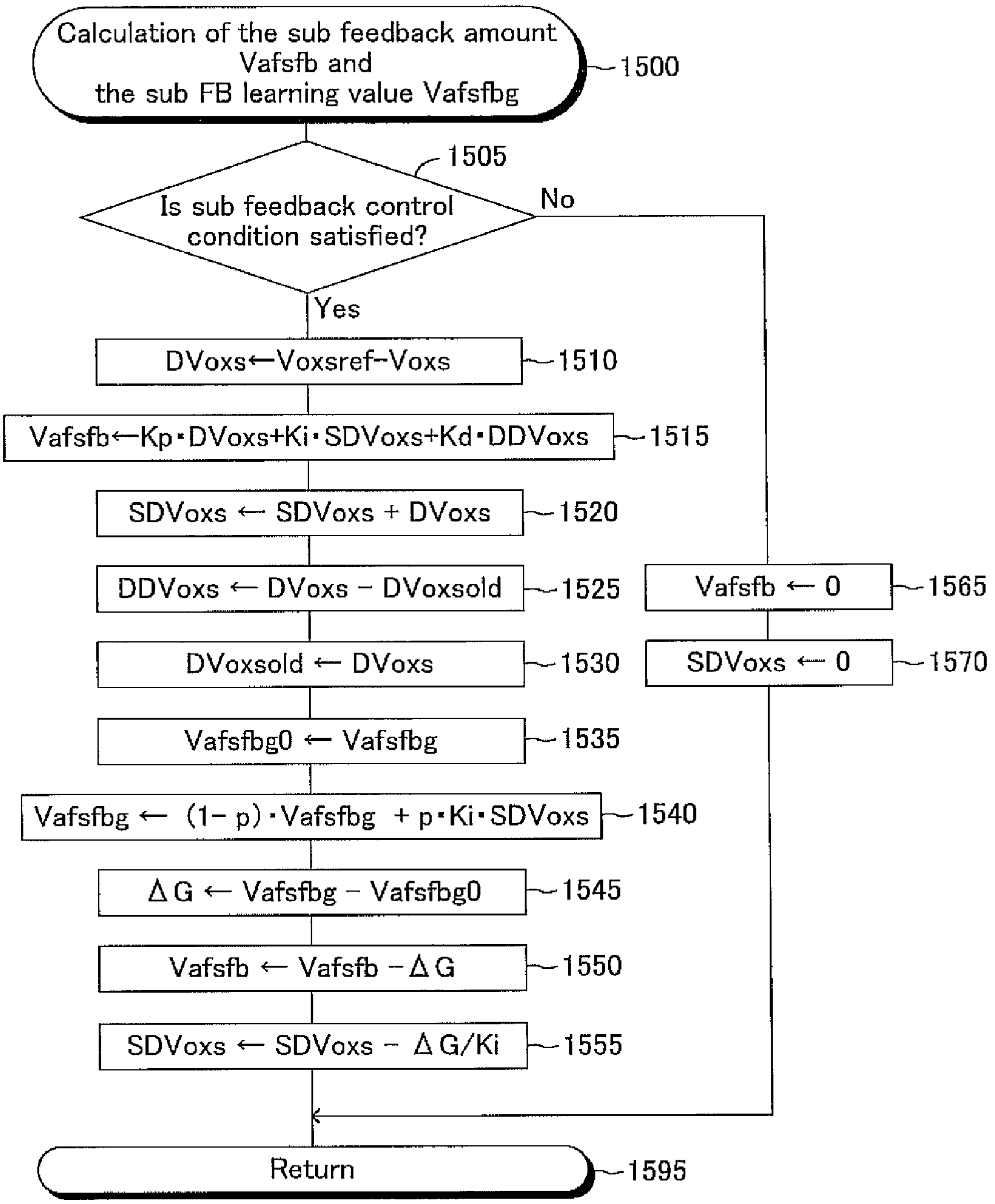
FIG. 15 is a flowchart showing a routine executed by the CPU of the first determining apparatus.

The CPU 71 executes a routine shown in FIG. 15 every time a predetermined time elapses in order to calculate the sub feedback amount Vafsfb and the learning value Vafsfbg of the sub feedback amount Vafsfb.

Accordingly, at an appropriate timing, the CPU 71 starts a process from step 1500 to proceed to step 1505 at which CPU determines whether or not a sub feedback control condition is satisfied. The sub feedback control condition is satisfied when, for example, the main feedback control condition described at step 1105 shown in FIG. 11 is satisfied, the target upstream-side air-fuel ratio abyfr is set at (to) the stoichiometric air-fuel ratio, the cooling water temperature THW is equal to or higher than a second determined temperature higher than the first determined temperature, and the downstream air-fuel ratio sensor 68 has been activated.

The description continues assuming that the sub feedback control condition is satisfied. In this case, the CPU 71 makes a "Yes" determination at step 1505 to execute processes from steps 1510 to 1530 described below in this order, to calculate the sub feedback amount Vafsfb.

Step 1510: The CPU 71 obtains an error amount of output DVoxs which is a difference between the target downstream-side value Voxsref (i.e., the stoichiometric air-fuel ratio corresponding value Vst) and the output value Voxs of the downstream air-fuel ratio sensor 68, according to a formula (16) described below. The error amount of output DVoxs is referred to as a "first error".

$$DVoxs=Voxsref-Voxs \quad (16)$$

Step 1515: The CPU 71 obtains the sub feedback amount Vafsfb according to a formula (17) described below. In the formula (17) below, Kp is a predetermined proportion gain (proportional constant), Ki is a predetermined integration gain (integration constant), and Kd is a predetermined differential gain (differential constant). SDVoxs is an integrated value (temporal integrated value) of the error amount of output DVoxs, and DDVoxs is a differential value (temporal differential value) of the error amount of output DVoxs.

$$Vafsfb=Kp\cdot DVoxs+Ki\cdot SDVoxs+Kd\cdot DDVoxs \quad (17)$$

Step 1520: The CPU 71 obtains a new integrated value SDVoxs of the error amount of output by adding the "error amount of output DVoxs obtained at step 1510" to the "integrated value SDVoxs of the error amount of output at the present time".

Step 1525: The CPU 71 obtains a new differential value DDVoxs by subtracting a "previous error amount of the output DVoxsold calculated when the present routine was executed at a previous time" from the "error amount of output DVoxs calculated at the step 1510".

Step 1530: The CPU 71 stores the "error amount of output DVoxs calculated at the step 1510" as the "previous error amount of the output DVoxsold".

As described above, CPU 71 calculates the "sub feedback amount Vafsfb" according to the proportional-integral-differential (PID) control to have the output value Voxs of the downstream air-fuel ratio sensor 68 coincide with the target downstream-side value Voxsref. As shown in the formula (5) described above, the sub feedback amount Vafsfb is used to calculate the output value Vabyfc for a feedback control.

Subsequently, the CPU 71 executes processes from steps 1535 to 1555 described below in this order, to calculate the "sub FB learning value Vafsfbg", and thereafter, proceeds to step 1595 to end the present routine tentatively.

Step 1535: The CPU 71 stores the "sub FB learning value Vafsfbg at the present time" as a "before updated learning value Vafsfbg0".

Step 1540: The CPU 71 updates/changes the sub FB learning value Vafsfbg according to a formula (18) described below. The updated sub FB learning value Vafsfbg (=Vafsfbgnew) is stored in the backup RAM 74. In the formula (18), the value p is a constant larger than 0 and smaller than 1.

$$Vafsfbg\text{new}=(1-p)\cdot Vafsfbg+p\cdot Ki\cdot SDVoxs \quad (18)$$

As is clear from the formula (18), the sub FB learning value Vafsfbg is a value obtained by performing a "filtering process to eliminate noises" on the "integral term Ki·SDVoxs of the sub feedback amount Vafsfb". In other words, the sub FB learning value Vafsfbg is a first order lag amount (blurred amount) of the integral term Ki·SDVoxs, and is a value corresponding to a steady-state component (integral term Ki·SDVoxs) of the sub feedback amount Vafsfb. In this manner, the sub FB learning value Vafsfbg is updated/changed so as to come closer to (approach) the steady-state component of the sub feedback amount Vafsfb.

It should be noted that the CPU 71 may update the sub FB learning value Vafsfbg according to a formula (19) described below. In this case, as is apparent from the formula (19), the sub FB learning value Vafsfbg becomes a value obtained by performing a "filtering process to eliminate noises" on the "sub feedback amount Vafsfb". In other words, the sub FB learning value Vafsfbg may be a first order lag amount (blurred amount) of the sub feedback amount Vafsfb. In the formula (19), the value p is a constant larger than 0 and smaller than 1.

$$Vafsfbg\text{new}=(1-p)\cdot Vafsfbg+p\cdot Vafsfb \quad (19)$$

In either case, the sub FB learning value Vafsfbg is updated/changed so as to come closer to (approach) the steady-state component of the sub feedback amount Vafsfb. That is, the sub FB learning value Vafsfbg is updated/changed so as to eventually fetch (or bring) in the steady-state component of the sub feedback amount Vafsfb.

Step 1545: The CPU 71 calculates a change amount (update amount) ΔG of the sub FB learning value Vafsfbg, according to a formula (20) described below. In the formula (20), Vafsfbg0 is the "sub FB learning value Vafsfbg immediately before the change (update)" which was fetched in (stored) at step 1535. Accordingly, the change amount ΔG can be a positive value and a negative value.

$$\Delta G=Vafsfbg-Vafsfbg0 \quad (20)$$

Step 1550: The CPU 71 corrects the sub feedback amount Vafsfb with the change amount ΔG, according to a formula (21) described below. That is, the CPU 71 decreases the sub feedback amount Vafsfb by the change amount ΔG, when it updates the learning value Vafsfbg in such a manner that the learning value Vafsfbg is increased by the change amount ΔG. In the formula (21), Vafsfbnew is a sub feedback amount Vafsfb after renewed/updated.

$$Vafsfbnew=Vafsfb-\Delta G \quad (21)$$

Step 1555: The CPU 71 corrects the integrated value SDVoxs of the error amount of output DVoxs according to a formula (22) described below, when it updates the sub FB learning value Vafsfbg in such a mannr that the sub FB learning value Vafsfbg is increased by the change amount ΔG according to the formula (18). In the formula (22), SDVoxsnew is an integrated value SDVoxs of the error amount of output DVoxs after renewed/updated.

$$SDVoxs\text{new}=SDVoxs-\Delta G/Ki \quad (22)$$

It should be noted that step 1555 may be omitted. Further, steps from step 1545 to step 1555 may be omitted. Furthermore, steps from step 1535 to step 1555 may be omitted. In this case, the sub FB learning value Vafsfbg is set to (at) "0". That is, the learning control of the sub feedback amount is not carried out.

By the processes described above, the sub feedback amount Vafsfb and the sub FB learning value Vafsfbg are updated every time the predetermined time elapses.

In contrast, when the sub feedback control condition is not satisfied, the CPU 71 makes a "No" determination at step 1505 shown in FIG. 15 to execute processes of step 1565 and step 1570 described below in this order, and then proceeds to step 1595 to end the present routine tentatively.

Step 1565: The CPU 71 sets the value of the sub feedback amount Vafsfb at (to) "0".

Step 1570: The CPU 71 sets the value of the integrated value SDVoxs of the error amount of output at (to) "0".

By the processes described above, as is clear from the formula (5) above, the output value Vabyfsc for a feedback control becomes equal to the sum of the output value Vabyfs of the upstream air-fuel ratio sensor 67 and the sub FB learning value Vafsfbg. That is, in this case, "updating the sub feedback amount Vafsfb" and "reflecting the sub feedback amount Vafsfb in (into) the instructed fuel injection amount Fi" are stopped. It should be noted that at least the sub FB learning value Vafsfbg corresponding to the integral term of the sub feedback amount Vafsfb is reflected in (into) the instructed fuel injection amount Fi.

<Setting of a Determination Allowing Flag Xkyoka>

Processes for executing an "imbalance determination allowing flag setting routine" will next be described. The CPU 71 determines, based on a value of the determination allowing flag Xkyoka, whether or not it should perform an air-fuel ratio imbalance among cylinder determination described later. The determination allowing flag Xkyoka is set (changed) when the CPU 71 executes the "determination allowing flag setting routine" shown by a flowchart in FIG. 16, every time a predetermined time (4 ms) elapses. It should be noted that the value of determination allowing flag Xkyoka is set to (at) "0" in the initialization routine described above.

Figure 16:
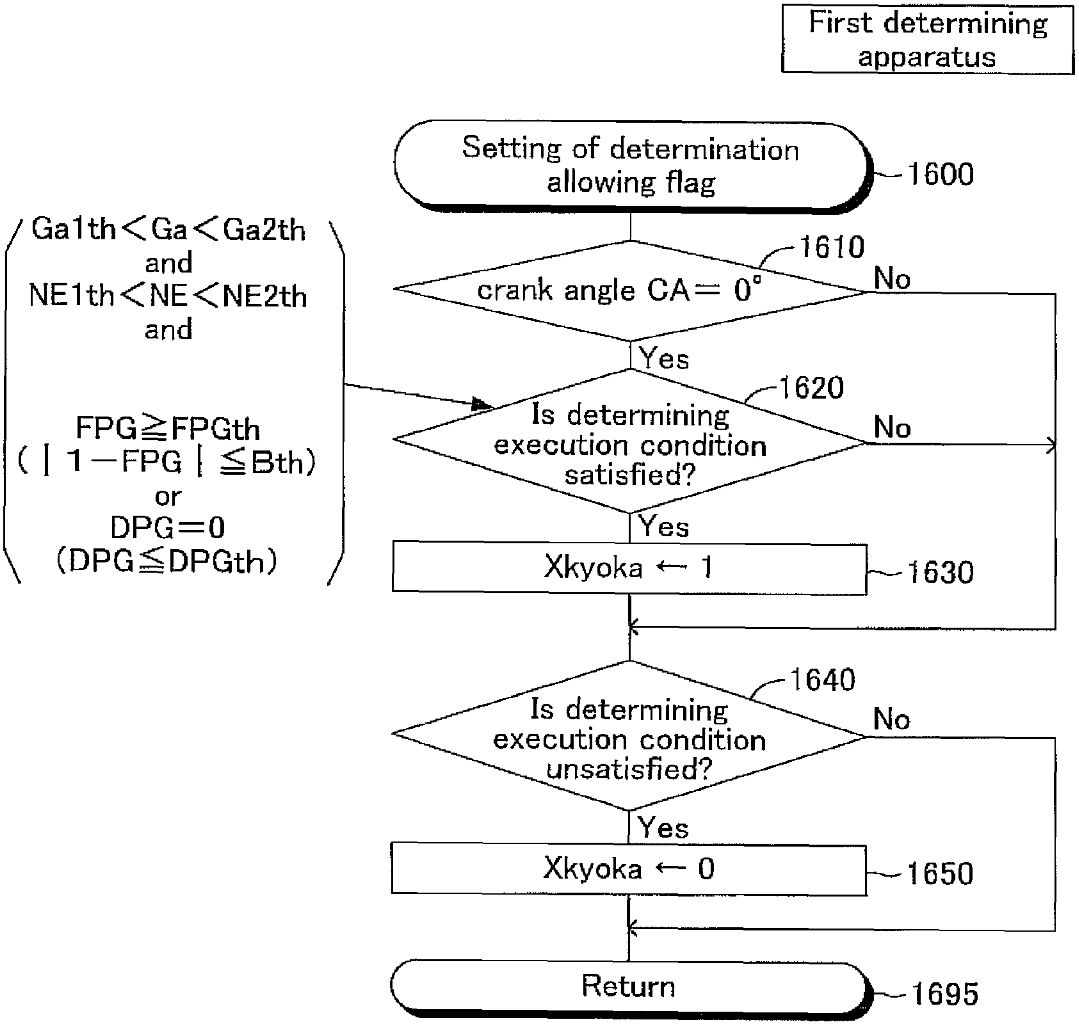
FIG. 16 is a flowchart showing a routine executed by the CPU of the first determining apparatus.

At an appropriate timing, the CPU 71 starts a process from step 1600 shown in FIG. 16 to proceed to step 1610 at which the CPU 71 determines whether or not the absolute crank angle CA coincides with 0° crank angle (=720° crank angle).

If the absolute crank angle CA does not coincide with 0° crank angle when the CPU 71 executes the process at step 1610, the CPU 71 makes a "No" determination at step 1610 to directly proceed to step 1640.

In contrast, if the absolute crank angle CA coincides with 0° crank angle when the CPU 71 executes the process at step 1610, the CPU 71 makes a "Yes" determination at step 1610 to proceed to step 1620 at which the CPU 71 determines whether or not a determining execution condition is satisfied.

The determining execution condition is satisfied when all of the following conditions (condition C1 to condition C6) are satisfied. The determining execution condition may be a condition which is satisfied when the conditions C1, C3, and C6 are satisfied. Further, the determining execution condition may be a condition which is satisfied when the conditions C1 and C6 are satisfied. The determining execution condition may be a condition which is satisfied when another condition is further satisfied.

(condition C1) The intake air flow rate Ga is larger than a lower intake air flow rate threshold (first threshold air flow rate) Ga1th, and is smaller than a higher intake air flow rate threshold (second threshold air flow rate) Ga2th. It should be noted that the higher intake air flow rate threshold Ga2th is larger than the lower intake air flow rate threshold Ga1th.

(condition C2) The engine rotational speed NE is larger than a lower engine rotational speed threshold NE1th, and is smaller than a higher engine rotational speed threshold NE2th. It should be noted that the higher engine rotational speed threshold NE2th is larger than the lower engine rotational speed threshold NE1th.

(condition C3) The fuel cut control is not being performed.

(condition C4) The main feedback control condition is satisfied, and therefore, the main feedback control is being performed.

(condition C5) The sub feedback control condition is satisfied, and therefore, the sub feedback control is being performed.

(condition C6) The purge correction coefficient FPG is larger than or equal to a predetermined purge correction coefficient threshold FPGth (which is larger than "0" and is smaller than "1"), or the duty ratio DPG is equal to "0". That is, an evaporated fuel gas effect occurring state is not occurring.

The purge correction coefficient threshold FPGth (threshold of correction amount) used in the condition C6 is set to (at) a value which allows to determine that the evaporated fuel gas purge greatly changes an "imbalance determination parameter described later", that is, an evaporated fuel gas effect occurring state (the state in which the evaporated fuel gas purge changes the imbalance determination parameter by an amount equal to or larger than an allowable amount) is occurring, when the purge correction coefficient FPG is smaller than the purge correction coefficient threshold FPGth.

It should be noted that the condition C6 that "the purge correction coefficient FPG is larger than or equal to the predetermined purge correction coefficient threshold FPGth" may be replaced by (with) a condition that the absolute value $|1-FPG|$ of the difference between the purge correction coefficient FPG and "1" which is the reference value of the purge correction coefficient FPG is smaller than a purge effect determination threshold Bth which is positive (note that, Bth is a value larger than "0" and smaller than "1"). Further, the condition C6 that "the duty ratio DPG is equal to "0"" may be replaced by (with) a condition that "the duty ratio DPG is smaller than a duty ratio threshold DPGth".

If the determining execution condition is not satisfied when the CPU 71 executes the process at step 1620, the CPU 71 makes a "No" determination at step 1620 to directly proceed to step 1640.

In contrast, if the determining execution condition is satisfied when the CPU 71 executes the process at step 1620, the CPU 71 makes a "Yes" determination at step 1620 to proceed to step 1630 at which the CPU 71 sets the value of the determination allowing flag Xkyoka to (at) "1". Thereafter, the CPU proceeds to step 1640.

The CPU 71 determines whether or not the determining execution condition is not satisfied at step 1640. That is, the CPU 71 determines whether or not any one of conditions C1 to C5 is not satisfied. When the determining execution condition is not satisfied, the CPU 71 proceeds from step 1640 to step 1650 to set the value of the determination allowing flag Xkyoka to (at) "0", and proceed to step 1695 to end the present routine tentatively. In contrast, if the determining execution condition is satisfied, when the CPU 71 executes the process at step 1640, the CPU 71 directly proceeds from step 1640 to step 1695 to end the present routine tentatively.

In this manner, the determination allowing flag Xkyoka is set to (at) "1" in a case in which the determining execution condition is satisfied when the absolute crank angle coincides with 0° crank angle, and is set to (at) "0" when the determining execution condition becomes unsatisfied.

<Determination of the Air-Fuel Ratio Imbalance Among Cylinders>

Next will be described processes for executing the "determination of the air-fuel ratio imbalance among cylinders". The CPU 71 executes a "routine for determining the air-fuel ratio imbalance among cylinders" shown by a flowchart in FIG. 17, every time 4 m seconds (4 m seconds=a constant sampling time ts) elapses.

Accordingly, at an appropriate timing, the CPU 71 starts a process from step 1700 to proceed to step 1705 at which the CPU 71 determines whether or not the value of the determination allowing flag Xkyoka is "1". When the value of the determination allowing flag Xkyoka is "1", the CPU 71 makes a "Yes" determination at step 1705 to proceed to step 1710 at which the CPU 71 obtains the "output value of the air-fuel ratio sensor 67 at the present time" by an AD conversion.

Subsequently, the CPU 71 proceeds to step 1715 at which the CPU 71 obtains the current detected air-fuel ratio abyfs by applying the output value Vabyfs of the air-fuel ratio sensor 67 to the air-fuel ratio conversion table Mapabyfs. It should be noted that the CPU 71 stores, as a previous detected air-fuel ratio abyfsold, the detected air-fuel ratio (upstream-side air-fuel ratio abyfs) obtained when the present routine was executed at previous time. That is, the previous detected air-fuel ratio abyfsold is the detected air-fuel ratio abyfs 4 m seconds (sampling time ts) before the present time.

Subsequently, the CPU 71 proceeds to step 1720 to update, (A) an air-fuel ratio fluctuation indicating amount AFD, (B) an integrated value SAFD of an absolute value $|AFD|$ of the air-fuel ratio fluctuation indicating amount AFD, (C) a cumulated number counter Cn for counting the number of times of a process to add the absolute value of the air-fuel ratio fluctuation indicating amount AFD to the integrated value SAFD, and (D) a minimum value MINZ of the detected air-fuel ratio abyfs.

The way to update these values will next be described more specifically.

(A) Update of the Air-Fuel Ratio Fluctuation Indicating Amount AFD

In the present embodiment, the air-fuel ratio fluctuation indicating amount AFD is the detected air-fuel ratio changing rate ΔAF. The CPU 71 obtains the detected air-fuel ratio changing rate ΔAF by subtracting the previous detected air-fuel ratio abyfsold from the current detected air-fuel ratio abyfs. That is, when the current detected air-fuel ratio abyfs is expressed as abyfs(n), and the previous detected air-fuel ratio abyfsold is expressed as abyfs(n−1), the CPU 71 obtains a "current detected air-fuel ratio changing rate ΔAF(n) which is the current air-fuel ratio fluctuation indicating amount AFD" according to a formula (23) described below, at step 1720.

$$\Delta AF(n)=abyfs(n)-abyfs(n-1) \quad (23)$$

(B) Update of the Integrated Value SAFD of the Absolute Value |AFD| of the Air-Fuel Ratio Fluctuation Indicating Amount AFD The CPU 71 obtains a current integrated value SAFD(n) according to a formula (24) described below. That is, the CPU 71 updates the integrated value SAFD by adding the absolute value |ΔAF(n) (=AFD(n))| of the current detected air-fuel ratio changing rate ΔAF(n) calculated as described above to a previous integrated value SAFD(n−1) when the CPU 71 proceeds to step 1720

$$SAFD(n)=SAFD(n-1)+|\Delta AF(n)| \quad (24)$$

The reason why the "absolute value |ΔAF(n)| of the current detected air-fuel ratio changing rate" is integrated (accumulated) to the integrated value SAFD is that the detected air-fuel ratio changing rate ΔAF(n) may become not only a positive value but also a negative value, as understood from (B) and (C) of FIG. 9. It should be noted that the integrated value SAFD is set to (at) "0" by the initialization routine described above.

(C) Update of the Cumulated Number Counter Cn for Counting the Number of Times of the Process to Add the Absolute Value of the Air-Fuel Ratio Fluctuation Indicating Amount AFD to the Integrated Value SAFD The CPU 71 increments a value of the counter Cn by "1". The value of the counter Cn is set to (at) "0" by the initialization routine, and also is set to (at) "0" at step 1760 described later. Therefore, the value of the counter Cn indicates (represents) the number of data of the absolute value of the air-fuel ratio fluctuation indicating amount AFD which is added to the integrated value SAFD.

(D) Update of the Minimum Value MINZ of the Detected Air-Fuel Ratio abyfs

When the current detected air-fuel ratio abyfs obtained at step 1715 is smaller than a minimum value MINZ which is retained at the present time, the CPU 71 stores, as the minimum value MINZ, the current detected air-fuel ratio abyfs.

Subsequently, the CPU 71 proceeds to step 1725 and determines whether or not the crank angle CA (absolute crank angle CA) with respect to a top dead center of the reference cylinder (in the present example, the first cylinder) coincides with 720° crank angle. When the absolute crank angle CA is smaller than 720° crank angle, the CPU 71 makes a "No" determination at step 1725 to directly proceed to step 1795 to end the present routine tentatively.

It should be noted that the step 1725 is a step for defining a minimum unit period (unit combustion cycle period) for which an average of the absolute value |ΔAF| of the detected air-fuel ratio changing rate ΔAF is obtained, and here, 720° crank angle corresponds to the minimum unit period. 720° crank angle is a crank angle required for each of all cylinders (in the present example, the first to fourth cylinders) discharging an exhaust gas reaching the single air-fuel ratio sensor 67 to complete one combustion stroke. The minimum unit period may be shorter than 720° crank angle, but is preferably equal to or longer than a length obtained by multiplying the sampling time is by a plural number. That is, it is preferable that the minimum unit period be determined in such a manner that the a plurality of the detected air-fuel ratio changing rates ΔAF are obtained in the minimum unit period.

On the other hand, if the absolute crank angle CA coincides with 720° crank angle when the CPU 71 executes the process at step 1725, the CPU 71 makes a "Yes" determination at step 1725 to proceed to step 1730 at which the CPU 71 performs, (E) Calculating an Average AveAFD of the Absolute Value of the Air-Fuel Ratio Fluctuation Indicating Amount AFD, (F) calculating an integrated value Save of the average AveAFD, (G) calculating an integrated value SMINZ of the minimum value MINZ, and (H) incrementing a cumulated number counter Cs.

The way to update these values will next be described more specifically.

(E) Calculating the Average AveAFD of the Absolute Value of the Air-Fuel Ratio Fluctuation Indicating Amount AFD The CPU 71 calculates the average AveAFD of the absolute value |AFD| of the air-fuel ratio fluctuation indicating amount AFD.

(F) Calculating the Integrated Value Save of the Average AveAFD

The CPU 71 obtains a current integrated value Save(n) according to a formula (25) described below. That is, the CPU 71 updates the integrated value Save by adding the current average AveAFD calculated as described above to a previous integrated value Save(n−1) when the CPU 71 proceeds to step 1730. The integrated value Save is set to (at) "0" by the initialization routine described above, and is also set to (at) "0" at step 1760 described later.

$$\mathrm{Save}(n=\mathrm{Save}(n-1)+\mathrm{Ave}AFD \quad (25)$$

(G) Calculating the Integrated Value SMINZ of the Minimum Value MINZ

The CPU 71 obtains a current integrated value SMINZ(n) according to a formula (26) described below. That is, the CPU 71 updates the integrated value SMINZ by adding the current MINZ stored during the curent unit combustion cycle to a previous integrated value SMINZ(n−1) when the CPU 71 proceeds to step 1730. The integrated value SMINZ is set to (at) "0" by the initialization routine described above, and is also set to (at) "0" at step 1760 described later. Further, the CPU 71 sets the minimum value MINZ to (at) a predetermined large default value.

$$SMINZ(n)=SMINZ(n-1)+\mathrm{MINZ} \quad (26)$$

(H) Incrementing a Cumulated Number Counter Cs The CPU 71 increments a value of the counter Cs by "1" according to a formula (27) described below. Cs(n) represents the counter Cs after updated, and Cs(n−1) represents the counter Cs before updated. The value of the counter Cs is set to (at) "0" by the initialization routine described above, and also is set to (at) "0" at step 1760 described later. Therefore, the value of the counter Cs indicates (represents) the number of data of the average AveAFD which is added to the integrated value Save, and the number of data of the minimum value MINZ which is added to the integrated value SMINZ.

$$Cs(n)=Cs(n-1)+1 \quad (27)$$

Subsequently, the CPU 71 proceeds to step 1735 to determine whether or not the value of the counter Cs is equal to or larger than a threshold Csth. When the value of the counter Cs is smaller than the threshold Csth, the CPU 71 makes a "No" determination at step 1735 to directly proceed to step 1795 to end the present routine tentatively. It should be noted that the threshold Csth is a natural number, and is preferably larger than or equal to 2.

In contrast, if the value of the counter Cs is equal to or larger than the threshold Csth when the CPU 71 executes the process at step 1735, the CPU 71 makes a "Yes" determination at step 1735 to proceed to step 1740 at which the CPU 71 calculates the imbalance determination parameter X (first imbalance determination parameter X1 and second imbalance determination parameter X2).

More specifically, the CPU 71 calculates the first imbalance determination parameter X1 according to a formula (28) described below, by dividing the integrated value Save by the value of the counter Cs (=Csth). The first imbalance determination parameter X1 is an average value of the "average value of the absolute value |ΔAF| of the detected air-fuel ratio changing rate ΔAF for the single unit combustion cycle period" for a plurality (Csth) of the unit combustion cycle periods. Accordingly, the first imbalance determination parameter X1 is the imbalance determination parameter which becomes larger as the difference among the individual cylinder air-fuel ratios becomes larger.

$$X1 = \text{Save}/Csth \tag{28}$$

The CPU 71 calculates the second imbalance determination parameter X2 according to a formula 9) described below, by dividing the integrated value SMINZ by the value of the counter Cs (=Csth). The second imbalance determination parameter X2 is an average value of the "minimum value MINZ of the detected air-fuel ratio abyfs for the single unit combustion cycle period" for a plurality (Csth) of the unit combustion cycle periods. Accordingly, the second imbalance determination parameter X2 is the imbalance determination parameter which becomes smaller as the difference among the individual cylinder air-fuel ratios becomes larger.

$$X2 = \text{SMINZ}/Csth \tag{29}$$

Subsequently, the CPU 71 proceeds to step 1745 to determine whether or not the first imbalance determination parameter X1 is larger than a first imbalance determination threshold X1th. It is preferable that the first imbalance determination threshold X1th be set to (at) a value which becomes larger as the intake air flow rate Ga becomes larger.

When the first imbalance determination parameter X1 is larger than the first imbalance determination threshold X1th, the CPU 71 makes a "Yes" determination at step 1745 to proceed to step 1750 to set a value of an imbalance occurrence flag XINB to (at) "1". That is, the CPU 71 determines that the air-fuel ratio imbalance among cylinders state is occurring. Further, at this time, the CPU 71 may turn on an unillustrated warning lamp. It should be noted that the value of the imbalance occurrence flag XINB is stored in the back up RAM 74. Thereafter, the CPU 71 proceeds to step 1795 to end the present routine tentatively.

In contrast, if the first imbalance determination parameter X1 is smaller than or equal to the first imbalance determination threshold X1th when the CPU 71 executes the process at step 1745, the CPU 71 makes a "No" determination at step 1745 to proceed to step 1755 to set the value of the imbalance occurrence flag XINB to (at) "2". That is, the CPU 71 stores the result indicating that it is determined that the air-fuel ratio imbalance among cylinders state is not occurring, as a result of the air-fuel ratio imbalance among cylinders determination. Thereafter, the CPU 71 proceeds to step 1795 to end the present routine tentatively. It should be noted that step 1755 may be omitted.

On the other hand, if the value of the determination allowing flag Xkyoka is not "1", the CPU 71 makes a "No" determination at step 1705 to proceed to step 1760. The CPU 71 sets each of the values (e.g., AFD, SAFD, CN, MINZ, and so on) to (at) "0", and thereafter, proceeds to step 1795 to end the present routine tentatively.

In this manner, the determination of the air-fuel ratio imbalance among cylinder due to the change in the property of the fuel injectors is performed. It should be noted that the first determining apparatus may perform, at step 1745, the determination of the air-fuel ratio imbalance among cylinder using the second imbalance determination parameter X2 (average value of the "minimum value MINZ of the detected air-fuel ratios" for a plurality of the unit combustion cycle periods).

In this case, when the CPU 71 proceeds to step 1745, the CPU 71 determines whether or not the second imbalance determination parameter X2 is smaller than a second imbalance determination threshold X2th.

When the second imbalance determination parameter X2 is smaller than the second imbalance determination threshold X2th, the CPU 71 makes a "Yes" determination at step 1745 to proceed to step 1750 to set the value of an imbalance occurrence flag XINB to (at) "1". That is, the CPU 71 determines that the air-fuel ratio imbalance among cylinders state is occurring. Thereafter, the CPU 71 proceeds to step 1795 to end the present routine tentatively.

In contrast, if the second imbalance determination parameter X2 is larger than or equal to the second imbalance determination threshold X2th when the CPU 71 executes the process at step 1745, the CPU 71 makes a "No" determination at step 1745 to proceed to step 1755 to set the value of the imbalance occurrence flag XINB to (at) "2". That is, the CPU 71 stores the result indicating that it is determined that the air-fuel ratio imbalance among cylinders state is not occurring, as a result of the air-fuel ratio imbalance among cylinders determination. Thereafter, the CPU 71 proceeds to step 1795 to end the present routine tentatively. It should be noted that step 1755 may be omitted.

Figure 17:
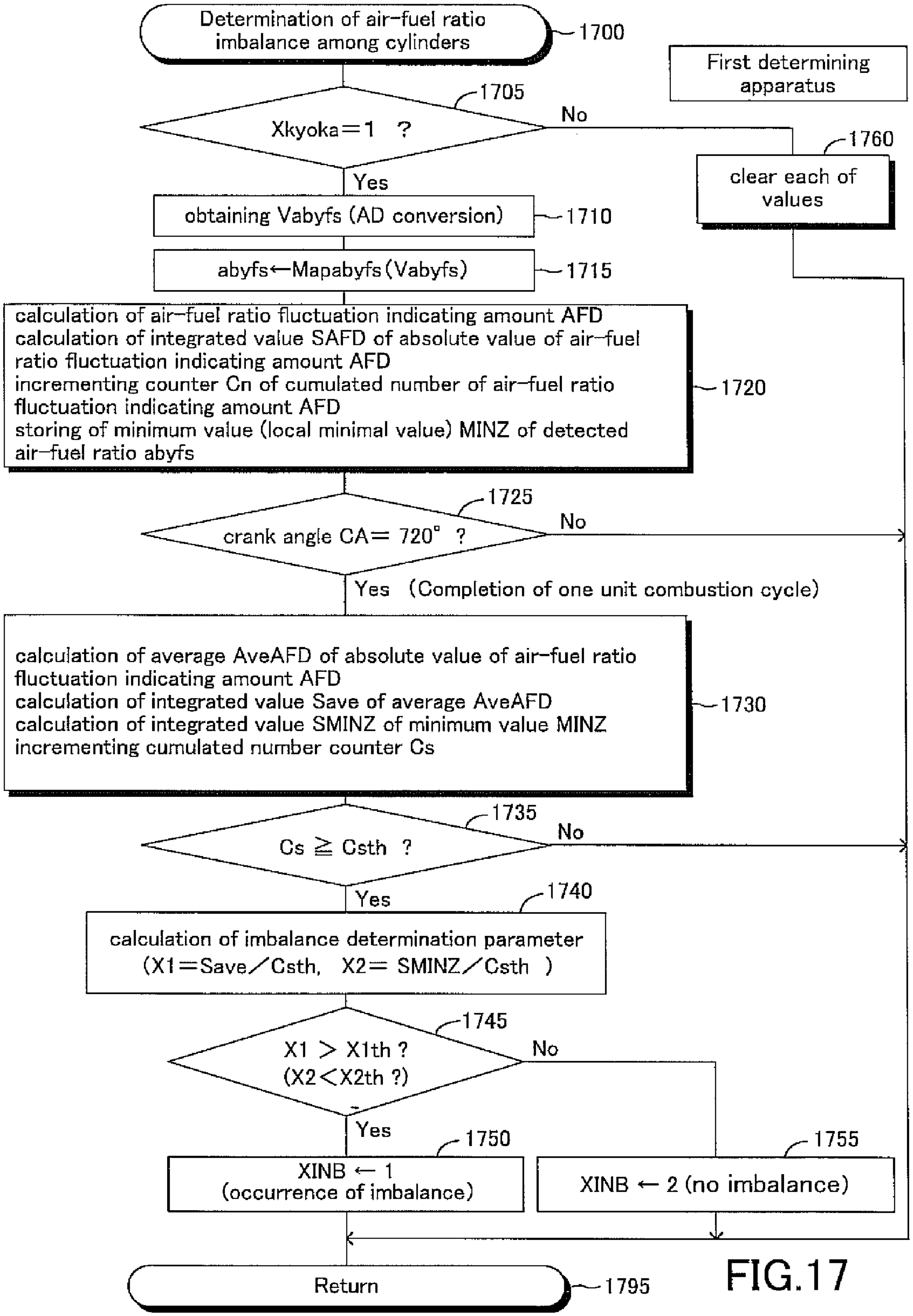
FIG. 17 is a flowchart showing a routine executed by the CPU of the first determining apparatus.

As described above, the first determining apparatus is an air-fuel ratio imbalance among cylinder determination apparatus applied to the multi cylinder internal combustion engine (10) having a plurality of the cylinders, comprising:

the air-fuel ratio sensor (67), disposed in the exhaust passage of the engine and at the exhaust gas aggregated portion into which the exhaust gases discharged from at least two or more of the cylinders (the first to fourth cylinders) among the plurality of the cylinders merge or in the exhaust passage of the engine and at a position downstream of the exhaust gas aggregated portion, and outputting, as the output of the air-fuel ratio sensor, the output value in accordance with the air-fuel ratio of the exhaust gas which has reached the air-fuel ratio sensor;

a plurality of fuel injectors (39), each provided (disposed) so as to correspond to each of the at least two or more of the cylinders, and injecting the fuel to be contained in the mixture supplied to each of the combustion chambers of the two or more of the cylinders;

purge passage section (the vapor collection pipe 47 and purge passage pipe 48, etc.) forming (constituting) the passage which allows the evaporated fuel gas generated in the fuel tank (45) for storing the fuel supplied to a plurality of the fuel injectors to be introduced into the intake passage of the engine;

purge amount control means (purge control valve 49, and the routine shown in FIG. 13) for controlling the evaporated fuel gas purge amount which is the amount of the evaporated fuel gas introduced (flowed) into the intake passage of the engine through the purge passage section;

imbalance determination parameter obtaining means obtains (step 1705 to step 1740 shown in FIG. 17), based on the output value of the air-fuel ratio sensor, the imbalance determination parameter (the first imbalance determination parameter X1, the second imbalance determination parameter X2) which becomes larger or smaller as the difference among individual air-fuel ratios, each of which is the air-fuel ratio of the mixture supplied to each of the at least two or more of a plurality of the cylinders, becomes larger;

imbalance determining means (step 1745 to step 1755 shown in FIG. 17) for comparing the obtained imbalance determination parameter with the predetermined imbalance determination threshold, and for determining, based on the result of the comparison, whether or not the air-fuel ratio imbalance among cylinders has been occurring; and allowing and prohibiting imbalance determining execution means for determining (step 1602 shown in FIG. 16) whether or not the evaporated fuel gas effect occurring state is occurring in which the evaporated fuel gas flowing into the intake passage causes the imbalance determination parameter to change by an amount larger than or equal to a predetermined allowable amount (i.e., means for determining whether or not the condition C6 described above is unsatisfied), and for prohibiting obtaining the imbalance determination parameter so as to substantially prohibit performing/executing the imbalance determination and/or prohibiting performing/executing the imbalance determination itself, when it is determined that the evaporated fuel gas effect occurring state is occurring (refer to "No" determination at step 1620 shown in FIG. 16, "Yes" determination at step 1640, and "No" determination at step 1705 shown in FIG. 17).

It should be noted that, even when it is determined that the evaporated fuel gas effect occurring state is occurring, the CPU 71 may execute the processes of steps from step 1710 to step 1745 shown in FIG. 17, but sets the value of the imbalance occurrence flag XINB to (at) "0" regardless of the result of step 1745 to thereby invalidate/nullify the result of the imbalance determination.

According to the above configuration, in the "state in which the imbalance determination parameter is caused to change by more than or equal to the predetermined allowable amount", the imbalance determination parameter is not obtained, or the imbalance determination is not carried out. Therefore, a likelihood of determining (erroneously determining) that the air-fuel ratio imbalance among cylinders is not occurring due to the effect of the evaporated fuel gas even though the injection property of the fuel injector 39 of a particular (specific) cylinder is greatly different from the injection properties of the fuel injectors 39 of the other cylinders can be reduced.

Further, the first determining apparatus includes feedback control means (refer to step 1060 shown in FIG. 10, the routine shown in FIG. 11, and the routines, if necessary, shown in FIGS. 12, 14 and 15) for correcting the fuel injection amount (instructed fuel injection amount) which is an "amount of the fuel injected from each of a plurality of the fuel injectors" with (by) the "air-fuel ratio feedback amount (FPG·FAF, or KG·FPG·FAF) which is calculated based on the output value Vabyfs of the air-fuel ratio sensor 67 and the predetermined target air-fuel ratio (stoichiometric air-fuel ratio)" in such a manner that the air-fuel ratio (abyfs, abyfsc) represented by the output value Vabyfs of the air-fuel ratio sensor 67 coincides with (becomes equal to) the target air-fuel ratio.

According to the configuration described above, it can be avoided that the emission becomes worse when the imbalance determination is being performed.

Further, the feedback control means is configured (refer to step 1080 shown in FIG. 10, and FIG. 14) so as to calculate, based on the output value vabyfs of the air-fuel ratio sensor, a correction amount (that is, the "evaporated fuel gas purge correction amount FPG") for suppressing (reducing, decreasing) a change in the "air-fuel ratio of the mixture supplied to each of the combustion chambers of the two or more of the cylinders" due to the inflow of the evaporated fuel gas, the correction amount being a "correction amount constituting a part of the air-fuel ratio feedback amount (FPG·FAF, or KG·FPG·FAF)"; and the allowing and prohibiting imbalance determining execution means is configured (refer to the condition C6 described above, "No" determination at step 1620 shown in FIG. 16, and "Yes" determination at step 1640) so as to determine that the "evaporated fuel gas effect occurring state is occurring" when the magnitude $|1-FPG|$ of the difference between the "evaporated fuel gas purge correction amount FPG" and the "reference value of the evaporated fuel gas purge correction amount ("1")" is larger than the predetermined purge effect determining threshold (13th).

Accordingly, it is possible to accurately determine, based on the evaporated fuel gas purge correction amount FPG, whether or not the evaporated fuel gas effect occurring state is occurring.

Second Embodiment

A determining apparatus (hereinafter, referred to as a "second determining apparatus") according to a second embodiment of the present invention will next be described.

Figure 18:
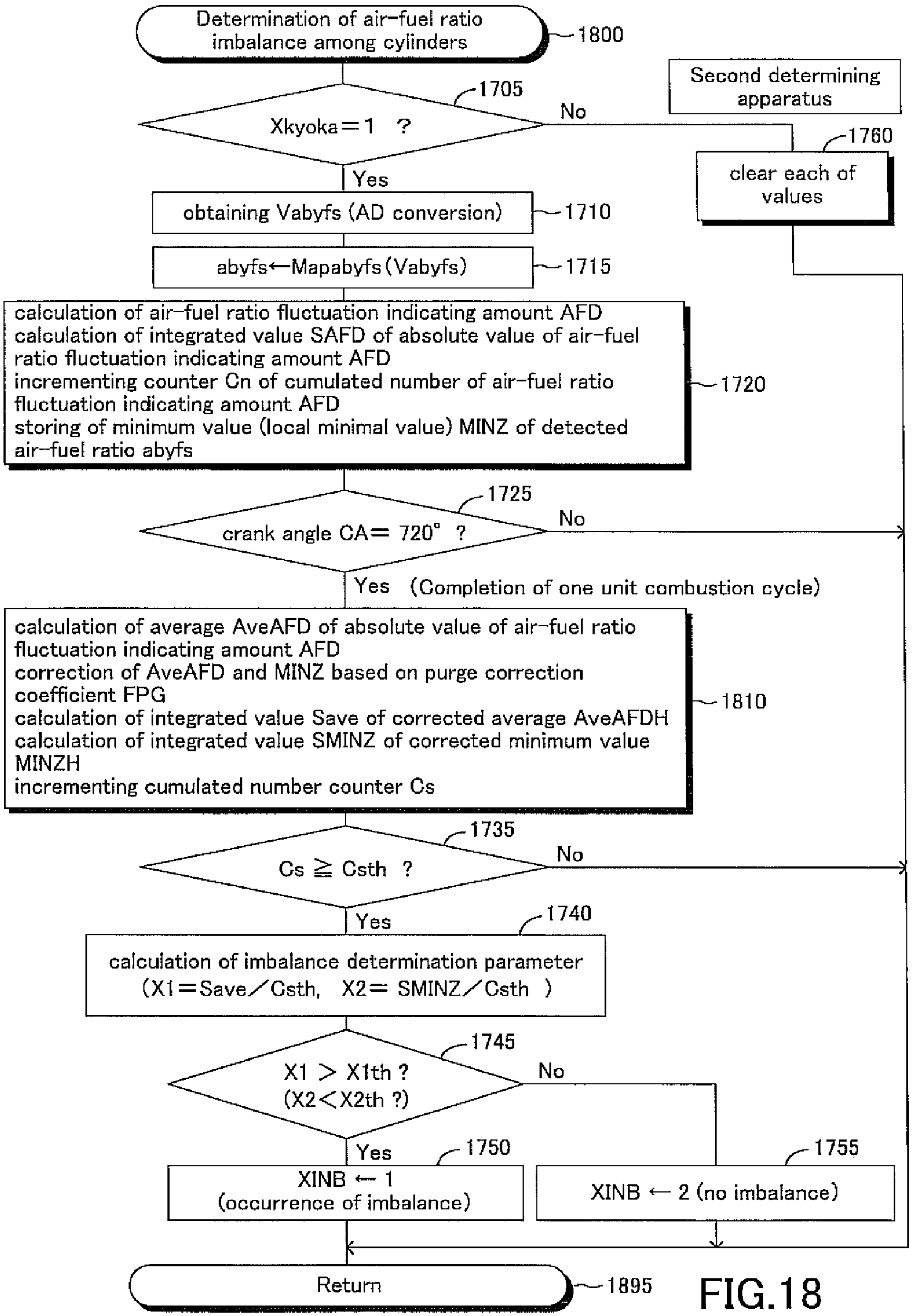
FIG. 18 is a flowchart showing a routine executed by a CPU of an apparatus (second determining apparatus) for determining an air-fuel ratio imbalance among cylinders according to a second embodiment of the present invention.

The second determining apparatus is different from the first determining apparatus only in that, when the air-fuel ratio imbalance among cylinder determination is performed, the CPU 71 of the second determining apparatus executes a routine for the air-fuel ratio imbalance among cylinder determination shown in FIG. 18 in place of FIG. 17, every time 4 m seconds (constant sampling time ts) elapses. Accordingly, hereinafter, this difference will be mainly described.

The routine shown in FIG. 18 is different from the routine shown in FIG. 17 only in that step 1730 of the routine shown in FIG. 17 is replaced by (with) step 1810. Accordingly, a process at step 1810 is described.

When the CPU 71 proceeds to step 1810, it performs, (H) calculating an average AveAFD of the absolute value of the air-fuel ratio fluctuation indicating amount AFD, (I) correcting the average AveAFD and the minimum value MINZ by (based on) the purge correction coefficient (purge correction amount) FPG, (J) calculating an integrated value Save of the corrected average AveAFDH, (K) calculating an integrated value SMINZ of the corrected minimum value MINZH, and (L) incrementing a cumulated number counter Cs.

The way to update these values will next be described more specifically.

(H) Calculating an Average AveAFD of the Absolute Value of the Air-Fuel Ratio Fluctuation Indicating Amount AFD, This process is the same as the process (E) which the CPU 71 of the first determining apparatus executes at step 1730. That is, the CPU 71 calculates the average AveAFD of the absolute value $|AFD|=|\Delta AF|$ of the air-fuel ratio fluctuation indicating amount AFD by dividing the integrated value SAFD by the value of the counter Cn.

Figure 19:
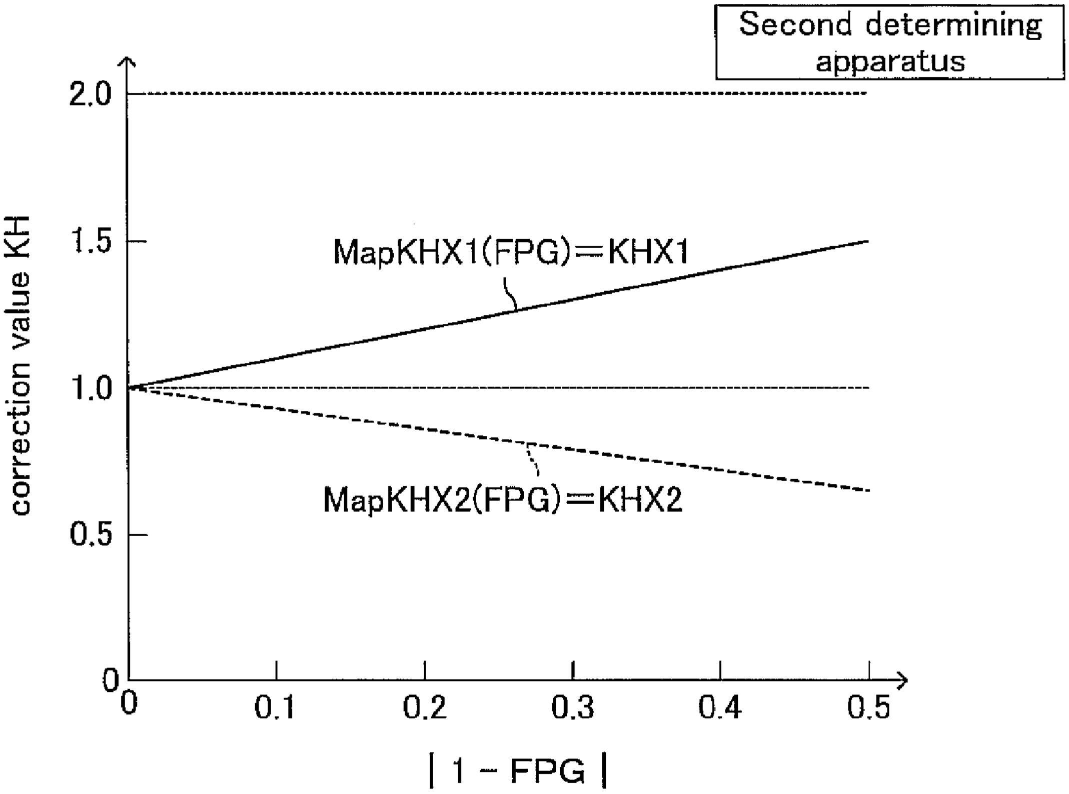
FIG. 19 is a look-up table to which the CPU of the second determining apparatus refers.

(I) Correcting the Average AveAFD and the Minimum Value MINZ by (Based on) the Purge Correction Coefficient (Purge Correction Amount) FPG The CPU 71 reads out a correction coefficient (first imbalance determination parameter evaporated fuel gas correction amount) KHX1 based on (from) a table MapKHX1(FPG) shown in FIG. 19 and the purge correction amount FPG at the present time.

According to the table MapKHX1(FPG), the correction coefficient KHX1 is determined in such a manner that the correction coefficient KHX1 becomes larger in a range larger than "1" as a correction ratio of the fuel by the purge correction coefficient FPG (i.e., the magnitude |1−FPG| of the difference between the purge correction amount FPG and "1" which is the reference value of the purge correction amount) becomes larger.

Thereafter, the CPU 71 obtains an evaporated fuel gas effect corrected average AveAFDH by multiplying the average AveAFD by the correction coefficient KHX1, as shown in a formula (30) described below. This can eliminate the effect on the "imbalance determination parameter (first imbalance determination parameter X1)" by the evaporated fuel gas. In other words, the evaporated fuel gas effect corrected average AveAFDH becomes equal to the "average AveAFD of the absolute value |AFD| of the air-fuel ratio fluctuation indicating amount AFD" which is obtained when the evaporated fuel gas purge is not being performed.

$$\mathrm{Ave}AFDH=KHX1\cdot\mathrm{Ave}AFD \qquad (30)$$

Similarly, the CPU 71 reads out a correction coefficient (second imbalance determination parameter evaporated fuel gas correction amount) KHX2 based on (from) a table MapKHX2(FPG) shown in FIG. 19 and the purge correction amount FPG at the present time. According to the table MapKHX2(FPG), the correction coefficient KHX2 is determined in such a manner that the correction coefficient KHX2 becomes smaller from "1" as the correction ratio |1−FPG| of the fuel by the purge correction coefficient FPG becomes larger from "0".

Thereafter, the CPU 71 obtains an evaporated fuel gas effect corrected minimum value MINZH by multiplying the minimum value MINZ by the correction coefficient KHX2, as shown in a formula (31) described below. This can eliminate the effect on the "imbalance determination parameter (second imbalance determination parameter X2)" by the evaporated fuel gas. In other words, the evaporated fuel gas effect corrected minimum value MINZH becomes equal to the "minimum value MINZH for the unit combustion cycle period" which is obtained when the evaporated fuel gas purge is not being performed.

$$\mathrm{MIN}ZH=KHX2\cdot\mathrm{MINZ} \qquad (31)$$

(J) Calculating the Integrated Value Save of the Corrected Average AveAFDH

The CPU 71 obtains a current integrated value Save(n) according to a formula (32) described below. That is, the CPU 71 updates the integrated value Save by adding the corrected average AveAFDH calculated as described above to a previous integrated value Save(n−1) when the CPU 71 proceeds to step 1810. The integrated value Save is set to (at) "0" by the initialization routine described above, and is also set to (at) "0" at step 1760. Further, the CPU 71 sets the minimum value MINZ to (at) a predetermined large default value.

$$\mathrm{Save}(n)=\mathrm{Save}(n-1)+\mathrm{Ave}AFDH \qquad (32)$$

(K) Calculating an Integrated Value SMINZ of the Corrected Minimum Value MINZH

The CPU 71 obtains a current integrated value SMINZ(n) according to a formula (33) described below. That is, the CPU 71 updates the integrated value SMINZ by adding the corrected MINZH to a previous integrated value SMINZ(n−1) when the CPU 71 proceeds to step 1810. The integrated value SMINZ is set to (at) "0" by the initialization routine described above, and is also set to (at) "0" at step 1760.

$$S\mathrm{MINZ}(n)=S\mathrm{MINZ}(n-1)+\mathrm{MIN}ZH \qquad (33)$$

(L) Incrementing the Cumulated Number Counter Cs.

The CPU 71 increments a value of the counter Cs by "1". The value of the counter Cs is set to (at) "0" by the initialization routine described above, and also is set to (at) "0" at step 1760. Therefore, the value of the counter Cs indicates (represents) the number of data of the corrected average AveAFDH which is added to the integrated value Save, and the number of data of the corrected minimum value MINZH which is added to the integrated value SMINZ.

Subsequently, the CPU 71 proceeds to step 1735 to determine whether or not the value of the counter Cs is equal to or larger than the threshold Csth. When the value of the counter Cs is smaller than the threshold Csth, the CPU 71 makes a "No" determination at step 1735 to directly proceed to step 1895 to end the present routine tentatively.

In contrast, if the value of the counter Cs is equal to or larger than the threshold Csth when the CPU 71 executes the process at step 1735, the CPU 71 makes a "Yes" determination at step 1735 to proceed to step 1740 at which the CPU 71 calculates the imbalance determination parameter X (first imbalance determination parameter X1 and second imbalance determination parameter X2).

More specifically, the CPU 71 calculates the first imbalance determination parameter X1 according to the formula (28) described above, by dividing the integrated value Save by the value of the counter Cs (=Csth). The first imbalance determination parameter X1 is the "imbalance determination parameter which becomes larger" as the difference among the individual cylinder air-fuel ratios becomes larger.

The CPU 71 calculates the second imbalance determination parameter X2 according to the formula (29) described above, by dividing the integrated value SMINZ by the value of the counter Cs (=Csth). The second imbalance determination parameter X2 is the "imbalance determination parameter which becomes smaller" as the difference among the individual cylinder air-fuel ratios becomes larger.

Subsequently, the CPU 71 proceeds to step 1745 to perform the air-fuel ratio imbalance among cylinders determination based on a comparison between the first imbalance determination parameter X1 and the first imbalance determination threshold X1th or a comparison between the second imbalance determination parameter X2 and the second imbalance determination threshold X2th.

As described above, similarly to the first determining apparatus, the second determining apparatus comprises allowing and prohibiting imbalance determining execution means for prohibiting obtaining the imbalance determination parameter or prohibiting performing/executing the imbalance determination, when it is determined that the evaporated fuel gas effect occurring state is occurring (refer to the condition C6 described above, "No" determination at step 1620 shown in FIG. 16, "Yes" determination at step 1640, and "No" determination at step 1705 shown in FIG. 18).

Further, the imbalance determination parameter obtaining means which the second determining apparatus comprises includes first parameter correction means for obtaining, based on the output value of the air-fuel ratio sensor, the imbalance determination parameter which becomes larger or smaller as the difference among the individual cylinder air-fuel ratios, each being the air-fuel ratio of the mixture supplied to each of a plurality of the two or more of the cylinders, becomes larger, and for correcting the imbalance determination parameter (refer to the process (I) described above at step 1810) based on the evaporated fuel gas purge correction amount (purge correction coefficient FPG) (when the magnitude |1−FPG| of the difference between the evaporated fuel gas purge correction amount and the reference value of the evaporated fuel gas purge correction amount is smaller than the predetermined purge effect determining threshold (Bth)) (refer to the condition C6, "Yes" determination at step 1620 shown in FIG. 16, "No" determination at step 1640 shown in FIG. 16, and "Yes" determination at step 1705 shown in FIG. 18)).

As described above, the difference among the individual cylinder air-fuel ratios due to the difference in the injection properties of the fuel injectors 39 becomes smaller as the amount of the fuel included in the evaporated fuel gas becomes larger. In view of the above, the second determining apparatus corrects, based on (by, with) the "actually calculated evaporated fuel gas purge correction amount (purge correction coefficient FPG)", the actually obtained imbalance determination parameter (in the second determining apparatus, the average AveAFD and the minimum value MINZ, each being a source (base) data for obtaining the imbalance determination parameter). Accordingly, the imbalance determination parameter can be corrected so as to become a value which is not affected by the evaporated fuel, and therefore, which accurately represents the difference among the individual cylinder air-fuel ratios due to the difference in the injection properties of the fuel injectors 39. Consequently, the second determining apparatus can perform the air-fuel ratio imbalance among cylinder determination with high accuracy.

It can be said that, when the threshold Csth is equal to "1" in step 1735 shown in FIG. 18, the second determining apparatus corrects the obtained imbalance determination parameter with (by) the correction value (KHX1, KHX2) determined based on the evaporated fuel gas correction amount to thereby obtain the final imbalance determination parameter.

The second determining apparatus obtains the corrected average AveAFDH by correcting the average AveAFD which is the source (base) data to obtain the first imbalance determination parameter X1 using the correction value KHX1 depending on the purge correction coefficient FPG, and obtains, as the first imbalance determination parameter X1, the average of the corrected average AveAFDH. In contrast, the second determining apparatus may firstly obtain an average AAveAFD (the first imbalance determination parameter X1 in the first determining apparatus) of the average AveAFD which is the source (base) data to obtain the first imbalance determination parameter X1, and thereafter, correct the average AAveAFD using (with, by) the correction value KHX1 depending on the purge correction coefficient FPG according to a formula similar to the formula (30) described above to thereby obtain the final first imbalance determination parameter X1.

The second determining apparatus also obtains the corrected minimum value MINZH by correcting the minimum value MINZ which is the source (base) data to obtain the second imbalance determination parameter X2 using the correction value KHX2 depending on the purge correction coefficient FPG, and obtains, as the second imbalance determination parameter X2, the average of the corrected minimum value MINZH. In contrast, the second determining apparatus may firstly obtain an average AAveMINZ (the second imbalance determination parameter X2 in the first determining apparatus) of the minimum value which is the source (base) data to obtain the second imbalance determination parameter X2, and thereafter, correct the average AAveMINZ using (with, by) the correction value KHX2 depending on the purge correction coefficient FPG according to a formula similar to the formula (31) described above to thereby obtain the final second imbalance determination parameter X2.

Third Embodiment

A determining apparatus (hereinafter, referred to as a "third determining apparatus") according to a third embodiment of the present invention will next be described.

Figure 20:
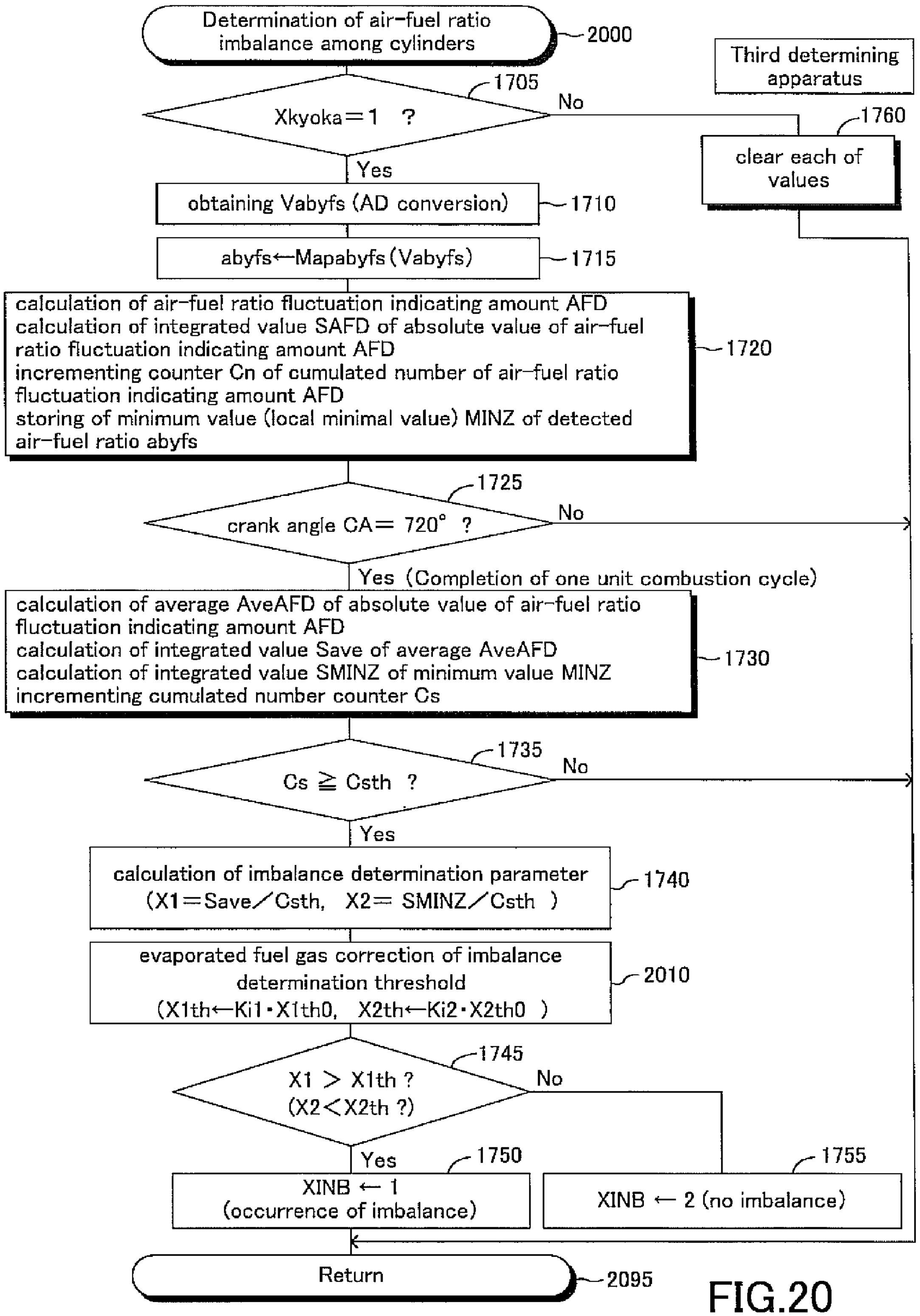
FIG. 20 is a flowchart showing a routine executed by a CPU of an apparatus (third determining apparatus) for determining an air-fuel ratio imbalance among cylinders according to a third embodiment of the present invention.

The third determining apparatus is different from the first determining apparatus only in that, when the air-fuel ratio imbalance among cylinder determination is performed, the CPU 71 of the third determining apparatus executes a routine for the air-fuel ratio imbalance among cylinder determination shown in FIG. 20 in place of FIG. 17, every time 4 m seconds (constant sampling time ts) elapses. Accordingly, hereinafter, this difference will be mainly described.

Whereas the second determining apparatus corrects the imbalance determination parameter with (by) the purge correction value (more specifically, the correction coefficient KHX1, KHX2 determined based on the purge correction coefficient FPG), the third determining apparatus does not correct the imbalance determination parameter, but instead, the third determining apparatus corrects the imbalance determination threshold with (by) the purege correction value.

The routine shown in FIG. 20 is different from the routine shown in FIG. 17 only in that the step 2010 is inserted between step 1740 and step 1745. Accordingly, a process at step 2010 will be mainly described.

The CPU 71 calculates, at step 1740, the first imbalance determination parameter X1 and/or the second imbalance determination parameter X2. The first imbalance determination parameter X1 is the average value of the "average value of the absolute value $|\Delta AF|$ of the detected air-fuel ratio changing rate $\Delta AF$ for the single unit combustion cycle period" for a plurality (Csth) of the unit combustion cycle periods. The second imbalance determination parameter X2 is the average value of the "minimum value MINZ of the detected air-fuel ratio abyfs for the single unit combustion cycle period" for a plurality (Csth) of the unit combustion cycle periods.

Figure 21:
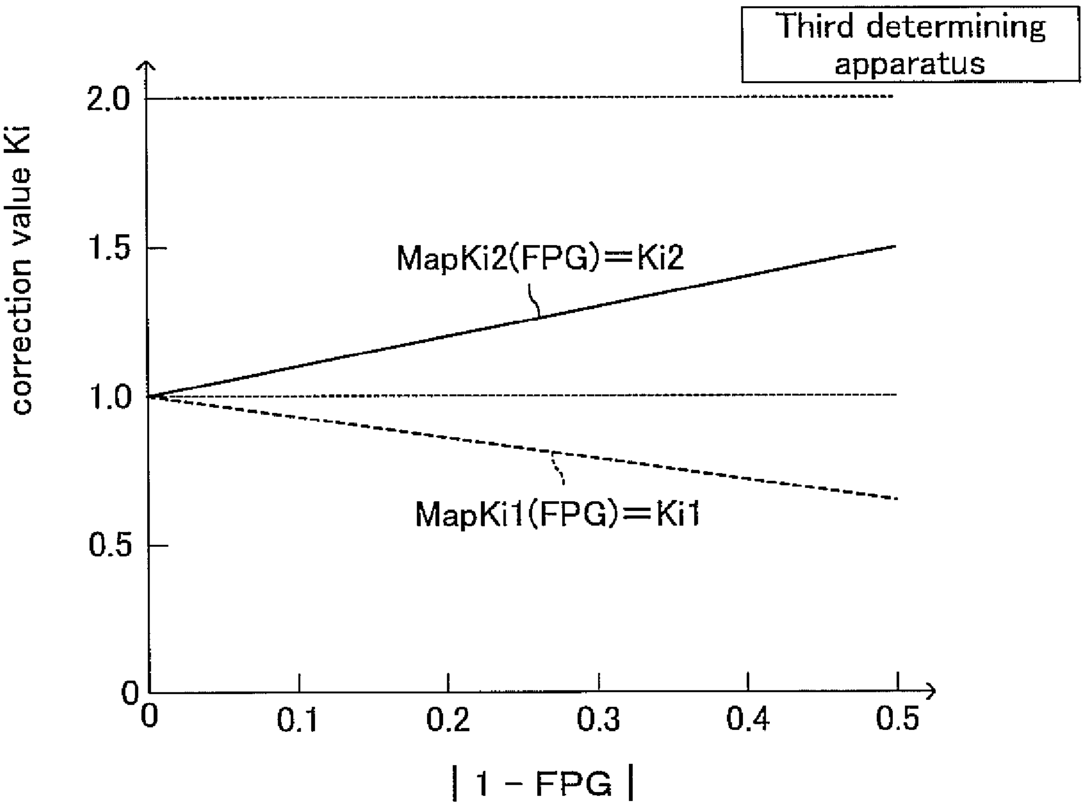
FIG. 21 is a look-up table to which the CPU of the third determining apparatus refers.

The CPU 71 proceeds to step 2010 to read out a correction coefficient Ki1 (first evaporated fuel correction value for the imbalance determination threshold) based on (from) a table MapKi1(FPG) shown in FIG. 21 and the purge correction coefficient FPG at the present time.

According to the table MapKi1(FPG), the correction coefficient Ki1 is determined in such a manner that the correction coefficient Ki1 becomes smaller from "1" as the correction ratio $|1-FPG|$ of the fuel by the purge correction coefficient FPG becomes larger from "0".

Thereafter, the CPU 71 obtains a corrected first imbalance determination threshold X1th by multiplying a constant reference threshold (first imbalance determination threshold) X1th0 by the correction coefficient Ki1, as in a formula (34) described below. The constant reference threshold X1th0 is a value which is adjusted so as to allow to determine that the "air-fuel ratio imbalance among cylinders due to the change in the properties of the fuel injectors is occurring when the first imbalance determination parameter X1 is larger than the reference threshold X1th0" while the evaporated fuel gas purge is not being performed. According to the configuration described above, the air-fuel ratio imbalance among cylinders determination can be performed irrespective of a degree of the effect caused by the evaporated fuel gas even when the "imbalance determination parameter (first imbalance determination parameter X1)" is affected by the evaporated fuel gas.

$$X1th = Ki1 \cdot X1th0 \quad (34)$$

Similarly, the CPU 71 reads out, at step 2010, a correction coefficient Ki2 (second evaporated fuel correction value for the imbalance determination threshold) based on (from) a table MapKi2(FPG) shown in FIG. 21 and the purge correction coefficient FPG at the present time.

According to the table MapKi2(FPG), the correction coefficient Ki2 is determined in such a manner that the correction coefficient Ki2 becomes larger from "1" within a range larger than "1", as the correction ratio |1−FPG| of the fuel by the purge correction coefficient FPG becomes larger. Thereafter, the CPU 71 obtains a corrected second imbalance determination threshold X2th by multiplying a constant reference threshold (second imbalance determination threshold) X2th0 by the correction coefficient Ki2, as in a formula (35) described below. The constant reference threshold X2th0 is a value which is adjusted so as to allow to determine that the "air-fuel ratio imbalance among cylinders is occurring when the second imbalance determination parameter X2 is smaller than the reference threshold X2th0" while the evaporated fuel gas purge is not being performed. According to the configuration described above, the air-fuel ratio imbalance among cylinders determination can be performed irrespective of the degree of the effect caused by the evaporated fuel gas even when the "imbalance determination parameter (second imbalance determination parameter X2)" is affected by the evaporated fuel gas.

$$X2th=Ki2\cdot X2th0 \tag{35}$$

Subsequently, the CPU 71 proceeds to step 1745 to perform the air-fuel ratio imbalance determination using (based on) a comparison between the first imbalance determination parameter X1 which is not corrected and the first imbalance determination threshold X1th which is corrected as to the evaporated fuel gas effect as described above. Alternatively, the CPU 71 performs the air-fuel ratio imbalance determination using (based on) a comparison between the second imbalance determination parameter X2 which is not corrected and the second imbalance determination threshold X2th which is corrected as to the evaporated fuel gas effect as described above.

That is, the CPU 71 determines that the air-fuel ratio imbalance among cylinders due to the change in the properties of the fuel injectors 39, when the first imbalance determination parameter X1 is larger than the evaporated fuel gas effect corrected first imbalance determination threshold X1th. Alternatively, the CPU 71 determines that the air-fuel ratio imbalance among cylinders due to the change in the properties of the fuel injectors 39, when the second imbalance determination parameter X2 is smaller than the evaporated fuel gas effect corrected second imbalance determination threshold X2th.

As described above, similarly to the first determining apparatus, the third determining apparatus comprises allowing and prohibiting imbalance determining execution means for prohibiting obtaining the imbalance determination parameter or prohibiting performing/executing the imbalance determination, when it is determined that the evaporated fuel gas effect occurring state is occurring (refer to the condition C6 described above, "No" determination at step 1620 shown in FIG. 16, "Yes" determination at step 1640, and "No" determination at step 1705 shown in FIG. 20).

Further, the imbalance determination parameter obtaining means which the third determining apparatus comprises includes first determination threshold correction means (step 2010 shown in FIG. 20) for correcting, based on the evaporated fuel gas purge correction amount, the imbalance determination threshold. That is, the first determination threshold correction means corrects the reference threshold X1th0 to thereby obtain the first imbalance determination threshold X1th, or alternatively, corrects the reference threshold X2th0 to thereby obtain the second imbalance determination threshold X2th.

In this manner, instead of correcting the imbalance determination parameter, correcting the imbalance determination threshold (X1th, X2th) based on the actually calculated evaporated fuel gas purge correction amount (purge correction coefficient FPG) changes the imbalance determination threshold to a value which corresponds to the effect of the evaporated fuel gas on the imbalance determination parameter (X1, X2). Consequently, when the difference among the individual cylinder air-fuel ratios due to the difference between (among) the injection properties of the fuel injectors 39 reaches the predetermined value, it can be accurately determined that the air-fuel ratio imbalance among cylinders has been occurring.

Fourth Embodiment

A determining apparatus (hereinafter, referred to as a "fourth determining apparatus") according to a fourth embodiment of the present invention will next be described.

Figure 22:
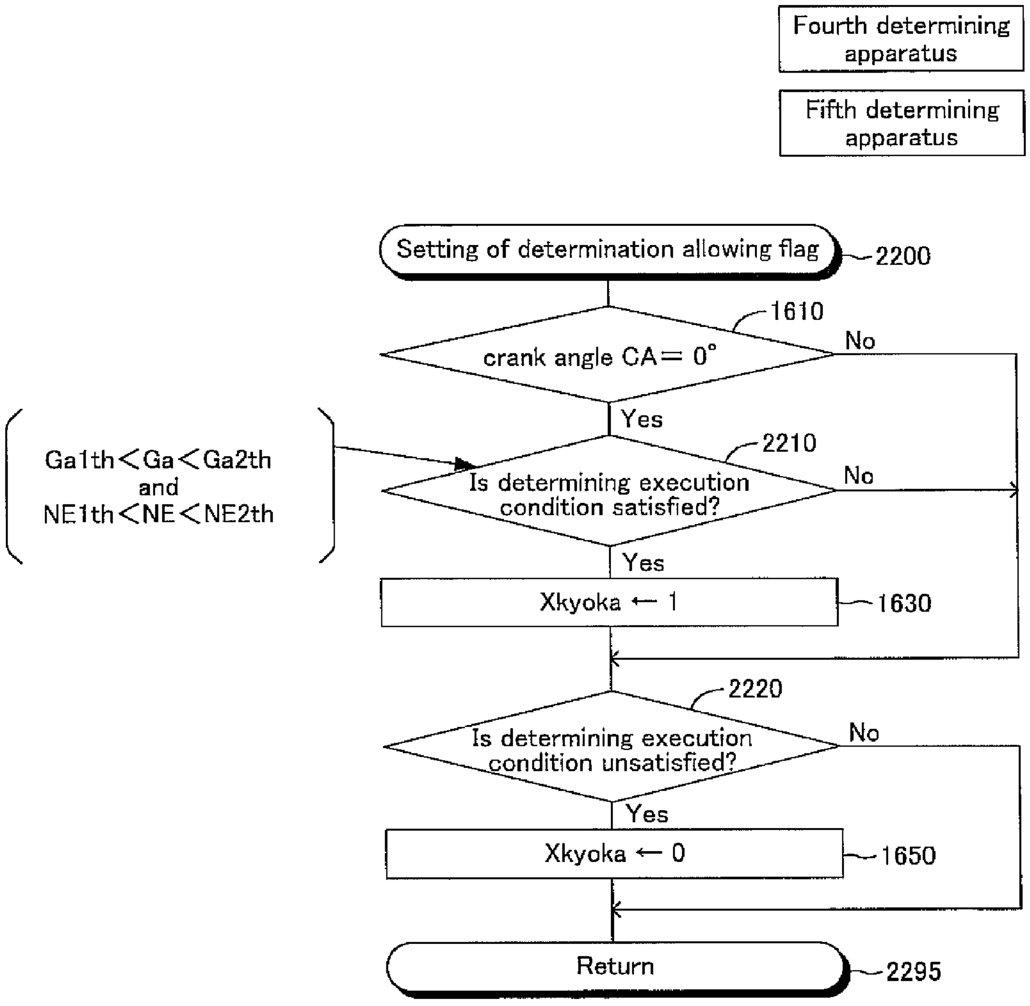
FIG. 22 is a flowchart showing a routine executed by a CPU of apparatuses (fourth determining apparatus and fifth determining apparatus) for determining an air-fuel ratio imbalance among cylinders according to fourth and fifth embodiments of the present invention.

The fourth determining apparatus is different from the second determining apparatus only in that the CPU 71 of the fourth determining apparatus executes a routine shown in FIG. 22 in place of the routine shown in FIG. 16. That is, the fourth determining apparatus executes the routines shown in FIGS. 10-15, 18, and 22. FIGS. 10-15, and 18 among these have already been described. Accordingly, hereinafter, the routine shown in FIG. 22 will be mainly described.

The routine shown in FIG. 22 is different from the routine shown in FIG. 16 only in that step 1620 and step 1640 of the routine shown in FIG. 16 are replaced by (with) the step 2210 and step 2220, respectively. The CPU 71 determines that a determining execution condition is satisfied when the conditions C1 to C5 (or the conditions C1 to C3) are satisfied at step 2210. In other words, the fourth apparatus allows to perform the air-fuel ratio imbalance determination regardless of whether or not the purge correction coefficient FPG is larger than or equal to the purge correction coefficient threshold FPGth. That is, the condition that the "evaporated fuel gas effect occurring state is not occurring" which is determined by determining whether or not the absolute value |1−FPG| of the difference between the purge correction coefficient FPG and "1" which is the reference value of the purge correction coefficient FPG is smaller than the purge effect determination threshold Bth which is positive does not constitute one of the determining execution condition.

Meanwhile, similarly to the second determining apparatus, the fourth determining apparatus obtains the corrected average AveAFDH by multiplying the average AveAFD by the "correction coefficient KHX1 determined from the table MapKHX1(FPG) and the purge correction coefficient FPG at the present time", and obtains, as the first imbalance determination parameter X1, the average (Save/Csth) of the corrected average AveAFDH.

Further, similarly to the second determining apparatus, the fourth determining apparatus obtains the corrected minimum value MINZ by multiplying the minimum value MINZ by the "correction coefficient KHX2 determined from the table MapKHX2(FPG) and the purge correction coefficient FPG at the present time", and obtains, as the second imbalance determination parameter X2, the average (SMINZ/Csth) of the corrected minimum value MINZH.

In addition, similarly to the second determining apparatus, the fourth determining apparatus performs the air-fuel ratio imbalance among cylinders determination based on the comparison between the first imbalance determination parameter X1 and the first imbalance determination threshold X1th or the comparison between the second imbalance determination parameter X2 and the second imbalance determination threshold X2th.

As described above, the fourth determining apparatus performs the air-fuel ratio imbalance determination using "the first imbalance determination parameter X1 and/or the second imbalance determination parameter X2" from which the evaporated fuel gas effect is eliminated, regardless of whether or not the purge correction coefficient FPG is larger than or equal to the purge correction coefficient threshold FPGth. Accordingly, the fourth determining apparatus can perform the air-fuel ratio imbalance determination more frequently, compared with the first to third determining apparatuses.

Fifth Embodiment

A determining apparatus (hereinafter, referred to as a "fifth determining apparatus") according to a fifth embodiment of the present invention will next be described.

The fifth determining apparatus is different from the third determining apparatus only in that the CPU 71 of the fifth determining apparatus executes a routine shown in FIG. 22 in place of the routine shown in FIG. 16. That is, the fifth determining apparatus executes the routines shown in FIGS. 10-15, 20, and 22. Therefore, similarly to the fourth determining apparatus, the fifth determining apparatus obtains the imbalance determination parameter and performs the air-fuel ratio imbalance determination, regardless of whether or not the purge correction coefficient FPG is larger than or equal to the purge correction coefficient threshold FPGth (i.e., regardless of whether or not the evaporated fuel gas effect occurring state is occurring).

Further, similarly to the third determining apparatus, the fifth determining apparatus obtains the corrected first imbalance determination threshold X1th by multiplying the constant reference threshold X1th0 by the correction value Ki1 obtained from the table MapKi1(FPG) and the actual purge correction coefficient FPG. Thereafter, the fifth determining apparatus performs the air-fuel ratio imbalance among cylinders determination by comparing the first imbalance determination parameter X1 which is not corrected with the first imbalance determination threshold X1th which is corrected.

Further, similarly to the third determining apparatus, the fifth determining apparatus obtains the corrected second imbalance determination threshold X2th by multiplying the constant reference threshold X2th0 by the correction value Ki2 obtained from the table MapKi2(FPG) and the actual purge correction coefficient FPG. Thereafter, the fifth determining apparatus performs the air-fuel ratio imbalance among cylinders determination by comparing the second imbalance determination parameter X2 which is not corrected with the second imbalance determination threshold X2th which is corrected.

Accordingly, the fifth determining apparatus can perform the air-fuel ratio imbalance among cylinders determination more frequently, compared to the first to third determining apparatuses.

Sixth Embodiment

A determining apparatus (hereinafter, referred to as a "sixth determining apparatus") according to a sixth embodiment of the present invention will next be described.

Figure 23:
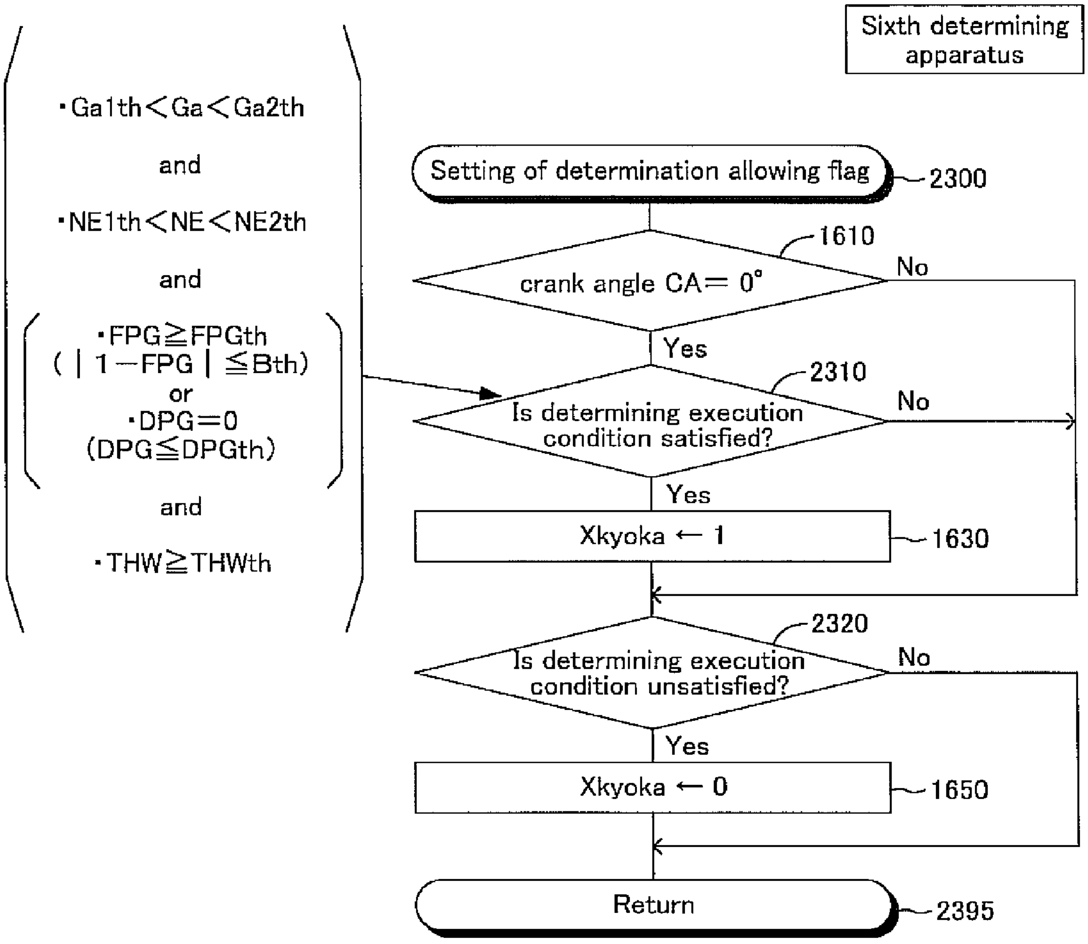
FIG. 23 is a flowchart showing a routine executed by a CPU of an apparatus (sixth determining apparatus) for determining an air-fuel ratio imbalance among cylinders according to a sixth embodiment of the present invention.

The sixth determining apparatus is different from the first determining apparatus only in that the CPU 71 of the sixth determining apparatus executes a routine shown in FIG. 23 in place of the routine shown in FIG. 16. That is, the sixth determining apparatus executes the routines shown in FIGS. 10-15, 17, and 23.

The sixth determining apparatus obtains the "cooling-water temperature THW" which is a "warming-up state parameter which becomes higher (larger) as the warming-up state of the engine 10 proceeds". Further, the sixth determining apparatus determines, based on the warming-up state parameter, determines whether or not the warming-up state of the engine 10 has reached a predetermined warming-up state. Thereafter, the sixth determining apparatus prohibits obtaining the imbalance determination parameter or prohibits performing/executing the imbalance determination when the sixth determining apparatus has determined that the warming-up state of the engine 10 has not yet reached the predetermined warming-up state. It should be noted that, similarly to the first determining apparatus, the sixth determining apparatus prohibits obtaining the imbalance determination parameter or prohibits performing/executing the imbalance determination when the purge correction coefficient FPG is smaller than the purge correction coefficient threshold FPGth.

More specifically, the sixth determining apparatus sets (changes) the value of the determination allowing flag Xkyoka by the routine shown in FIG. 23. The routine shown in FIG. 23 is different from the routine shown in FIG. 16 only in that step 1620 and step 1640 shown in FIG. 16 are replaced with (by) the step 2310 and step 2320, respectively.

At step 2310, the CPU 71 determines that determining execution condition is satisfied when not only the conditions C1 to C6 described above but also the condition C7 described below are satisfied. Alternatively, the CPU 71 may determine that determining execution condition is satisfied when the conditions C1, C3, C6, and C7 are satisfied.

(condition C7) The cooling-water temperature THW obtained from the water temperature sensor 63 is higher than or equal to an imbalance determination cooling-water temperature threshold THWth.

In other words, the sixth determining apparatus prohibits obtaining the imbalance determination parameter or prohibits performing/executing the imbalance determination, when the cooling-water temperature THW is lower than the imbalance determination cooling-water temperature threshold THWth. In the present example, the imbalance determination cooling-water temperature threshold THWth is set at (to) a cooling-water temperature THW 80 (=80° C.) when the engine is fully (completely) warmed-up. Accordingly, the sixth determining apparatus prohibits obtaining the imbalance determination parameter or prohibits performing/executing the imbalance determination, when the engine 10 has not reached the fully warmed-up state. It should be noted that the cooling-water temperature threshold THWth is preferably higher than or equal to the first determined temperature which defines one of the main feedback conditions, and is preferably higher than or equal to the second determined temperature which defines one of the sub feedback conditions.

When the warming-up state of the engine 10 is not sufficient as for a certain period immediately after the engine 10 is cold-started, and thus, a "temperature of intake passage constituting members including the intake ports 31, the intake valves 32, and the like" is low, a relatively large amount of a part of a fuel injected from the injectors 39 adheres to the intake passage constituting members. Further, a fuel injected from a fuel injector, among a plurality of the fuel injectors 39, whose "injection property is one that the injector injects a larger amount of fuel than the instructed fuel injection amount" adheres more to the intake passage constituting members than a fuel injected from a fuel injector whose "injection property is normal".

Accordingly, when the warming-up state of the engine 10 has not yet reached a certain warming-up state (e.g., the warming-up state in which an amount of the fuel adhering to the intake passage constituting members is smaller than or equal to a predetermined amount), the difference among individual air-fuel ratios does not become large, and thus, there is a possibility that it is determined that the air-fuel ratio imbalance among cylinders due to the change in the property of the fuel injectors has not been occurring", even though the fuel injection property of the fuel injector of a specific cylinder is greatly different from the fuel injection property of the fuel injectors of the other cylinders.

In contrast, the sixth determining apparatus includes allowing and prohibiting imbalance determining execution means which is configured so as to determine whether or not the warming-up state of the engine 10 has reached the predetermined warming-up state, and so as to prohibit obtaining the imbalance determination parameter or prohibit performing/executing the imbalance determination when it is determined that the warming-up state of the engine 10 has not yet reached the predetermined warming-up state (i.e., when the cooling-water temperature THW is lower than the cooling-water temperature threshold THWth) (refer to "No" determination at step 2310 shown in FIG. 23, "Yes" determination at step 2320 shown in FIG. 23, and "No" determination at step 1705 shown in FIG. 17). That is, when the warming-up state of the engine 10 has not yet reached the predetermined warming-up state, performing the determination as to whether or not the air-fuel ratio imbalance among cylinders is substantially prohibited. Accordingly, a likelihood is reduces of erroneously making the air-fuel ratio imbalance among determination.

Seventh Embodiment

A determining apparatus (hereinafter, referred to as a "seventh determining apparatus") according to a seventh embodiment of the present invention will next be described.

Figure 24:
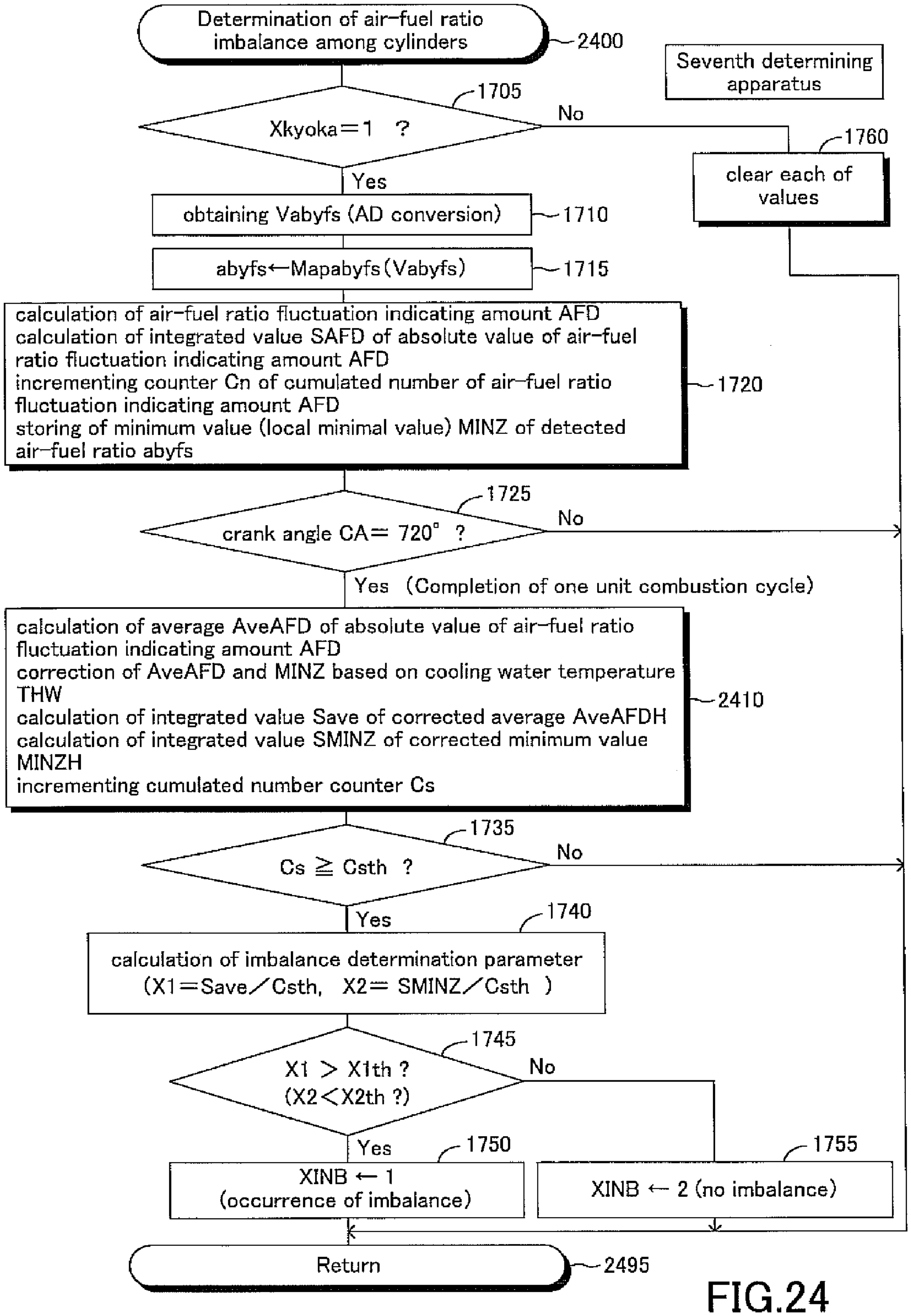
FIG. 24 is a flowchart showing a routine executed by a CPU of an apparatus (seventh determining apparatus) for determining an air-fuel ratio imbalance among cylinders according to a seventh embodiment of the present invention.

The CPU 71 of the seventh determining apparatus executes the routines shown in FIGS. 10-15, 23, and 24. The routines shown in FIGS. 10-15, and 23 have been already described. Accordingly, hereinafter, the routine shown in FIG. 24 is described. It should be noted that the cooling-water temperature threshold THWth used at step 2310 shown in FIG. 23 is set to (at) a value lower than the fully warmed-up coolant-temperature THW80 (=80° C.). The seventh determining apparatus executes the routine shown in FIG. 24 to thereby correct the imbalance determination parameter based on the warming-up state of the engine 10 (i.e., adherability of the fuel to the intake passage constituting members).

The routine shown in FIG. 24 is different from the routine shown in FIG. 17 only in that step 1730 is replaced with (by) step 2410. Accordingly, hereinafter, steps following step 2410 will be mainly described.

When the CPU 71 proceeds to step 2410, it calculates the average AveAFD of the absolute value of the air-fuel ratio fluctuation indicating amount AFD (E), similarly to step 1730.

Subsequently, the CPU 71 reads out a correction coefficient (water temperature coefficient, first imbalance determination parameter warming-up state correction value) KthwX1 from a table MapKthwX1(THW) shown in FIG. 25 and the cooling-water temperature THW at the present time.

According to the table MapKthwX1(THW), the correction coefficient KthwX1 is determined in such a manner that the correction coefficient KthwX1 becomes smaller from a value larger than "1" to "1" as the cooling-water temperature THW becomes higher toward the fully warmed-up coolant-temperature THW80 (=80° C.). Further, according to the table MapKthwX1(THW), the correction coefficient KthwX1 is determined to become "1" when the cooling-water temperature THW is higher than the fully warmed-up coolant-temperature THW80.

Thereafter, the CPU 71 obtains, a cooling water temperature corrected average AveAFDH by multiplying the average AveAFD by the correction coefficient Kthw1, as shown in a formula (36) described below. The cooling water temperature corrected average AveAFDH may be referred to as a "warming-up state corrected average AveAFDH" or a "fuel adhering amount corrected average AveAFDH". This can eliminate the effect on the "first imbalance determination parameter X1" by the fuel adhering to the intake passage constituting members. In other words, the cooling water temperature corrected average AveAFDH becomes equal to the "average AveAFD of the absolute value |AFD| of the air-fuel ratio fluctuation indicating amount AFD" which is obtained when the state of the engine 10 is in the fully warmed-up state, and thus, the fuel adhering amount is stable at a small value.

$$\mathrm{Ave}AFDH=KthwX1\cdot \mathrm{Ave}AFD \quad (36)$$

Figure 25:
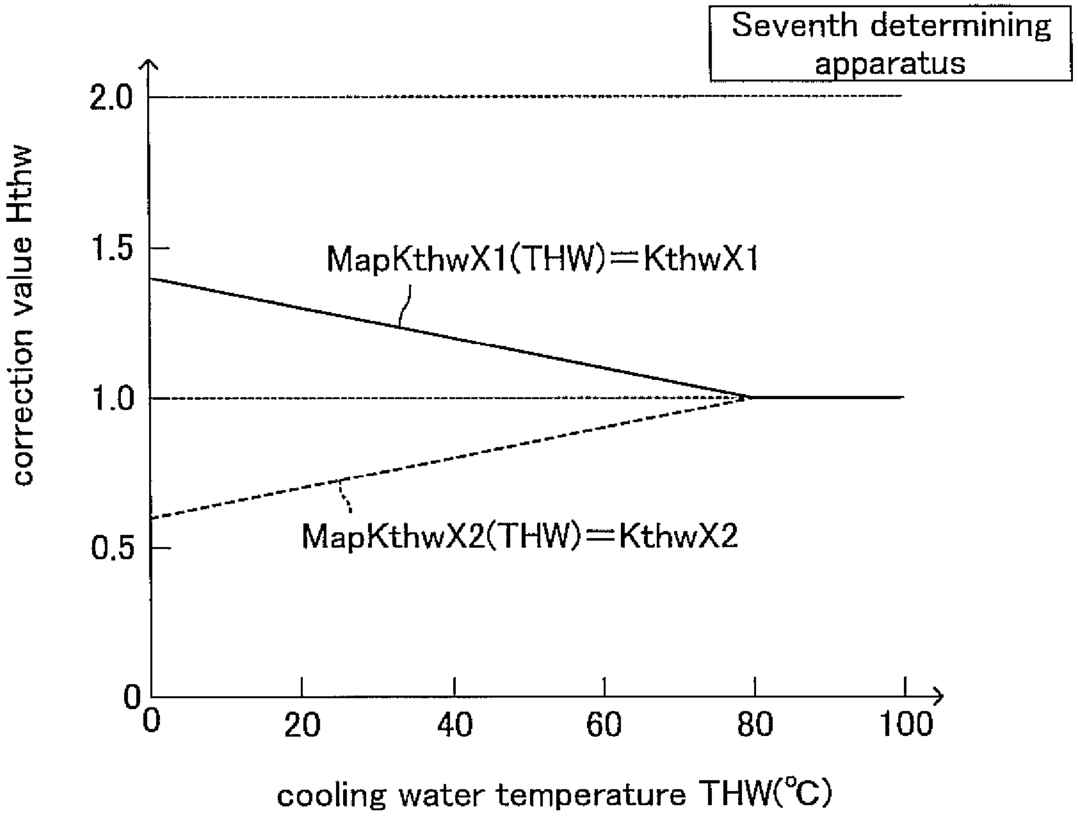
FIG. 25 is a look-up table to which the CPU of the seventh determining apparatus refers.

Similarly, the CPU 71 reads out a correction coefficient (water temperature coefficient, second imbalance determination parameter warming-up state correction value) KthwX2 from a table MapKthwX2(THW) shown in FIG. 25 and the cooling-water temperature THW at the present time. According to the table MapKthwX2(THW), the correction coefficient KthwX2 is determined in such a manner that the correction coefficient KthwX2 becomes larger from a value smaller than "1" to "1" as the cooling-water temperature THW becomes higher toward the fully warmed-up coolant-temperature THW80 (=80° C.). Further, according to the table MapKthwX2(THW), the correction coefficient KthwX2 is determined to become "1" when the cooling-water temperature THW is higher than the fully warmed-up coolant-temperature THW80.

Thereafter, the CPU 71 obtains a cooling water temperature corrected minimum value MINZH by multiplying the minimum value MINZ by the correction coefficient Kthw2, as shown in a formula (37) described below. The cooling water temperature corrected minimum value MINZH may be referred to as a "warming-up state corrected minimum value MINZH" or a "fuel adhering amount corrected minimum value MINZH". This can eliminate the effect on the "second imbalance determination parameter X2" by the fuel adhering to the intake passage constituting members. In other words, the cooling water temperature corrected minimum value MINZH becomes equal to the "minimum value MINZ for the unit combustion cycle period" which is obtained when the state of the engine 10 is in the fully warmed-up state, and thus, the fuel adhering amount is stable at a small value.

$$\mathrm{MIN}ZH=KthwX2\cdot \mathrm{MINZ} \quad (37)$$

Thereafter, similarly to step 1810 shown in FIG. 18, the CPU 71 calculates an integrated value Save of the cooling water temperature corrected average AveAFDH (refer to (J) described above, and the formula (32) described above). Further, similarly to step 1810 shown in FIG. 18, the CPU 71 calculates an integrated value SMINZ of the cooling water temperature corrected minimum value MINZH (refer to (K) described above, and the formula (33) described above).

Subsequently, similarly to step 1730, the CPU 71 increments the value of the counter Cs by "1" (refer to (L) described above).

Subsequently, the CPU 71 proceeds to step 1735 to determine whether or not the value of the counter Cs is larger than or equal to the threshold Csth. When the value of the counter Cs is smaller than the threshold Csth, the CPU 71 makes a "No" determination at step 1735 to directly proceed to step 2495 to end the present routine tentatively.

In contrast, if the value of the counter Cs is equal to or larger than the threshold Csth when the CPU 71 executes the process at step 1735, the CPU 71 makes a "Yes" determination at step 1735 to proceed to step 1740 at which the CPU 71 calculates the imbalance determination parameter X (first imbalance determination parameter X1 and second imbalance determination parameter X2), according to the formula (28) and the formula (29).

Subsequently, the CPU 71 proceeds to step 1745 to perform the air-fuel ratio imbalance among cylinders determination based on a comparison between the first imbalance determination parameter X1 and the first imbalance determination threshold X1th or a comparison between the second imbalance determination parameter X2 and the second imbalance determination threshold X2th.

As described above, the seventh determining apparatus comprises allowing and prohibiting imbalance determining execution means for prohibiting obtaining the imbalance determination parameter or prohibiting performing/executing the imbalance determination, not only when it is determined that the evaporated fuel gas effect occurring state is occurring, but also when the warming-up state of the engine 10 has not yet reached the predetermined warming-up state (which is the state in which the warming-up state has not proceeded compared with the fully warmed-up state) (refer to the condition C7 described above, "No" determination at step 2310 shown in FIG. 23, "Yes" determination at step 2320, and "No" determination at step 1705 shown in FIG. 24).

Further, the seventh determining apparatus includes second parameter correction means which corrects the imbalance determination parameter (first imbalance determination parameter X1, and second imbalance determination parameter X2) based on the warming-up state parameter (cooling water temperature THW), when the obtained warming-up state parameter is larger than the warming-up state parameter threshold (threshold THWth) (refer to the correction according to the formula (36) and the formula (37) at step 2410 shown in FIG. 24).

Accordingly, the seventh determining apparatus can perform the air-fuel ratio imbalance among cylinders determination based on the imbalance determination parameter which is corrected so as to be a parameter which is not affected by the amount of the fuel adhering to the intake passage constituting members, and therefore, can perform the air-fuel ratio imbalance among cylinders determination accurately even before the warming-up state of the engine 10 has not reached the fully warmed-up state.

When the threshold Csth is equal to "1" at step 1735 shown in FIG. 24, it can be said that the seventh determining apparatus obtains the final imbalance determination parameter by correcting the obtained imbalance determination parameter (the average AveAFD or the minimum value MINZ) with (by) the correction amount (the correction coefficient KthwX1, the correction coefficient KthwX2) determined based on the parameter indicative of the warming-up state of the engine (cooling water temperature).

The seventh determining apparatus obtains the corrected average AveAFDH by correcting the average AveAFD which is the source (base) data to obtain the first imbalance determination parameter X1 using the correction value KthwX1 depending on the cooling water temperature THW, and obtains, as the first imbalance determination parameter X1, the average of the corrected average AveAFDH. In contrast, the seventh determining apparatus may firstly obtain an average AAveAFD of the average AveAFD which is the source (base) data to obtain the first imbalance determination parameter X1, and thereafter, correct the average AAveAFD using (with, by) the correction value KthwX1 depending on the cooling water temperature THW according to a formula similar to the formula (36) described above to thereby obtain the final first imbalance determination parameter X1.

The seventh determining apparatus also obtains the corrected minimum value MINZH by correcting the minimum value MINZ which is the source (base) data to obtain the second imbalance determination parameter X2 using the correction value KthwX2 depending on the cooling water temperature THW, and obtains, as the second imbalance determination parameter X2, the average of the corrected minimum value MINZH. In contrast, the second determining apparatus may firstly obtain an average AAveMINZ of the minimum value MINZ which is the source (base) data to obtain the second imbalance determination parameter X2, and thereafter, correct the average AAveMINZ using (with, by) the correction value KthwX2 depending on the cooling water temperature THW according to a formula similar to the formula (37) described above to thereby obtain the final second imbalance determination parameter X2.

Eighth Embodiment

A determining apparatus (hereinafter, referred to as an "eighth determining apparatus") according to an eighth embodiment of the present invention will next be described.

Figure 26:
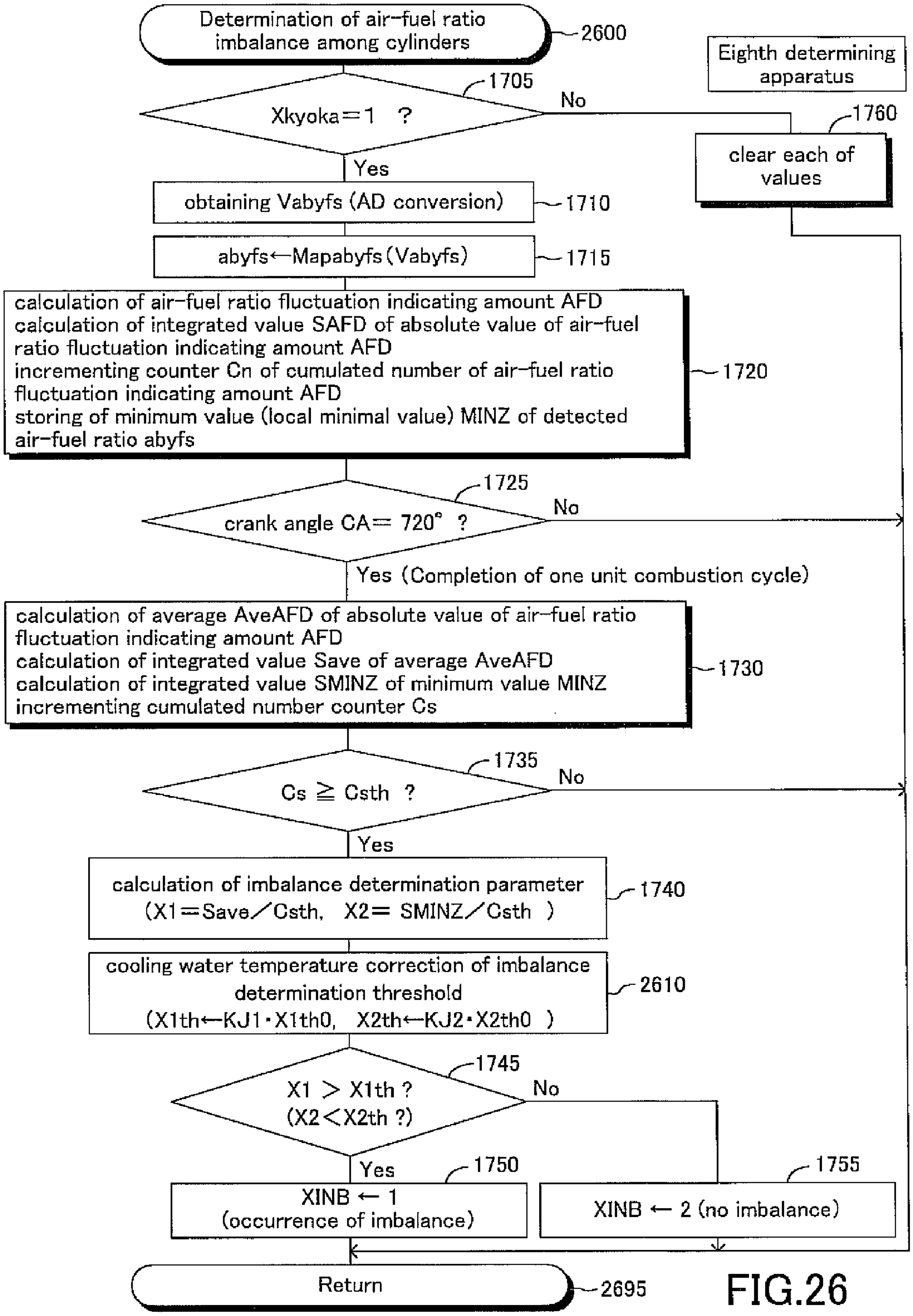
FIG. 26 is a flowchart showing a routine executed by a CPU of an apparatus (eighth determining apparatus) for determining an air-fuel ratio imbalance among cylinders according to an eighth embodiment of the present invention.

The CPU 71 of the eighth determining apparatus executes the routines shown in FIGS. 10-15, 23, and 26. The routines shown in FIGS. 10-15, and 23 have been described. Accordingly, hereinafter, the routine shown in FIG. 26 is described. It should be noted that the determination cooling-water temperature threshold THWth used at step 2310 shown in FIG. 23 is set to (at) a value lower than the fully warmed-up coolant-temperature THW80 (=80° C.). The eighth determining apparatus executes the routine shown in FIG. 26 to thereby correct the imbalance determination threshold based on the warming-up state of the engine 10 (i.e., adherability of the fuel to the intake passage constituting members) in place of correcting the imbalance determination parameter.

The routine shown in FIG. 26 is different from the routine shown in FIG. 17 only in that step 2610 is inserted between step 1740 and step 1745. Accordingly, hereinafter, step 2610 will be mainly described.

At step 1740, the CPU 71 calculates the first imbalance determination parameter X1 and the second imbalance determination parameter X2. Subsequently, the CPU 71 proceeds to step 2610 to read out a correction coefficient (first imbalance determination threshold cooling water temperature correction value) KJ1 from a table MapKJ1(THW) shown in FIG. 27 and the cooling-water temperature THW at the present time.

According to the table MapKJ1(THW), the correction coefficient KJ1 is determined in such a manner that the correction coefficient KJ1 becomes larger from a value smaller than "1" to "1" as the cooling-water temperature THW becomes higher toward the fully warmed-up coolant-temperature THW80 (=80° C.). Further, according to the table MapKJ1(THW), the correction coefficient KJ1 is determined to become "1" when the cooling-water temperature THW is higher than the fully warmed-up coolant-temperature THW80.

Thereafter, the CPU 71 obtains, as shown in a formula (38) described below, a water temperature corrected first imbalance determination threshold X1th by multiplying the constant reference threshold X1th0 by the correction value KJ1. The constant reference threshold X1th0 is a value which is adjusted so as to allow to determine that the "air-fuel ratio imbalance among cylinders due to the change in the properties of the fuel injectors is occurring when the first imbalance determination parameter X1 is larger than the reference threshold X1th0" in a case where the state of the engine 10 is in the fully warmed-up state (THW≥THW80=80° C.), and thus, the fuel adhering amount is stable at a small value (and when the evaporated fuel gas purge is not being carried out). According to the configuration described above, the air-fuel ratio imbalance among cylinders determination can be performed irrespective of a degree of the effect caused by the adhering fuel even when the "imbalance determination parameter (first imbalance determination parameter X1)" is affected by the adhering fuel.

$$X1th=KJ1\cdot X1th0 \quad (38)$$

Figure 27:
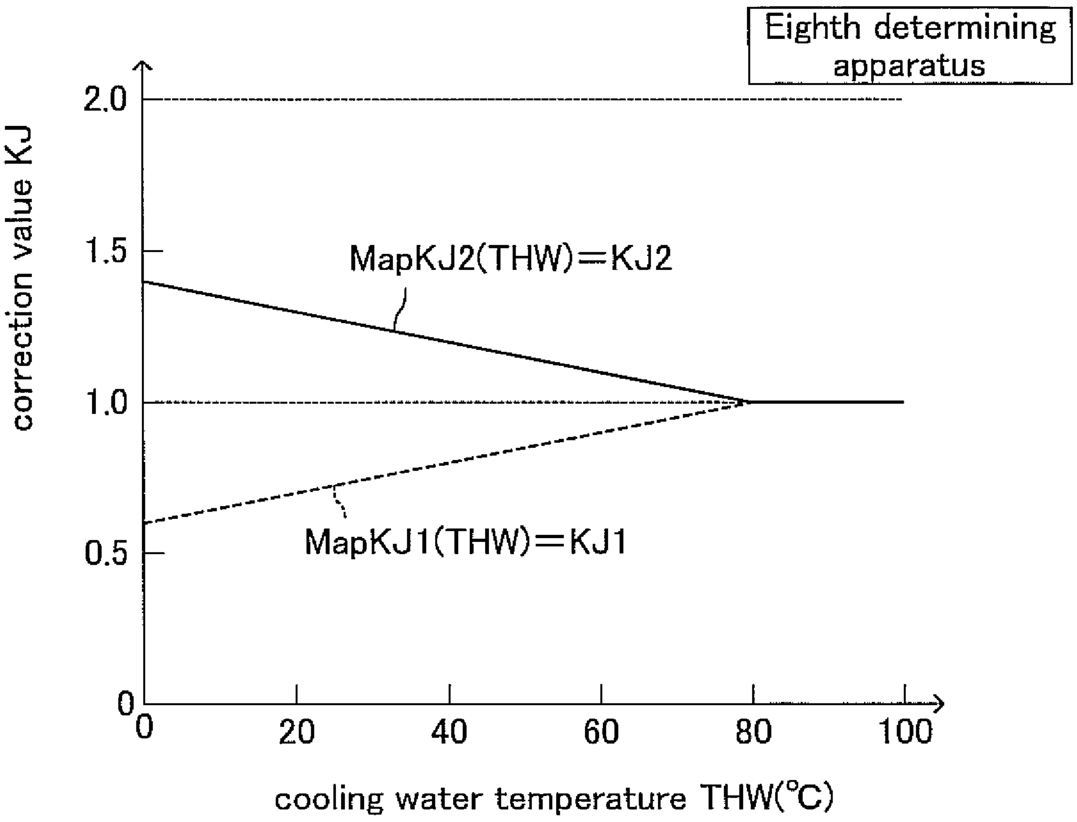
FIG. 27 is a look-up table to which the CPU of the eighth determining apparatus refers.

Similarly, at step 2610, the CPU 71 reads out a correction coefficient (second imbalance determination threshold cooling water temperature correction value) KJ2 from a table MapKJ2(THW) shown in FIG. 27 and the cooling-water temperature THW at the present time.

According to the table MapKJ2(THW), the correction coefficient KJ2 is determined in such a manner that the correction coefficient KJ2 becomes smaller from a value larger than "1" to "1" as the cooling-water temperature THW becomes higher toward the fully warmed-up coolant-temperature THW80 (=80° C.). Further, according to the table MapKJ2(THW), the correction coefficient KJ2 is determined to become "1" when the cooling-water temperature THW is higher than the fully warmed-up coolant-temperature THW80.

Thereafter, the CPU 71 obtains, as shown in a formula (39) described below, a water temperature corrected second imbalance determination threshold X2th by multiplying the constant reference threshold X2th0 by the correction value KJ2. The constant reference threshold X2th0 is a value which is adjusted so as to allow to determine that the "air-fuel ratio imbalance among cylinders due to the change in the properties of the fuel injectors is occurring when the second imbalance determination parameter X2 is smaller than the reference threshold X2th0" in a case where the state of the engine 10 is in the fully warmed-up state (THW≥THW80=80° C.), and thus, the fuel adhering amount is stable at a small value (and when the evaporated fuel gas purge is not being carried out). According to the configuration described above, the air-fuel ratio imbalance among cylinders determination can be performed irrespective of a degree of the effect caused by the adhering fuel even when the "imbalance determination parameter (second imbalance determination parameter X2)" is affected by the adhering fuel.

$$X2th=KJ2\cdot X2th0 \quad (39)$$

Subsequently, the CPU 71 proceeds to step 1745 to perform the air-fuel ratio imbalance determination using (based on) a comparison between the first imbalance determination parameter X1 which is not corrected and the first imbalance determination threshold X1th which is corrected based on the cooling water temperature as described above. Alternatively, the CPU 71 performs the air-fuel ratio imbalance determination using (based on) a comparison between the second imbalance determination parameter X2 which is not corrected and the second imbalance determination threshold X2th which is corrected based on the cooling water temperature as described above.

As described above, the eighth determining apparatus comprises allowing and prohibiting imbalance determining execution means for prohibiting obtaining the imbalance determination parameter or prohibiting performing/executing the imbalance determination, not only when it is determined that the evaporated fuel gas effect occurring state is occurring, but also when the warming-up state of the engine 10 has not yet reached the predetermined warming-up state (which is the state in which the warming-up state has not proceeded compared with the fully warmed-up state) (refer to "No" determination at step 2310 shown in FIG. 23, "Yes" determination at step 2320, and "No" determination at step 1705 shown in FIG. 26).

Further, the eighth determining apparatus includes second determination threshold correction means (refer to step 2610 shown in FIG. 26) for correcting, based on the warming-up state parameter (cooling water temperature THW), the imbalance determination threshold (for obtaining the first imbalance determination threshold X1th by correcting the reference threshold X1th0, or obtaining the second imbalance determination threshold X2th by correcting the reference threshold X2th0), when the obtained warming-up state parameter is larger than the warming-up state parameter threshold (threshold THWth).

Accordingly, in the eighth determining apparatus, the imbalance determination threshold is corrected to a value which corresponds to the effect by the fuel adhering amount, even when the imbalance determination parameter (X1, X2) is affected by the fuel adhering amount. Consequently, when the difference among the individual cylinder air-fuel ratios due to the difference between (among) the injection properties of the fuel injectors 39 reaches the predetermined value, it can be accurately determined that the air-fuel ratio imbalance among cylinders has been occurring.

Ninth Embodiment

A determining apparatus (hereinafter, referred to as a "ninth determining apparatus") according to a ninth embodiment of the present invention will next be described.

Figure 28:
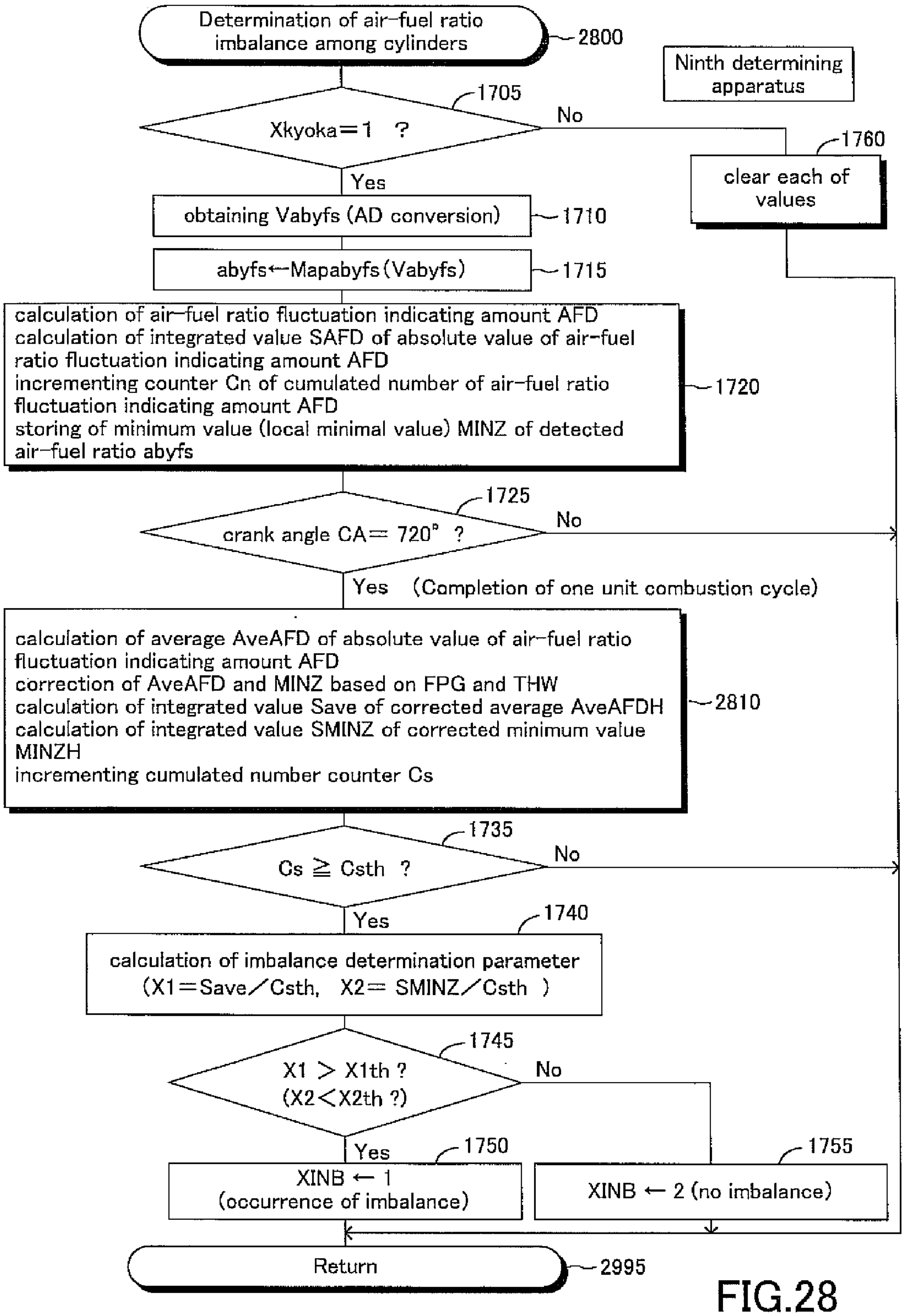
FIG. 28 is a flowchart showing a routine executed by a CPU of an apparatus (ninth determining apparatus) for determining an air-fuel ratio imbalance among cylinders according to a ninth embodiment of the present invention.

The CPU 71 of the ninth determining apparatus executes the routines shown in FIGS. 10-15, 22, and 28. The routines shown in FIGS. 10-15, and 22 have been described. Accordingly, hereinafter, the routine shown in FIG. 28 is described. The ninth determining apparatus executes the routine shown in FIG. 28 to thereby correct the imbalance determination parameter based on the purge correction coefficient FPG and the cooling temperature THW. In other words, the ninth determining apparatus obtains the imbalance determination parameter from which the effects caused by the evaporated fuel gas and the adhering fuel amount are eliminated, and performs the imbalance determination based on the imbalance determination parameter.

The routine shown in FIG. 28 is different from the routine shown in FIG. 17 only in that step 1730 is replaced with (by) step 2810. Accordingly, hereinafter, processes following step 2810 will be mainly described.

When the CPU 71 proceeds to step 2810, it calculates the average AveAFD of the absolute value of the air-fuel ratio fluctuation indicating amount AFD (E), similarly to step 1730.

Subsequently, the CPU 71 reads out a correction coefficient KFT(n, m) (=KFTX1) from a "table MapKFTX1(FPG, THW) shown in FIG. 29" and "the purge correction coefficient FPG and the cooling water temperature THW" at the present time. This correction coefficient KFTX1 is also referred to as first imbalance determination parameter evaporated fuel•warming-up state•correction value.

According to the table MapKFTX1(FPG, THW), the correction coefficient KFTX1 is determined in advance by experiments in such a manner that the correction coefficient KFTX1 becomes a value which can eliminate the effects on the first imbalance determination parameter X1 cuased by the evaporated fuel gas and the adhering fuel. More simply, the correction coefficient KFTX1 can be obtained by obtaining a product of "correction coefficient KHX1 obtained based on the purge correction coefficient FPG and the tabele Map KHX1(FPG)" and a "correction coefficient KthwX1 obtained based on the cooling water temperature THW and the table MapKthwX1(THW)".

Thereafter, the CPU 71 obtains a corrected average AveAFDH by multiplying the average AveAFD by the correction coefficient KFTX1, as shown in a formula (40) described below. This can eliminate the effect on the "first imbalance determination parameter X1" caused by the fuel included in the evaporated fuel gas and the fuel adhering to the intake passage constituting members. In other words, the corrected average AveAFDH becomes equal to the "average AveAFD of the absolute value |AFD| of the air-fuel ratio fluctuation indicating amount AFD" which is obtained when the evaporated fuel gas purge is not being performed and the state of the engine 10 is in the fully warmed-up state, and thus, the fuel adhering amount is stable at a small value.

$$\mathrm{Ave}AFDH=KFTX1\cdot\mathrm{Ave}AFD \quad (40)$$

Figure 29:
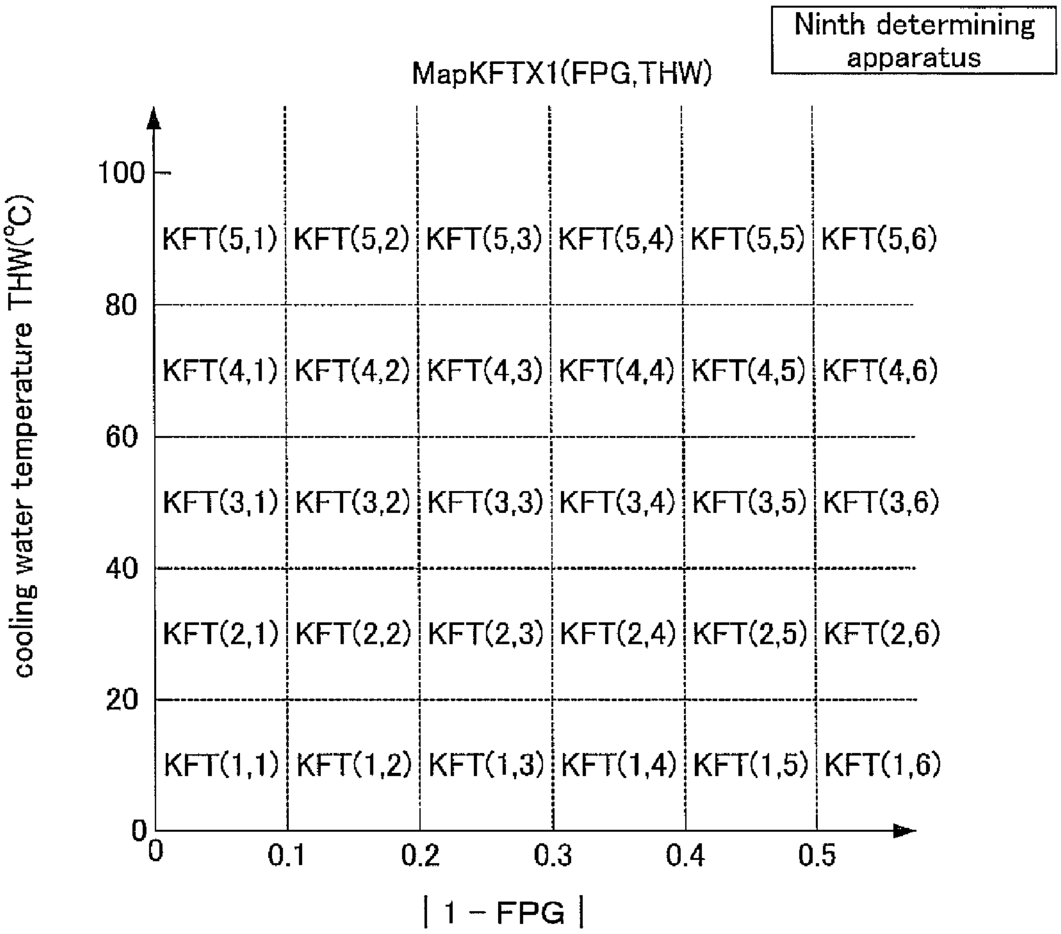
FIG. 29 is a look-up table to which the CPU of the ninth determining apparatus refers.

Similarly, the CPU 71 reads out a correction coefficient (second imbalance determination parameter evaporated fuel∩warming-up state•correction value) KFTX2 from an "unillustrated table MapKFTX2(FPG, THW) having a similar form of the table shown in FIG. 29" and "the purge correction coefficient FPG and the cooling water temperature THW" at the present time.

According to the table MapKFTX2(FPG, THW), the correction coefficient KFTX2 is determined in advance by experiments in such a manner that the correction coefficient KFTX2 becomes a value which can eliminate the effects on the second imbalance determination parameter X2 caused by the evaporated fuel gas and the adhering fuel. More simply, the correction coefficient KFTX2 can be obtained by obtaining a product of "correction coefficient KHX2 obtained based on the purge correction coefficient FPG and the table Map KHX2(FPG)" and a "correction coefficient KthwX2 obtained based on the cooling water temperature THW and the table MapKthwX2(THW)".

Thereafter, the CPU 71 obtains a corrected minimum value MINZH by multiplying the minimum value MINZ by the correction coefficient KFTX2, as shown in a formula (41) described below. This can eliminate the effect on the "second imbalance determination parameter X2" caused by the fuel included in the evaporated fuel gas and the fuel adhering to the intake passage constituting members. In other words, the corrected minimum value MINZH becomes equal to the "minimum value MINZ for the unit combustion cycle period" which is obtained when the evaporated fuel gas purge is not being performed and the state of the engine 10 is in the fully warmed-up state, and thus, the fuel adhering amount is stable at a small value.

$$\mathrm{MINZ}H=KFTX2\cdot\mathrm{MINZ} \quad (41)$$

Thereafter, similarly to step 1810 shown in FIG. 18, the CPU 71 calculates an integrated value Save of the corrected average AveAFDH (refer to (J) described above, and the formula (32) described above). Further, similarly to step 1810 shown in FIG. 18, the CPU 71 calculates an integrated value SMINZ of the corrected minimum value MINZH (refer to (K) described above, and the formula (33) described above).

Subsequently, similarly to step 1730, the CPU 71 increments the value of the counter Cs by "1" (refer to (L) described above).

Subsequently, the CPU 71 proceeds to steps following step 1735, and when the of the counter Cs is equal to or larger than the threshold Csth, the CPU 71 calculates the imbalance determination parameter X (first imbalance determination parameter X1 and second imbalance determination parameter X2), according to the formula (28) and the formula (29).

Subsequently, the CPU 71 proceeds to step 1745 to perform the air-fuel ratio imbalance among cylinders determination based on a comparison between the first imbalance determination parameter X1 and the first imbalance determination threshold X1th or a comparison between the second imbalance determination parameter X2 and the second imbalance determination threshold X2th.

As described above, the ninth determining apparatus performs the imbalance determination based on the imbalance determination parameter from which the effects caused by the evaporated fuel gas and the adhering fuel amount are eliminated. Further, the ninth determining apparatus neither prohibit obtaining the imbalance determination parameter nor prohibit performing/executing the imbalance determination in both a case in which there is a possibility that the evaporated fuel gas effect occurring state is occurring, and a case in which there is a possibility that the fuel adhering amount is large. Consequently, the determination of an air-fuel ratio imbalance among cylinders can be performed more frequently with high accuracy.

As described above, the determining apparatuses according to each of the embodiments of the present invention can avoid making erroneous determination that the "air-fuel ratio imbalance among cylinders is not occurring", even when a large amount of the fuel is supplied to the engine 10 by the evaporated fuel gas, and/or even when a large amount of the fuel adheres to the intake passage constituting members.

The present invention is not limited to the embodiments described above, but various modifications, such as modified apparatuses described below, may be adopted without departing from the scope of the invention.

First Modified Embodiment

Similarly to the ninth determining apparatus, the first modified embodiment neither prohibit obtaining the imbalance determination parameter nor prohibit performing/executing the imbalance determination in both a case in which there is a possibility that the evaporated fuel gas effect occurring state is occurring, and a case there is a possibility that the fuel adhering amount is large.

However, the first modified embodiment corrects a reference threshold for the imbalance determination (X1th0, X2th0) using (with) a correction coefficient (KFTXi1, KFTXi2) obtained based on the purge correction coefficient FPG and the cooling water temperature THW to thereby obtain an imbalance determination threshold (a first imbalance determination threshold X1th=KFTXi1·X1th0, a second imbalance determination threshold X2th=KFTXi2·X2th0).

Thereafter, the first modified embodiment performs the air-fuel ratio imbalance among cylinders determination based on a comparison between the first imbalance determination parameter X1 which is not corrected and the first imbalance determination threshold X1th which is corrected. Alternatively, the first modified embodiment performs the air-fuel ratio imbalance among cylinders determination based on a comparison between the second imbalance determination parameter X2 which is not corrected and the second imbalance determination threshold X2th which is corrected.

According to the configuration described above, the air-fuel ratio imbalance among cylinders determination can be performed irrespective of a degree of the effect caused by the evaporated fuel gas and the adhering fuel, even when the "imbalance determination parameter (X1, X2)" is affected by the evaporated fuel gas and the adhering fuel.

Second Modified Embodiment

Similarly to the ninth determining apparatus, the second modified embodiment neither prohibit obtaining the imbalance determination parameter nor prohibit performing/executing the imbalance determination in both a case in which there is a possibility that the evaporated fuel gas effect occurring state is occurring, and a case there is a possibility that the fuel adhering amount is large.

In contrast, the second modified embodiment corrects the imbalance determination parameter (X1, X2) with (by) the "correction coefficient (KHX1, KHX2) obtained based on the purge correction coefficient FPG at the present time", similarly to the fourth determining apparatus. Further, the second modified embodiment obtains the imbalance determination threshold (X1th, X2th) which is corrected with (by) the correction coefficient (KJ1, KJ2) obtained based on the cooling water temperature THW at the present time, similarly to the eighth determining apparatus.

Thereafter, the second modified embodiment performs the air-fuel ratio imbalance among cylinders determination based on a comparison between the corrected first imbalance determination parameter X1 and the corrected first imbalance determination threshold X1th. Alternatively, the second modified embodiment performs the air-fuel ratio imbalance among cylinders determination based on a comparison between the corrected second imbalance determination parameter X2 and the corrected second imbalance determination threshold X2th.

According to the above configuration, the "imbalance determination parameter (X1, X2)" from which the effect by the evaporated fuel gas is eliminated is used for the imbalance determination. Further, even when the "imbalance determination parameter (X1, X2)" is affected by the adhering fuel, the imbalance determination threshold corresponding to the effect is used for the imbalance determination. Consequently, the air-fuel ratio imbalance among cylinders determination can be performed irrespective of a degree of the effect caused by the evaporated fuel gas and the adhering fuel.

Third Modified Embodiment

Similarly to the ninth determining apparatus, the third modified embodiment neither prohibit obtaining the imbalance determination parameter nor prohibit performing/executing the imbalance determination in both a case in which there is a possibility that the evaporated fuel gas effect occurring state is occurring, and a case there is a possibility that the fuel adhering amount is large.

In contrast, the third modified embodiment obtains the imbalance determination threshold (X1th, X2th) which is corrected with (by) the correction coefficient (Ki1, Ki2) obtained based on the purge correction coefficient FPG at the present time, similarly to the fifth determining apparatus. Further, the third modified embodiment corrects the imbalance determination parameter (X1, X2) with (by) correction coefficient (KthwX1, KthewX2) obtained based on the cooling water temperature THW at the present time, similarly to the seventh determining apparatus.

Thereafter, the third modified embodiment performs the air-fuel ratio imbalance among cylinders determination based on a comparison between the corrected first imbalance determination parameter X1 and the corrected first imbalance determination threshold X1th. Alternatively, the third modified embodiment performs the air-fuel ratio imbalance among cylinders determination based on a comparison between the corrected second imbalance determination parameter X2 and the corrected second imbalance determination threshold X2th.

According to the above configuration, the "imbalance determination parameter (X1, X2)" from which the effect by the adhering fuel is eliminated is used for the imbalance determination. Further, even when the "imbalance determination parameter (X1, X2)" is affected by the evaporated fuel gas, the imbalance determination threshold corresponding to the effect is used for the imbalance determination. Consequently, the air-fuel ratio imbalance among cylinders determination can be performed irrespective of a degree of the effect caused by the evaporated fuel gas and the adhering fuel.

Other Embodiments

It should be noted that the embodiments described above and the modified embodiments described above can be combined as long as there is no inconsistency. For example, in the embodiments in which either the imbalance determination parameter or the imbalance determination threshold is corrected using (with) the correction coefficient obtained based on the purge correction coefficient FPG, obtaining the imbalance determination parameter and performing the imbalance determination can be allowed, regardless of the determination as to whether or not the evaporated fuel gas effect occurring state is (has been) occurring Similarly, in the embodiments in which either the imbalance determination parameter or the imbalance determination threshold is corrected using (with) the correction coefficient obtained based on the cooling water temperature THW, obtaining the imbalance determination parameter and performing the imbalance determination can be allowed, regardless of the determination as to whether or not the warming-up state of the engine has reached the above predetermined warming-up state. Further, the sixth to eighth determining apparatuses may allow obtaining the imbalance determination parameter and performing the imbalance determination, regardless of whether or not evaporated fuel gas effect occurring state is (has been) occurring.

Furthermore, the ninth embodiment, and the first to third modified embodiments may prohibit obtaining the imbalance determination parameter or performing the imbalance determination, when it is determined that the evaporated fuel gas effect occurring state is (has been) occurring. Similarly, the ninth embodiment, and the first to third modified embodiments may prohibit obtaining the imbalance determination parameter or performing the imbalance determination, when it is determined that the warming-up state of the engine 10 has not reached the above predetermined warming-up state.

In addition, the imbalance determination parameter may be one of parameters described below.

(P1) The imbalance determination parameter may be a trajectory length of the output value Vabyfs of the air-fuel ratio sensor 67 or a trajectory length of the detected air-fuel ratio abyfs. For example, the trajectory length of the detected air-fuel ratio abyfs may be obtained by obtaining the output value Vabyfs every time the constant sampling time period ts elapses, converting the output value Vabyfs into the detected air-fuel ratio abyfs, and integrating an absolute value of a difference between the detected air-fuel ratio abyfs and the detected air-fuel ratio obtained the sampling time period ts prior to the present time. The trajectory length is obtained for each of the unit combustion cycle period. An average value of the trajectory length for a plurality of unit combustion cycle periods may be adopted as the imbalance determination parameter. It should be noted it is preferable that each of the determining appratuses increases the imbalance determination threshold as the engine rotational speed NE increases, since the trajectory length of the output value Vabyfs of the air-fuel ratio sensor 67 or the trajectory length of the detected air-fuel ratio abyfs tend to increase as the engine rotational speed NE increases.

(P2) The imbalance determination parameter, as shown (D) in FIG. 9, may be an absolute value of a "value corresponding to a change rate (temporal changing rate) of (in) a change rate (temporal changing rate) of (in) the output value Vabyfs of the air-fuel ratio sensor 67". That is, the imbalance determination parameter may be (based on) an absolute value of "the second order differential value $d^2(Vabyfs)/dt^2$ with respect to time of the output value Vabyfs of the air-fuel ratio sensor 67", or an absolute value of "the second order differential value $d^2(abyfs)/dt^2$ with respect to time of the detected air-fuel ratio abyfs represented by the output value Vabyfs of the air-fuel ratio sensor 67". The change rate of a change rate of the output value Vabyfs of the air-fuel ratio sensor 67 may be said to be a change amount of a change amount of the air-fuel ratio (detected air-fuel ratio abyfs) represented by the output value Vabyfs of the upstream air-fuel ratio sensor 67 per unit time.

For example, the change rate of the change rate of the detected air-fuel ratio abyfs can be obtained as follows.

The output value Vabyfs is obtained every time the constant sampling time ts elapses.

The output value Vabyfs is converted into the detected air-fuel ratio abyfs.

A difference between the detected air-fuel ratio abyfs and the previously detected air-fuel ratio abyfs obtained the constant sampling time ts ago is obtained as a change rate of the detected air-fuel ratio abyfs.

A difference between the change rate of the detected air-fuel ratio abyfs and the previous change rate of the detected air-fuel ratio abyfs obtained the constant sampling time ts ago is obtained as the change rate of the change rate of the detected air-fuel ratio abyfs.

In this case, among a "plurality of values of the change rate of the change rate of the detected air-fuel ratio abyfs, obtained in the unit combustion cycle period", a "value whose absolute value is the largest" is selected, and the selected value may be adopted as the imbalance determination parameter.

As described above, in a case where the air-fuel ratio imbalance among cylinders is occurring, the output value Vabyfs of the upstream air-fuel ratio sensor 67 rapidly changes when the exhaust gas reaching the upstream air-fuel ratio sensor 67 changes "from the exhaust gas from the normal cylinder to the exhaust gas from the abnormal cylinder, and from the exhaust gas from the abnormal cylinder to the exhaust gas from the normal cylinder". Accordingly, as shown by a solid line C4 in (D) of FIG. 9, the absolute value of the change rate of the change rate of the detected air-fuel ratio abyfs becomes large and exceeds the imbalance determination threshold, when the air-fuel ratio imbalance among cylinders is occurring. Further, the absolute value of the change rate of the change rate of the detected air-fuel ratio abyfs becomes larger as a degree of a ununiformity among the individual air-fuel ratios becomes larger.

(P4) The imbalance determination parameter may be a magnitude of a difference among "individual cylinder air-fuel ratios, each of which is estimated by analyzing the output value Vabyfs of the upstream air-fuel ratio sensor 67 based on the engine rotational speed NE, the absolute crank angle CA, the intake air flow rate Ga, and so on (e.g., refer to Japanese Patent Application Laid-Open (kokai) No. 2000-220489) (for example, the magnitude of the difference being an absolute value of a difference between a maximum value of the individual cylinder air-fuel ratios and a minimum value of the individual cylinder air-fuel ratios).

(P5) The imbalance determination parameter may be a difference between a maximum value and a minimum value of the detected air-fuel ratio abyfs (or the output value Vabyfs of the upstream air-fuel ratio sensor 67) in the unit combustion cycle period.

Further, the sub feedback control in the determining apparatuses described above is a control to correct the air-fuel ratio abyfs based on the output value Vabyfs of the upstream air-fuel ratio sensor 67 apparently so as to have the output value Voxs of the downstream air-fuel ratio sensor 58 coincide with the target downstream-side value Voxsref (refer to the formula (5) described above). In contrast, the sub feedback control may be a control which changes an air-fuel ratio correction coefficient formed based on the output value of the upstream air-fuel ratio sensor 67 in accordance with a "sub feedback amount obtained by integrating the output value Voxs of the downstream air-fuel ratio sensor 58", as described in Japanese Patent Application Laid-Open (kokai) No. Hei 6-010738)

Furthermore, as described in Japanese Patent Application Laid-Open (kokai) No. 2007-77869, Japanese Patent Application Laid-Open (kokai) No. 2007-14661, and Japanese Patent Application Laid-Open (kokai) No. 2007-162565, each of the determining apparatuses described above may be configured in such a manner that it calculates the main feedback amount KFmain by high-pass-filtering on a difference between the upstream air-fuel ratio abyfs obtained based on the output value Vabyfs of the upstream air-fuel ratio sensor 67 and the target upstream-side air-fuel ratio abyfr, and obtains the sub feedback amount Fisub by performing a proportional-integral control on a value obtained by low-pass-filtering on an error between the output value Voxs of the downstream air-fuel ratio sensor 58 and the target downstream value Voxs. In addition, each of the determining apparatuses described above may not perform the sub feedback control. Further, the imbalance determination may be performed while the main feedback control is not being carried out.

Furthermore, each of the determining apparatuses can be applied to a V-type engine, for example. In this case, the V-type engine may comprise, a right bank upstream side catalyst disposed at a position downstream of an exhaust-gas-aggregated-portion of two or more cylinders belonging to a right bank (catalyst disposed in the exhaust passage of the engine and at a position downstream of the exhaust-gas-aggregated-portion into which the exhaust gases merge, the exhaust gases discharged from chambers of at least two or more of the cylinders among a plurality of the cylinders); and a left bank upstream side catalyst disposed at a position downstream of an exhaust-gas-aggregated-portion of two or more cylinders belonging to a left bank (catalyst disposed in the exhaust passage of the engine and at a position downstream of the exhaust-gas-aggregated-portion into which the exhaust gases merge, the exhaust gases discharged from chambers of two or more of the cylinders among the rest of the said at least two or more of the cylinders).

Further, the V-type engine may comprise an upstream side air-fuel ratio sensor for the right bank and a downstream side air-fuel ratio sensor for the right bank disposed upstream and downstream of the right bank upstream side catalyst, respectively, and may comprise an upstream side air-fuel ratio sensor for the left bank and a downstream side air-fuel ratio sensor for the left bank disposed upstream and downstream of the left bank upstream side catalyst, respectively. Each of the upstream side air-fuel ratio sensors, similarly to the upstream air-fuel ratio sensor 67, is disposed between the exhaust-gas-aggregated-portion of each bank and the upstream side catalyst of each bank. In this case, a main feedback control for the right bank and a sub feedback for the right bank are performed, and a main feedback control for the left bank and a sub feedback for the left bank are independently performed.

In addition, some of the determining apparatuses are each configured so as to determine that the evaporated fuel gas effect occurring state is occurring, when the magnitude $|1-FPG|$ of the difference between the evaporated fuel gas purge correction amount (purge correction coefficient FPG) and the reference value "1" of the evaporated fuel gas purge correction amount is larger than the predetermined purge effect determining threshold. In place of the above configuration, the determining apparatuses are each configured so as to have a fuel concentration sensor (which may be an air-fuel ratio sensor) in the purge passage pipe 48 and an evaporated fuel gas flow rate sensor which measures an evaporated fuel gas flow rate flowing in the purge passage pipe 48, obtain a fuel amount included in the evaporated fuel gas flowing into the intake passage based on these sensors, and determine that the evaporated fuel gas effect occurring state is occurring, when the fuel amount is larger than or equal to a predetermined value.

Moreover, some of the determining apparatuses are each configured so as to adopt, as the parameter indicative of the warming-up state of the engine 10 (the parameter being larger as the warming-up state of the engine 10 proceeds), the cooling water temperature THW detected by the cooling water temperature sensor 63. In place of this configuration, for example, the determining apparatus may adopt, as the "parameter indicative of the warming-up state of the engine 10", a parameter, which has an initial value which becomes larger as the cooling water temperature THW0 at the start of the engine 10 is higher, and which becomes larger as an integrated amount of an intake air after the start of the engine 10 (or a time of operating after the start of the engine 10) becomes larger.

The invention claimed is:

1. An apparatus for determining an air-fuel ratio imbalance among cylinders applied to a multi-cylinder internal combustion engine having a plurality of cylinders, comprising:

an air-fuel ratio sensor, disposed in an exhaust passage of said engine and at an exhaust gas aggregated portion into which exhaust gases discharged from at least two or more of cylinders among a plurality of said cylinders merge, or in said exhaust passage of said engine and at a position downstream of said exhaust gas aggregated portion, and outputting, as an output of said air-fuel ratio sensor, an output value in accordance with an air-fuel ratio of said exhaust gas reaching said air-fuel ratio sensor;

a plurality of fuel injectors, each provided so as to correspond to each of said at least two or more of said cylinders, and each injecting a fuel to be contained in a mixture supplied to each of said combustion chambers of said two or more of said cylinders;

a purge passage section configured so as to form a passage which allows an evaporated fuel gas generated in a fuel tank which stores the fuel supplied to a plurality of said fuel injectors to be introduced into an intake passage of said engine;

a purge amount control section configured so as to control an evaporated fuel gas purge amount which is an amount of said evaporated fuel gas flowing into said intake passage of said engine through said purge passage section;

an imbalance determination parameter obtaining section configured so as to obtain, based on said output value of said air-fuel ratio sensor, an imbalance determination parameter which becomes larger or smaller as a difference among individual air-fuel ratios, each being an air-fuel ratio of said mixture supplied to each of said at least two or more of a plurality of said cylinders, becomes larger;

an imbalance determining section configured so as to compare said obtained imbalance determination parameter with an imbalance determination threshold, and so as to determine whether or not said air-fuel ratio imbalance among cylinders has been occurring based on a result of said comparison; and a prohibiting imbalance determining execution section configured so as to prohibit obtaining said imbalance determination parameter or prohibit performing said imbalance determination, based on an amount of fuel included in said evaporated fuel gas flowing into said intake passage.

2. An apparatus for determining an air-fuel ratio imbalance among cylinders applied to a multi-cylinder internal combustion engine having a plurality of cylinders, comprising:

an air-fuel ratio sensor, disposed in an exhaust passage of said engine and at an exhaust gas aggregated portion into which exhaust gases discharged from at least two or more of cylinders among a plurality of said cylinders merge, or in said exhaust passage of said engine and at a position downstream of said exhaust gas aggregated portion, and outputting, as an output of said air-fuel ratio sensor, an output value in accordance with an air-fuel ratio of said exhaust gas reaching said air-fuel ratio sensor;

a plurality of fuel injectors, each provided so as to correspond to each of said at least two or more of said cylinders, and each injecting a fuel to be contained in a mixture supplied to each of said combustion chambers of said two or more of said cylinders;

a purge passage section configured so as to form a passage which allows an evaporated fuel gas generated in a fuel tank which stores the fuel supplied to a plurality of said fuel injectors to be introduced into an intake passage of said engine;

a purge amount control section configured so as to control an evaporated fuel gas purge amount which is an amount of said evaporated fuel gas flowing into said intake passage of said engine through said purge passage section;

an imbalance determination parameter obtaining section configured so as to obtain, based on said output value of said air-fuel ratio sensor, an imbalance determination parameter which becomes larger or smaller as a difference among individual air-fuel ratios, each being an air-fuel ratio of said mixture supplied to each of said at least two or more of a plurality of said cylinders, becomes larger;

an imbalance determining section configured so as to compare said obtained imbalance determination parameter with an imbalance determination threshold, and so as to determine whether or not said air-fuel ratio imbalance among cylinders has been occurring based on a result of said comparison; and a prohibiting imbalance determining execution section configured so as to prohibit obtaining said imbalance determination parameter or prohibit performing said imbalance determination, when an amount of fuel included in said evaporated fuel gas flowing into said intake passage is larger than or equal to a threshold.

3. An apparatus for determining an air-fuel ratio imbalance among cylinders applied to a multi-cylinder internal combustion engine having a plurality of cylinders, comprising:

an air-fuel ratio sensor, disposed in an exhaust passage of said engine and at an exhaust gas aggregated portion into which exhaust gases discharged from at least two or more of cylinders among a plurality of said cylinders merge, or in said exhaust passage of said engine and at a position downstream of said exhaust gas aggregated portion, and outputting, as an output of said air-fuel ratio sensor, an output value in accordance with an air-fuel ratio of said exhaust gas reaching said air-fuel ratio sensor;

a plurality of fuel injectors, each provided so as to correspond to each of said at least two or more of said cylinders, and each injecting a fuel to be contained in a mixture supplied to each of said combustion chambers of said two or more of said cylinders;

a purge passage section configured so as to form a purge passage which allows an evaporated fuel gas generated in a fuel tank which stores the fuel supplied to a plurality of said fuel injectors to be introduced into an intake passage of said engine;

a purge amount control section configured so as to adjust an opening degree of a purge control valve disposed in said purge passage to control an evaporated fuel gas purge amount which is an amount of said evaporated fuel gas flowing into said intake passage of said engine through said purge passage section;

an imbalance determination parameter obtaining section configured so as to obtain, based on said output value of said air-fuel ratio sensor, an imbalance determination parameter which becomes larger or smaller as a difference among individual air-fuel ratios, each being an air-fuel ratio of said mixture supplied to each of said at least two or more of a plurality of said cylinders, becomes larger;

an imbalance determining section configured so as to compare said obtained imbalance determination parameter with an imbalance determination threshold, and configured so as to determine whether or not said air-fuel ratio imbalance among cylinders has been occurring based on a result of said comparison; and a prohibiting imbalance determining execution section configured so as to prohibit obtaining said imbalance determination parameter or prohibit performing said imbalance determination, when said opening degree of said purge control valve is larger than or equal to a threshold.

4. The apparatus for determining an air-fuel ratio imbalance among cylinders according to claim 3, wherein:

said purge control valve is configured so as to vary a cross-sectional area of said purge passage in response to a drive signal representing a duty ratio DPG which is an instruction signal; and said prohibiting imbalance determining execution section is configured so as to determine that said opening degree of said purge control valve is larger than or equal to said threshold when the duty ratio DPG is equal to or larger than a duty ratio threshold.

* * * * *

UNITED STATES PATENT AND TRADEMARK OFFICE

CERTIFICATE OF CORRECTION

PATENT NO. : 8,725,387 B2
APPLICATION NO. : 13/871249
DATED : May 13, 2014
INVENTOR(S) : Yasushi Iwazaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Insert -- This patent is subject to a terminal disclaimer. --

Signed and Sealed this
Twelfth Day of May, 2015

Michelle K. Lee

Michelle K. Lee
*Director of the United States Patent and Trademark Office*